United States Patent
Kadambi et al.

(10) Patent No.: US 11,525,906 B2
(45) Date of Patent: *Dec. 13, 2022

(54) SYSTEMS AND METHODS FOR AUGMENTATION OF SENSOR SYSTEMS AND IMAGING SYSTEMS WITH POLARIZATION

(71) Applicant: INTRINSIC INNOVATION LLC, Mountain View, CA (US)

(72) Inventors: Achuta Kadambi, Los Altos Hills, CA (US); Ramesh Raskar, Cambridge, MA (US); Kartik Venkataraman, San Jose, CA (US); Supreeth Krishna Rao, San Jose, CA (US); Agastya Kalra, Nepean (CA)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/277,242

(22) PCT Filed: Oct. 7, 2020

(86) PCT No.: PCT/US2020/054641
§ 371 (c)(1),
(2) Date: Mar. 17, 2021

(87) PCT Pub. No.: WO2021/071992
PCT Pub. Date: Apr. 15, 2021

(65) Prior Publication Data
US 2021/0356572 A1     Nov. 18, 2021

Related U.S. Application Data

(60) Provisional application No. 63/001,445, filed on Mar. 29, 2020, provisional application No. 62/942,113, (Continued)

(51) Int. Cl.
*G06T 7/00* (2017.01)
*H04N 13/00* (2018.01)
(Continued)

(52) U.S. Cl.
CPC .............. *G01S 7/499* (2013.01); *G01B 11/24* (2013.01); *G01S 13/89* (2013.01); *G01S 17/87* (2013.01);
(Continued)

(58) Field of Classification Search
CPC .......... G01S 7/499; G01S 13/89; G01S 17/87; G01S 17/89; G06T 7/521; G06T 7/11;
(Continued)

(56) References Cited

U.S. PATENT DOCUMENTS 4,124,798 A   11/1978   Thompson
4,198,646 A   4/1980   Alexander et al.
(Continued)

FOREIGN PATENT DOCUMENTS

CN   2488005 Y   4/2002
CN   1619358 A   5/2005
(Continued)

OTHER PUBLICATIONS

US 8,957,977 B2, 02/2015, Venkataraman et al. (withdrawn)
(Continued)

*Primary Examiner* — Zhihan Zhou
(74) *Attorney, Agent, or Firm* — Fish & Richardson P.C.

(57) ABSTRACT

A multi-modal sensor system includes: an underlying sensor system; a polarization camera system configured to capture polarization raw frames corresponding to a plurality of different polarization states; and a processing system including a processor and memory, the processing system being configured to control the underlying sensor system and the polarization camera system, the memory storing instructions
(Continued)

that, when executed by the processor, cause the processor to: control the underlying sensor system to perform sensing on a scene and the polarization camera system to capture a plurality of polarization raw frames of the scene; extract first tensors in polarization representation spaces based on the plurality of polarization raw frames; and compute a characterization output based on an output of the underlying sensor system and the first tensors in polarization representation spaces.

18 Claims, 22 Drawing Sheets

Related U.S. Application Data filed on Nov. 30, 2019, provisional application No. 62/911,952, filed on Oct. 7, 2019.

(51) Int. Cl.
| | | |
|---|---|---|
| *G01S 7/499* | (2006.01) | |
| *G06T 7/521* | (2017.01) | |
| *G06T 7/11* | (2017.01) | |
| *G06T 7/593* | (2017.01) | |
| *H04N 13/257* | (2018.01) | |
| *H04N 13/243* | (2018.01) | |
| *G01B 11/24* | (2006.01) | |
| *G01S 13/89* | (2006.01) | |
| *G01S 17/87* | (2020.01) | |
| *G01S 17/89* | (2020.01) | |
| *G06T 7/60* | (2017.01) | |
| *G06T 17/00* | (2006.01) | |

(52) U.S. Cl.
CPC .............. *G01S 17/89* (2013.01); *G06T 7/11* (2017.01); *G06T 7/521* (2017.01); *G06T 7/593* (2017.01); *G06T 7/60* (2013.01); *G06T 17/00* (2013.01); *H04N 13/243* (2018.05); *H04N 13/257* (2018.05); *G06T 2200/08* (2013.01); *G06T 2207/10016* (2013.01); *G06T 2207/10024* (2013.01); *G06T 2207/10028* (2013.01); *G06T 2207/20081* (2013.01); *G06T 2207/20084* (2013.01)

(58) Field of Classification Search
CPC .......... G06T 7/593; G06T 7/60; G06T 17/00; G06T 2200/08; G06T 2207/10016; G06T 2207/10024; G06T 2207/10028; G06T 2207/20081; G06T 2207/20084; H04N 13/257; H04N 13/243; G01B 11/24
See application file for complete search history.

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,888,645 A | 12/1989 | Mitchell et al. |
| 4,899,060 A | 2/1990 | Lischke |
| 4,962,425 A | 10/1990 | Rea |
| 5,005,083 A | 4/1991 | Grage et al. |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,463,464 A | 10/1995 | Ladewski |
| 5,475,422 A | 12/1995 | Suzuki et al. |
| 5,488,674 A | 1/1996 | Burt et al. |
| 5,517,236 A | 5/1996 | Sergeant et al. |
| 5,629,524 A | 5/1997 | Stettner et al. |
| 5,638,461 A | 6/1997 | Fridge |
| 5,675,377 A | 10/1997 | Gibas et al. |
| 5,703,961 A | 12/1997 | Rogina et al. |
| 5,710,875 A | 1/1998 | Hsu et al. |
| 5,757,425 A | 5/1998 | Barton et al. |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,867,584 A | 2/1999 | Hu et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,084,979 A | 7/2000 | Kanade et al. |
| 6,095,989 A | 8/2000 | Hay et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,185,529 B1 | 2/2001 | Chen et al. |
| 6,198,852 B1 | 3/2001 | Anandan et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,373,518 B1 | 4/2002 | Sogawa |
| 6,419,638 B1 | 7/2002 | Hay et al. |
| 6,443,579 B1 | 9/2002 | Myers |
| 6,445,815 B1 | 9/2002 | Sato |
| 6,476,805 B1 | 11/2002 | Shume et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,546,153 B1 | 4/2003 | Hoydal |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,628,845 B1 | 9/2003 | Stone et al. |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,488 B1 | 6/2004 | Driescher et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev et al. |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,833,863 B1 | 12/2004 | Clemens |
| 6,879,735 B1 | 4/2005 | Portniaguine et al. |
| 6,897,454 B2 | 5/2005 | Sasaki et al. |

(56) References Cited

U.S. PATENT DOCUMENTS

| | | |
|---|---|---|
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,013,318 B2 | 3/2006 | Rosengard et al. |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Swaminathan et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen et al. |
| 7,430,312 B2 | 9/2008 | Gu |
| 7,471,765 B2 | 12/2008 | Jaffray et al. |
| 7,496,293 B2 | 2/2009 | Shamir et al. |
| 7,564,019 B2 | 7/2009 | Olsen et al. |
| 7,599,547 B2 | 10/2009 | Sun et al. |
| 7,606,484 B1 | 10/2009 | Richards et al. |
| 7,620,265 B1 | 11/2009 | Wolff et al. |
| 7,633,511 B2 | 12/2009 | Shum et al. |
| 7,639,435 B2 | 12/2009 | Chiang |
| 7,639,838 B2 | 12/2009 | Nims |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Nayar et al. |
| 7,956,871 B2 | 6/2011 | Fainstain et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,111,910 B2 | 2/2012 | Tanaka |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,194,296 B2 | 6/2012 | Compton et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,350,957 B2 | 1/2013 | Schechner et al. |
| 8,360,574 B2 | 1/2013 | Ishak et al. |
| 8,400,555 B1 | 3/2013 | Georgiev et al. |
| 8,406,562 B2 | 3/2013 | Bassi et al. |
| 8,411,146 B2 | 4/2013 | Twede |
| 8,416,282 B2 | 4/2013 | Lablans |
| 8,446,492 B2 | 5/2013 | Nakano et al. |
| 8,456,517 B2 | 6/2013 | Spektor et al. |
| 8,471,895 B2 | 6/2013 | Banks |
| 8,493,496 B2 | 7/2013 | Freedman et al. |
| 8,514,291 B2 | 8/2013 | Chang |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,558,929 B2 | 10/2013 | Tredwell |
| 8,559,705 B2 | 10/2013 | Ng |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,648,919 B2 | 2/2014 | Mantzel et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,787,691 B2 | 7/2014 | Takahashi et al. |
| 8,792,710 B2 | 7/2014 | Keselman |
| 8,804,255 B2 | 8/2014 | Duparre |
| 8,823,813 B2 | 9/2014 | Mantzel et al. |
| 8,830,375 B2 | 9/2014 | Ludwig |
| 8,831,367 B2 | 9/2014 | Venkataraman et al. |
| 8,831,377 B2 | 9/2014 | Pitts et al. |
| 8,836,793 B1 | 9/2014 | Kriesel et al. |
| 8,842,201 B2 | 9/2014 | Tajiri |
| 8,854,433 B1 | 10/2014 | Rafii |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman |

(56) References Cited

U.S. PATENT DOCUMENTS

| | | |
|---|---|---|
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Duparre et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,247,117 B2 | 1/2016 | Jacques |
| 9,253,380 B2 | 2/2016 | Venkataraman et al. |
| 9,253,397 B2 | 2/2016 | Lee et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,729,865 B1 | 8/2017 | Kuo et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,826,212 B2 | 11/2017 | Newton et al. |
| 9,858,673 B2 | 1/2018 | Ciurea et al. |
| 9,864,921 B2 | 1/2018 | Venkataraman et al. |
| 9,866,739 B2 | 1/2018 | McMahon |
| 9,888,194 B2 | 2/2018 | Duparre |
| 9,892,522 B2 | 2/2018 | Smirnov et al. |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,936,148 B2 | 4/2018 | McMahon |
| 9,942,474 B2 | 4/2018 | Venkataraman et al. |
| 9,955,070 B2 | 4/2018 | Lelescu et al. |
| 9,986,224 B2 | 5/2018 | Mullis |
| 10,009,538 B2 | 6/2018 | Venkataraman et al. |
| 10,019,816 B2 | 7/2018 | Venkataraman et al. |
| 10,027,901 B2 | 7/2018 | Venkataraman et al. |
| 10,089,740 B2 | 10/2018 | Srikanth et al. |
| 10,091,405 B2 | 10/2018 | Molina |
| 10,119,808 B2 | 11/2018 | Venkataraman et al. |
| 10,122,993 B2 | 11/2018 | Venkataraman et al. |
| 10,127,682 B2 | 11/2018 | Mullis |
| 10,142,560 B2 | 11/2018 | Venkataraman et al. |
| 10,182,216 B2 | 1/2019 | Mullis et al. |
| 10,218,889 B2 | 2/2019 | McMahan |
| 10,225,543 B2 | 3/2019 | Mullis |
| 10,250,871 B2 | 4/2019 | Ciurea et al. |
| 10,260,866 B2 | 4/2019 | Kadambi et al. |
| 10,261,219 B2 | 4/2019 | Duparre et al. |
| 10,275,676 B2 | 4/2019 | Venkataraman et al. |
| 10,306,120 B2 | 5/2019 | Duparre |
| 10,311,649 B2 | 6/2019 | McMohan et al. |
| 10,334,241 B2 | 6/2019 | Duparre et al. |
| 10,366,472 B2 | 7/2019 | Lelescu et al. |
| 10,375,302 B2 | 8/2019 | Nayar et al. |
| 10,375,319 B2 | 8/2019 | Venkataraman et al. |
| 10,380,752 B2 | 8/2019 | Ciurea et al. |
| 10,390,005 B2 | 8/2019 | Nisenzon et al. |
| 10,412,314 B2 | 9/2019 | McMahon et al. |
| 10,430,682 B2 | 10/2019 | Venkataraman et al. |
| 10,455,168 B2 | 10/2019 | McMahon |
| 10,455,218 B2 | 10/2019 | Venkataraman et al. |
| 10,462,362 B2 | 10/2019 | Lelescu et al. |
| 10,482,618 B2 | 11/2019 | Jain et al. |
| 10,540,806 B2 | 1/2020 | Yang et al. |
| 10,542,208 B2 | 1/2020 | Lelescu et al. |
| 10,547,772 B2 | 1/2020 | Molina |
| 10,557,705 B2 | 2/2020 | Kadambi et al. |
| 10,560,684 B2 | 2/2020 | Mullis |
| 10,574,905 B2 | 2/2020 | Srikanth et al. |
| 10,638,099 B2 | 4/2020 | Mullis et al. |
| 10,643,383 B2 | 5/2020 | Venkataraman |
| 10,659,751 B1 | 5/2020 | Briggs et al. |
| 10,674,138 B2 | 6/2020 | Venkataraman et al. |
| 10,694,114 B2 | 6/2020 | Venkataraman et al. |
| 10,708,492 B2 | 7/2020 | Venkataraman et al. |
| 10,735,635 B2 | 8/2020 | Duparre |
| 10,742,861 B2 | 8/2020 | McMahon |
| 10,767,981 B2 | 9/2020 | Venkataraman et al. |
| 10,805,589 B2 | 10/2020 | Venkataraman et al. |
| 10,818,026 B2 | 10/2020 | Jain et al. |
| 10,839,485 B2 | 11/2020 | Lelescu et al. |
| 10,909,707 B2 | 2/2021 | Ciurea et al. |
| 10,944,961 B2 | 3/2021 | Ciurea et al. |
| 10,958,892 B2 | 3/2021 | Mullis |
| 10,976,239 B1 | 4/2021 | Hart et al. |

(56) References Cited

U.S. PATENT DOCUMENTS

| | | |
|---|---|---|
| 10,984,276 B2 | 4/2021 | Venkataraman et al. |
| 11,022,725 B2 | 6/2021 | Duparre et al. |
| 11,024,046 B2 | 6/2021 | Venkataraman |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0003669 A1 | 1/2002 | Kedar et al. |
| 2002/0012056 A1 | 1/2002 | Trevino et al. |
| 2002/0015536 A1 | 2/2002 | Warren et al. |
| 2002/0027608 A1 | 3/2002 | Johnson et al. |
| 2002/0028014 A1 | 3/2002 | Ono |
| 2002/0039438 A1 | 4/2002 | Mori et al. |
| 2002/0057845 A1 | 5/2002 | Fossum et al. |
| 2002/0061131 A1 | 5/2002 | Sawhney et al. |
| 2002/0063807 A1 | 5/2002 | Margulis |
| 2002/0075450 A1 | 6/2002 | Aratani et al. |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0118113 A1 | 8/2002 | Oku et al. |
| 2002/0120634 A1 | 8/2002 | Min et al. |
| 2002/0122113 A1 | 9/2002 | Foote |
| 2002/0163054 A1 | 11/2002 | Suda |
| 2002/0167537 A1 | 11/2002 | Trajkovic |
| 2002/0171666 A1 | 11/2002 | Endo et al. |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0026474 A1 | 2/2003 | Yano |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0156189 A1 | 8/2003 | Utsumi et al. |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng |
| 2003/0211405 A1 | 11/2003 | Venkataraman |
| 2003/0231179 A1 | 12/2003 | Suzuki |
| 2004/0003409 A1 | 1/2004 | Berstis |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams et al. |
| 2004/0100570 A1 | 5/2004 | Shizukuishi |
| 2004/0105021 A1 | 6/2004 | Hu |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski et al. |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0212734 A1 | 10/2004 | Macinnis et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036135 A1 | 2/2005 | Earthman et al. |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0111705 A1 | 5/2005 | Waupotitsch et al. |
| 2005/0117015 A1 | 6/2005 | Cutler |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0203380 A1 | 9/2005 | Sauer et al. |
| 2005/0205785 A1 | 9/2005 | Hornback et al. |
| 2005/0219264 A1 | 10/2005 | Shum et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0013318 A1 | 1/2006 | Webb et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother et al. |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0119597 A1 | 6/2006 | Oshino |
| 2006/0125936 A1 | 6/2006 | Gruhike et al. |
| 2006/0138322 A1 | 6/2006 | Costello et al. |
| 2006/0139475 A1 | 6/2006 | Esch et al. |
| 2006/0152803 A1 | 7/2006 | Provitola |
| 2006/0153290 A1 | 7/2006 | Watabe et al. |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187322 A1 | 8/2006 | Janson, Jr. et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |

(56) References Cited

U.S. PATENT DOCUMENTS

| | | |
|---|---|---|
| 2006/0210146 A1 | 9/2006 | Gu |
| 2006/0210186 A1 | 9/2006 | Berkner |
| 2006/0214085 A1 | 9/2006 | Olsen et al. |
| 2006/0215879 A1* | 9/2006 | Whitaker .................. G06T 7/11 382/103 |
| 2006/0215924 A1 | 9/2006 | Steinberg et al. |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam et al. |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0116447 A1 | 5/2007 | Ye |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0140685 A1 | 6/2007 | Wu |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0166447 A1 | 7/2007 | Ur-Rehman et al. |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer et al. |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0291995 A1 | 12/2007 | Rivera |
| 2007/0296721 A1 | 12/2007 | Chang et al. |
| 2007/0296832 A1 | 12/2007 | Ota et al. |
| 2007/0296835 A1 | 12/2007 | Olsen et al. |
| 2007/0296846 A1 | 12/2007 | Barman et al. |
| 2007/0296847 A1 | 12/2007 | Chang et al. |
| 2007/0297696 A1 | 12/2007 | Hamza et al. |
| 2008/0006859 A1 | 1/2008 | Mionetto |
| 2008/0019611 A1 | 1/2008 | Larkin et al. |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0044170 A1 | 2/2008 | Yap et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152213 A1 | 6/2008 | Medioni et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0208506 A1 | 8/2008 | Kuwata |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0246866 A1 | 10/2008 | Kinoshita et al. |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0079862 A1 | 3/2009 | Subbotin |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0092363 A1 | 4/2009 | Daum et al. |
| 2009/0096050 A1 | 4/2009 | Park |
| 2009/0102956 A1 | 4/2009 | Georgiev |
| 2009/0103792 A1 | 4/2009 | Rahn et al. |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167923 A1 | 7/2009 | Safaee-Rad et al. |
| 2009/0167934 A1 | 7/2009 | Gupta |
| 2009/0175349 A1 | 7/2009 | Ye et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |

(56) References Cited

U.S. PATENT DOCUMENTS

| | | |
|---|---|---|
| 2009/0207235 A1 | 8/2009 | Francini et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0237662 A1 | 9/2009 | Chang et al. |
| 2009/0245573 A1 | 10/2009 | Saptharishi et al. |
| 2009/0245637 A1 | 10/2009 | Barman et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0273663 A1 | 11/2009 | Yoshida |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0295933 A1 | 12/2009 | Schechner et al. |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang |
| 2010/0045809 A1 | 2/2010 | Packard |
| 2010/0053342 A1 | 3/2010 | Hwang et al. |
| 2010/0053347 A1 | 3/2010 | Agarwala et al. |
| 2010/0053415 A1 | 3/2010 | Yun |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085351 A1 | 4/2010 | Deb et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097444 A1 | 4/2010 | Lablans |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0129048 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | van Hoorebeke et al. |
| 2010/0195716 A1 | 8/2010 | Klein Gunnewiek et al. |
| 2010/0201809 A1 | 8/2010 | Oyama et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0214423 A1 | 8/2010 | Ogawa |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour Tehrani et al. |
| 2010/0259610 A1 | 10/2010 | Petersen |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0277629 A1 | 11/2010 | Tanaka |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0296724 A1 | 11/2010 | Chang et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu |
| 2010/0321640 A1 | 12/2010 | Yeh et al. |
| 2010/0329528 A1 | 12/2010 | Hanjnal et al. |
| 2010/0329556 A1 | 12/2010 | Mitarai et al. |
| 2010/0329582 A1 | 12/2010 | Albu et al. |
| 2011/0001037 A1 | 1/2011 | Tewinkle |
| 2011/0013006 A1 | 1/2011 | Uzenbajakava et al. |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032341 A1 | 2/2011 | Ignatov et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043604 A1 | 2/2011 | Peleg et al. |
| 2011/0043613 A1 | 2/2011 | Rohaly et al. |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0084893 A1 | 4/2011 | Lee et al. |
| 2011/0085028 A1 | 4/2011 | Samadani et al. |
| 2011/0090217 A1 | 4/2011 | Mashitani et al. |
| 2011/0102553 A1 | 5/2011 | Corcoran et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0150321 A1 | 6/2011 | Cheong et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0199458 A1 | 8/2011 | Hayasaka et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211068 A1 | 9/2011 | Yokota |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0222757 A1 | 9/2011 | Yeatman, Jr. et al. |
| 2011/0228142 A1 | 9/2011 | Brueckner et al. |

(56) References Cited

U.S. PATENT DOCUMENTS

| | | |
|---|---|---|
| 2011/0228144 A1 | 9/2011 | Tian et al. |
| 2011/0234825 A1 | 9/2011 | Liu et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung et al. |
| 2011/0255745 A1 | 10/2011 | Hodder et al. |
| 2011/0255786 A1 | 10/2011 | Hunter et al. |
| 2011/0261993 A1 | 10/2011 | Weiming et al. |
| 2011/0267264 A1 | 11/2011 | McCarthy et al. |
| 2011/0267348 A1 | 11/2011 | Lin et al. |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain |
| 2012/0013748 A1 | 1/2012 | Stanwood et al. |
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0026478 A1 | 2/2012 | Chen et al. |
| 2012/0038745 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma et al. |
| 2012/0086803 A1 | 4/2012 | Malzbender et al. |
| 2012/0105590 A1 | 5/2012 | Fukumoto et al. |
| 2012/0105654 A1 | 5/2012 | Kwatra et al. |
| 2012/0105691 A1 | 5/2012 | Wagas et al. |
| 2012/0113232 A1 | 5/2012 | Joblove |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0114260 A1 | 5/2012 | Takahashi et al. |
| 2012/0120264 A1 | 5/2012 | Lee et al. |
| 2012/0127275 A1 | 5/2012 | Von Zitzewitz et al. |
| 2012/0127284 A1 | 5/2012 | Bar-Zeev et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0162374 A1 | 6/2012 | Markas et al. |
| 2012/0163672 A1 | 6/2012 | McKinnon |
| 2012/0163725 A1 | 6/2012 | Fukuhara |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0218455 A1 | 8/2012 | Imai et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0250990 A1 | 10/2012 | Bocirnea |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh |
| 2012/0287291 A1 | 11/2012 | McMahon |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307084 A1 | 12/2012 | Mantzel |
| 2012/0307093 A1 | 12/2012 | Miyoshi |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0002953 A1 | 1/2013 | Noguchi et al. |
| 2013/0003184 A1 | 1/2013 | Duparre |
| 2013/0010073 A1 | 1/2013 | Do et al. |
| 2013/0016245 A1 | 1/2013 | Yuba |
| 2013/0016885 A1 | 1/2013 | Tsujimoto |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0100254 A1 | 4/2013 | Morioka et al. |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu et al. |
| 2013/0123985 A1* | 5/2013 | Hirai ............... G01N 21/21 700/259 |
| 2013/0127988 A1 | 5/2013 | Wang et al. |
| 2013/0128049 A1 | 5/2013 | Schofield et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares et al. |
| 2013/0135448 A1 | 5/2013 | Nagumo et al. |

(56) References Cited

U.S. PATENT DOCUMENTS

| | | |
|---|---|---|
| 2013/0147979 A1 | 6/2013 | McMahon et al. |
| 2013/0155050 A1 | 6/2013 | Rastogi et al. |
| 2013/0162641 A1 | 6/2013 | Zhang et al. |
| 2013/0169754 A1 | 7/2013 | Aronsson et al. |
| 2013/0176394 A1 | 7/2013 | Tian et al. |
| 2013/0208138 A1 | 8/2013 | Li et al. |
| 2013/0215108 A1 | 8/2013 | McMahon et al. |
| 2013/0215231 A1 | 8/2013 | Hiramoto et al. |
| 2013/0216144 A1 | 8/2013 | Robinson et al. |
| 2013/0222556 A1 | 8/2013 | Shimada |
| 2013/0222656 A1 | 8/2013 | Kaneko |
| 2013/0223759 A1 | 8/2013 | Nishiyama |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By |
| 2013/0278631 A1 | 10/2013 | Border et al. |
| 2013/0286236 A1 | 10/2013 | Mankowski |
| 2013/0293760 A1 | 11/2013 | Nisenzon et al. |
| 2013/0308197 A1 | 11/2013 | Duparre |
| 2013/0321581 A1 | 12/2013 | El-Ghoroury et al. |
| 2013/0321589 A1 | 12/2013 | Kirk et al. |
| 2013/0335598 A1 | 12/2013 | Gustavsson et al. |
| 2013/0342641 A1 | 12/2013 | Morioka et al. |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0059462 A1 | 2/2014 | Wernersson |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0081454 A1 | 3/2014 | Nuyujukian et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125760 A1 | 5/2014 | Au et al. |
| 2014/0125771 A1 | 5/2014 | Grossmann et al. |
| 2014/0132810 A1 | 5/2014 | McMahon |
| 2014/0139642 A1 | 5/2014 | Ni et al. |
| 2014/0139643 A1 | 5/2014 | Hogasten et al. |
| 2014/0140626 A1 | 5/2014 | Cho et al. |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183258 A1 | 7/2014 | DiMuro |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0307058 A1 | 10/2014 | Kirk et al. |
| 2014/0307063 A1 | 10/2014 | Lee |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042814 A1 | 2/2015 | Vaziri |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0093015 A1 | 4/2015 | Liang et al. |
| 2015/0095235 A1 | 4/2015 | Dua |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Venkataraman et al. |
| 2015/0199793 A1 | 7/2015 | Venkataraman et al. |
| 2015/0199841 A1 | 7/2015 | Venkataraman et al. |
| 2015/0206912 A1 | 7/2015 | Kanamori et al. |
| 2015/0207990 A1 | 7/2015 | Ford et al. |
| 2015/0228081 A1 | 8/2015 | Kim et al. |
| 2015/0235476 A1 | 8/2015 | McMahon et al. |
| 2015/0237329 A1 | 8/2015 | Venkataraman et al. |
| 2015/0243480 A1 | 8/2015 | Yamada |
| 2015/0244927 A1 | 8/2015 | Laroia et al. |
| 2015/0245013 A1 | 8/2015 | Venkataraman et al. |
| 2015/0248744 A1 | 9/2015 | Hayasaka et al. |
| 2015/0254868 A1 | 9/2015 | Srikanth et al. |
| 2015/0256733 A1 | 9/2015 | Kanamori |
| 2015/0264337 A1 | 9/2015 | Venkataraman et al. |
| 2015/0288861 A1 | 10/2015 | Duparre |
| 2015/0296137 A1 | 10/2015 | Duparre et al. |
| 2015/0312455 A1 | 10/2015 | Venkataraman et al. |

(56) References Cited

U.S. PATENT DOCUMENTS

| | | |
|---|---|---|
| 2015/0317638 A1 | 11/2015 | Donaldson |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0042548 A1 | 2/2016 | Du et al. |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0070030 A1 | 3/2016 | Fujisawa et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0182786 A1 | 6/2016 | Anderson et al. |
| 2016/0191768 A1 | 6/2016 | Shin et al. |
| 2016/0195733 A1 | 7/2016 | Lelescu et al. |
| 2016/0198096 A1 | 7/2016 | McMahon et al. |
| 2016/0209654 A1 | 7/2016 | Riccomini et al. |
| 2016/0210785 A1 | 7/2016 | Balachandreswaran et al. |
| 2016/0216198 A1 | 7/2016 | Sun et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0261844 A1* | 9/2016 | Kadambi ............... G01B 11/24 |
| 2016/0266284 A1 | 9/2016 | Duparre et al. |
| 2016/0267486 A1 | 9/2016 | Mitra et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0309084 A1 | 10/2016 | Venkataraman et al. |
| 2016/0309134 A1 | 10/2016 | Venkataraman et al. |
| 2016/0316140 A1 | 10/2016 | Nayar et al. |
| 2016/0323578 A1 | 11/2016 | Kaneko et al. |
| 2017/0004791 A1 | 1/2017 | Aubineau et al. |
| 2017/0006233 A1 | 1/2017 | Venkataraman et al. |
| 2017/0011405 A1 | 1/2017 | Pandey |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0070753 A1 | 3/2017 | Kaneko |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0109742 A1 | 4/2017 | Varadarajan |
| 2017/0142405 A1 | 5/2017 | Shors et al. |
| 2017/0163862 A1 | 6/2017 | Molina |
| 2017/0178363 A1 | 6/2017 | Venkataraman et al. |
| 2017/0178399 A1 | 6/2017 | Fest |
| 2017/0187933 A1 | 6/2017 | Duparre |
| 2017/0188011 A1 | 6/2017 | Panescu et al. |
| 2017/0244960 A1 | 8/2017 | Ciurea et al. |
| 2017/0257562 A1 | 9/2017 | Venkataraman et al. |
| 2017/0268990 A1 | 9/2017 | Martinello et al. |
| 2017/0337682 A1 | 11/2017 | Liao et al. |
| 2017/0365104 A1 | 12/2017 | McMahon et al. |
| 2018/0005012 A1 | 1/2018 | Aycock et al. |
| 2018/0005244 A1 | 1/2018 | Govindarajan et al. |
| 2018/0007284 A1 | 1/2018 | Venkataraman et al. |
| 2018/0013945 A1 | 1/2018 | Ciurea et al. |
| 2018/0024330 A1 | 1/2018 | Laroia |
| 2018/0035057 A1 | 2/2018 | McMahon et al. |
| 2018/0040135 A1 | 2/2018 | Mullis |
| 2018/0048830 A1 | 2/2018 | Venkataraman et al. |
| 2018/0048879 A1 | 2/2018 | Venkataraman et al. |
| 2018/0081090 A1 | 3/2018 | Duparre et al. |
| 2018/0097993 A1 | 4/2018 | Nayar et al. |
| 2018/0100731 A1 | 4/2018 | Pau |
| 2018/0109782 A1 | 4/2018 | Duparre et al. |
| 2018/0124311 A1 | 5/2018 | Lelescu et al. |
| 2018/0131852 A1 | 5/2018 | McMahon |
| 2018/0139382 A1 | 5/2018 | Venkataraman et al. |
| 2018/0177461 A1 | 6/2018 | Bell et al. |
| 2018/0189767 A1 | 7/2018 | Bigioi |
| 2018/0197035 A1 | 7/2018 | Venkataraman et al. |
| 2018/0211402 A1 | 7/2018 | Ciurea et al. |
| 2018/0227511 A1 | 8/2018 | McMahon |
| 2018/0240265 A1 | 8/2018 | Yang et al. |
| 2018/0270473 A1 | 9/2018 | Mullis |
| 2018/0286120 A1 | 10/2018 | Fleishman et al. |
| 2018/0302554 A1 | 10/2018 | Lelescu et al. |
| 2018/0324334 A1 | 11/2018 | Wippermann et al. |
| 2018/0330182 A1 | 11/2018 | Venkataraman et al. |
| 2018/0376122 A1 | 12/2018 | Park et al. |
| 2019/0012768 A1 | 1/2019 | Tafazoli Bilandi et al. |
| 2019/0037116 A1 | 1/2019 | Molina |
| 2019/0037150 A1 | 1/2019 | Srikanth et al. |
| 2019/0043253 A1 | 2/2019 | Lucas et al. |
| 2019/0052792 A1* | 2/2019 | Baba .................... H04N 5/2256 |
| 2019/0057513 A1 | 2/2019 | Jain et al. |
| 2019/0063905 A1 | 2/2019 | Venkataraman et al. |
| 2019/0089947 A1 | 3/2019 | Venkataraman et al. |
| 2019/0098209 A1 | 3/2019 | Venkataraman et al. |
| 2019/0109998 A1 | 4/2019 | Venkataraman et al. |
| 2019/0164341 A1 | 5/2019 | Venkataraman |
| 2019/0174040 A1 | 6/2019 | Mcmahon |
| 2019/0174077 A1 | 6/2019 | Mitani et al. |
| 2019/0197735 A1 | 6/2019 | Xiong et al. |
| 2019/0215496 A1 | 7/2019 | Mullis et al. |
| 2019/0230348 A1 | 7/2019 | Ciurea et al. |
| 2019/0235138 A1 | 8/2019 | Duparre et al. |
| 2019/0243086 A1 | 8/2019 | Rodda et al. |
| 2019/0244379 A1 | 8/2019 | Venkataraman |
| 2019/0268586 A1 | 8/2019 | Mullis |
| 2019/0289176 A1 | 9/2019 | Duparre |
| 2019/0347768 A1 | 11/2019 | Lelescu et al. |
| 2019/0356863 A1 | 11/2019 | Venkataraman et al. |
| 2019/0362515 A1 | 11/2019 | Ciurea et al. |
| 2019/0364263 A1 | 11/2019 | Jannard et al. |
| 2020/0012119 A1 | 1/2020 | Pezzaniti et al. |
| 2020/0026948 A1 | 1/2020 | Venkataraman et al. |
| 2020/0034998 A1 | 1/2020 | Schlemper et al. |
| 2020/0151894 A1 | 5/2020 | Jain et al. |
| 2020/0162680 A1 | 5/2020 | Mitani et al. |
| 2020/0195862 A1* | 6/2020 | Briggs ............... G06K 9/00791 |
| 2020/0204729 A1 | 6/2020 | Kurita et al. |
| 2020/0252597 A1 | 8/2020 | Mullis |
| 2020/0311418 A1* | 10/2020 | Mahadeswaraswamy ................. H04N 9/3167 |
| 2020/0334905 A1 | 10/2020 | Venkataraman |
| 2020/0389604 A1 | 12/2020 | Venkataraman et al. |
| 2021/0042952 A1 | 2/2021 | Jain et al. |
| 2021/0044790 A1 | 2/2021 | Venkataraman et al. |
| 2021/0063141 A1 | 3/2021 | Venkataraman et al. |
| 2021/0081698 A1 | 3/2021 | Lindeman et al. |
| 2021/0089807 A1 | 3/2021 | Liu et al. |
| 2021/0133927 A1 | 5/2021 | Lelescu et al. |
| 2021/0150748 A1 | 5/2021 | Ciurea et al. |

FOREIGN PATENT DOCUMENTS

| | | |
|---|---|---|
| CN | 1669332 A | 9/2005 |
| CN | 1727991 A | 2/2006 |
| CN | 1839394 A | 9/2006 |
| CN | 1985524 A | 6/2007 |
| CN | 1992499 A | 7/2007 |
| CN | 101010619 A | 8/2007 |
| CN | 101046882 A | 10/2007 |
| CN | 101064780 A | 10/2007 |
| CN | 101102388 A | 1/2008 |
| CN | 101147392 A | 3/2008 |
| CN | 201043890 Y | 4/2008 |
| CN | 101212566 A | 7/2008 |
| CN | 101312540 A | 11/2008 |
| CN | 101427372 A | 5/2009 |

(56) References Cited

FOREIGN PATENT DOCUMENTS

| | | |
|---|---|---|
| CN | 101433458 | 5/2009 |
| CN | 101551586 A | 10/2009 |
| CN | 101593350 A | 12/2009 |
| CN | 101606086 A | 12/2009 |
| CN | 101785025 A | 7/2010 |
| CN | 101883291 A | 11/2010 |
| CN | 102037717 A | 4/2011 |
| CN | 102164298 A | 8/2011 |
| CN | 102184720 A | 9/2011 |
| CN | 102375199 A | 3/2012 |
| CN | 103004180 A | 3/2013 |
| CN | 103765864 A | 4/2014 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 105409212 A | 3/2016 |
| CN | 103765864 B | 7/2017 |
| CN | 106989675 | 7/2017 |
| CN | 104081414 B | 8/2017 |
| CN | 104662589 B | 8/2017 |
| CN | 107077743 A | 8/2017 |
| CN | 107230236 A | 10/2017 |
| CN | 107346061 A | 11/2017 |
| CN | 107404609 A | 11/2017 |
| CN | 104685513 B | 4/2018 |
| CN | 107924572 A | 4/2018 |
| CN | 108307675 A | 7/2018 |
| CN | 104335246 B | 9/2018 |
| CN | 107404609 B | 2/2020 |
| CN | 107346061 B | 4/2020 |
| CN | 111537072 | 8/2020 |
| CN | 107230236 B | 12/2020 |
| CN | 108307675 B | 12/2020 |
| CN | 107077743 B | 3/2021 |
| DE | 602011041799.1 | 9/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 1991145 A1 | 11/2008 |
| EP | 1243945 B1 | 1/2009 |
| EP | 2026563 A1 | 2/2009 |
| EP | 2031592 A1 | 3/2009 |
| EP | 2041454 A2 | 4/2009 |
| EP | 2072785 A1 | 6/2009 |
| EP | 2104334 A1 | 9/2009 |
| EP | 2136345 A1 | 12/2009 |
| EP | 2156244 A1 | 2/2010 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2386554 A1 | 11/2011 |
| EP | 2462477 A1 | 6/2012 |
| EP | 2502115 A2 | 9/2012 |
| EP | 2569935 A1 | 3/2013 |
| EP | 2652678 A1 | 10/2013 |
| EP | 2677066 A1 | 12/2013 |
| EP | 2708019 A1 | 3/2014 |
| EP | 2761534 A1 | 8/2014 |
| EP | 2777245 A1 | 9/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 2973476 A1 | 1/2016 |
| EP | 3066690 A1 | 9/2016 |
| EP | 2569935 B1 | 12/2016 |
| EP | 3201877 A1 | 8/2017 |
| EP | 2652678 B1 | 9/2017 |
| EP | 3284061 A1 | 2/2018 |
| EP | 3286914 A1 | 2/2018 |
| EP | 3201877 A4 | 3/2018 |
| EP | 2817955 B1 | 4/2018 |
| EP | 3328048 A1 | 5/2018 |
| EP | 3075140 B1 | 6/2018 |
| EP | 3201877 B1 | 12/2018 |
| EP | 3467776 A1 | 4/2019 |
| EP | 2708019 B1 | 10/2019 |
| EP | 3286914 B1 | 12/2019 |
| EP | 2761534 B1 | 11/2020 |
| EP | 2888720 B1 | 3/2021 |
| EP | 3328048 B1 | 4/2021 |
| GB | 2482022 A | 1/2012 |
| IN | 2708/CHENP/2014 A1 | 8/2015 |
| IN | 361194 | 3/2021 |
| JP | 59-025483 | 2/1984 |
| JP | 64-037177 | 2/1989 |
| JP | 02-285772 A | 11/1990 |
| JP | 06129851 A | 5/1994 |
| JP | 07-015457 A | 1/1995 |
| JP | H0756112 A | 3/1995 |
| JP | 09171075 A | 6/1997 |
| JP | 09181913 A | 7/1997 |
| JP | 10253351 A | 9/1998 |
| JP | 11142609 A | 5/1999 |
| JP | 11223708 A | 8/1999 |
| JP | 11325889 A | 11/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002209226 A | 7/2002 |
| JP | 2002250607 A | 9/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2010139288 A | 6/2010 |
| JP | 2011017764 A | 1/2011 |
| JP | 2011030184 A | 2/2011 |
| JP | 2011109484 A | 6/2011 |
| JP | 2011523538 A | 8/2011 |
| JP | 2011203238 A | 10/2011 |
| JP | 2012504805 A | 2/2012 |
| JP | 2011052064 A1 | 3/2013 |
| JP | 2013509022 A | 3/2013 |
| JP | 2013526801 A | 6/2013 |
| JP | 2014519741 A | 8/2014 |
| JP | 2014521117 A | 8/2014 |
| JP | 2014535191 A | 12/2014 |
| JP | 2015022510 A | 2/2015 |
| JP | 2015522178 A | 8/2015 |

(56) References Cited

FOREIGN PATENT DOCUMENTS

| | | |
|---|---|---|
| JP | 2015534734 A | 12/2015 |
| JP | 5848754 B2 | 1/2016 |
| JP | 2016524125 A | 8/2016 |
| JP | 6140709 | 5/2017 |
| JP | 2017519380 | 7/2017 |
| JP | 2017163550 A | 9/2017 |
| JP | 2017163587 A | 9/2017 |
| JP | 2017531976 A | 10/2017 |
| JP | 6546613 B2 | 7/2019 |
| JP | 2019-220957 A | 12/2019 |
| JP | 6630891 B2 | 12/2019 |
| JP | 2020017999 A | 1/2020 |
| JP | 6767543 B2 | 9/2020 |
| JP | 6767558 B2 | 9/2020 |
| KR | 1020050004239 A | 1/2005 |
| KR | 100496875 B1 | 6/2005 |
| KR | 10201100976 47 A | 8/2011 |
| KR | 20140045373 A | 4/2014 |
| KR | 20170063827 A | 6/2017 |
| KR | 101824672 B1 | 2/2018 |
| KR | 101843994 B1 | 3/2018 |
| KR | 101973822 B1 | 4/2019 |
| KR | 10-2002165 B1 | 7/2019 |
| KR | 10-2111181 B1 | 5/2020 |
| SG | 191151 A1 | 7/2013 |
| SG | 11201500910 R | 10/2015 |
| TW | 200828994 A | 7/2008 |
| TW | 200939739 A | 9/2009 |
| TW | 201228382 A | 7/2012 |
| TW | I535292 B | 5/2016 |
| WO | 1994020875 A3 | 9/1994 |
| WO | 2005057922 A1 | 6/2005 |
| WO | 2006039906 A2 | 4/2006 |
| WO | 2006039906 A3 | 4/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011026527 A1 | 3/2011 |
| WO | 2011046607 A2 | 4/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011121117 A1 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014131038 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015048906 A1 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |
| WO | 2015183824 A1 | 12/2015 |
| WO | 2016054089 A1 | 4/2016 |
| WO | 2016/172125 | 10/2016 |
| WO | 2016167814 A1 | 10/2016 |
| WO | 2016172125 A9 | 4/2017 |
| WO | WO 2016/136086 | 12/2017 |
| WO | 2018053181 A1 | 3/2018 |
| WO | 2019038193 A1 | 2/2019 |

OTHER PUBLICATIONS

Kadambi et al. "Polarized 3D: High-Quality Depth Sensing with Polarization Cues". (Year: 2015).*
Ansari et al., "3-D Face Modeling Using Two Views and a Generic Face Model with Application to 3-D Face Recognition", Proceedings of the IEEE Conference on Advanced Video and Signal Based Surveillance, Jul. 22, 2003, 9 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.
Banz et al., "Real-Time Semi-Global Matching Disparity Estimation on the GPU", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", Computer Graphics Kacm Siggraph Proceedings), Jul. 25, 2006, published Jul. 30, 2006, 1 pg.
Bennett et al., "Multispectral Video Fusion", Computer Graphics (ACM SIGGRAPH Proceedings), Jul. 25, 2006, published Jul. 30, 2006, 1 pg.
Bennett et al., "Face Recognition by Super-Resolved 3D Models from Consumer Depth Cameras", IEEE Transactions on Information Forensics and Security, vol. 9, No. 9, Sep. 2014, pp. 1436-1448.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.

(56) References Cited

OTHER PUBLICATIONS

Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Blanz et al., "A Morphable Model for The Synthesis of 3D Faces", In Proceedings of ACM SIGGRAPH 1999, Jul. 1, 1999, pp. 187-194.
Borman, "Topics in Multiframe Superresolution Restoration", Thesis of Sean Borman, Apr. 2004, 282 pgs.
Borman et al., "Image Sequence Processing", Dekker Encyclopedia of Optical Engineering, Oct. 14, 2002, 81 pgs.
Borman et al., "Linear models for multi-frame super-resolution restoration under non-affine registration and spatially varying PSF", Proc. SPIE, May 21, 2004, vol. 5299, 12 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.
Borman et al., "Image Resampling and Constraint Formulation for Multi-Frame Super-Resolution Restoration", Proc SPIE, Dec. 28, 1998, vol. 3653, 10 pgs.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc, of SPIE - IS&T Electronic Imaging, Feb. 3, 2009, vol. 7246, pp. 72460X-1-72460X-9; doi: 10.1117/12.810369.
Bruckner et al., "Thin wafer-level camera lenses inspired by insect compound eyes", Optics Express, Nov. 22, 2010, vol. 18, No. 24, pp. 24379-24394.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone. 0045301, 9 pgs.
Bulat et al., "How far are we from solving the 2D & 3D Face Alignment problem? (and a dataset of 230,000 3D facial landmarks)", arxiv.org, Cornell University Library, 201 Olin Library Cornell University Ithaca, NY 14853, Mar. 21, 2017.
Cai et al., "3D Deformable Face Tracking with a Commodity Depth Camera", Proceedings of the European Conference on Computer Vision: Part III, Sep. 5-11, 2010, 14pgs.
Capel, "Image Mosaicing and Super-resolution", Retrieved on Nov. 10, 2012, Retrieved from the Internet at URL:<http://citeseerx.ist.psu.edu/viewdoc/download?doi=10.1.1.226.2643&rep=rep1 &type=pdf>, 2001, 269 pgs.
Caron et al., "Multiple camera types simultaneous stereo calibration, Robotics and Automation (ICRA)", 2011 IEEE International Conference On, May 1, 2011 (May 1, 2011), pp. 2933-2938.
Carroll et al., "Image Warps for Artistic Perspective Manipulation", ACM Transactions on Graphics (TOG), vol. 29, No. 4, Jul. 26, 2010, Article No. 127, 9 pgs.
Chan et al., "Investigation of Computational Compound-Eye Imaging System with Super-Resolution Reconstruction", IEEE, ISASSP, Jun. 19, 2006, pp. 1177-1180.

Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Super-resolution reconstruction in a computational compound-eye imaging system", Multidim. Syst. Sign. Process, published online Feb. 23, 2007, vol. 18, pp. 83-101.
Chen et al., "Interactive deformation of light fields", Symposium on Interactive 3D Graphics, 2005, pp. 139-146.
Chen et al., "KNN Matting", IEEE Transactions on Pattern Analysis and Machine Intelligence, Sep. 2013, vol. 35, No. 9, pp. 2175-2188.
Chen et al., "KNN matting", 2012 IEEE Conference on Computer Vision and Pattern Recognition, Jun. 16-21, 2012, Providence, RI, USA, pp. 869-876.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "Human Face Modeling and Recognition Through Multi-View High Resolution Stereopsis", IEEE Conference on Computer Vision and Pattern Recognition Workshop, Jun. 17-22, 2006, 6 pgs.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Dainese et al., "Accurate Depth-Map Estimation For 3D Face Modeling", IEEE European Signal Processing Conference, Sep. 4-8, 2005, 4 pgs.
Debevec et al., "Recovering High Dynamic Range Radiance Maps from Photographs", Computer Graphics (ACM SIGGRAPH Proceedings), Aug. 16, 1997, 10 pgs.
Do, Minh N. "Immersive Visual Communication with Depth", Presented at Microsoft Research, Jun. 15, 2011, Retrieved from http://minhdo.ece.illinois.edu/talks/ImmersiveComm.pdf, 42 pgs.
Do et al., Immersive Visual Communication, IEEE Signal Processing Magazine, vol. 28, Issue 1, Jan. 2011, DOI: 10.1109/MSP.2010. 939075, Retrieved from: http://minhdo.ece.illinois.edu/publications/ImmerComm_SPM.pdf, pp. 58-66.
Dou et al., "End-to-end 3D face reconstruction with deep neural networks", arXiv:1704.05020v1, Apr. 17, 2017, 10 pgs.
Drouin et al., "Improving Border Localization of Multi-Baseline Stereo Using Border-Cut", International Journal of Computer Vision, Jul. 5, 2006, vol. 83, Issue 3, 8 pgs.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drulea et al., "Motion Estimation Using the Correlation Transform", IEEE Transactions on Image Processing, Aug. 2013, vol. 2 2, No. 8, pp. 3260-3270, first published May 14, 2013.
Duparre et al., "Microoptical artificial compound eyes—from design to experimental verification of two different concepts", Proc, of SPIE, Optical Design and Engineering II, vol. 5962, Oct. 17, 2005, pp. 59622A-1-59622A-12.
Duparre et al., Novel Optics/Micro-Optics for Miniature Imaging Systems, Proc, of SPIE, Apr. 21, 2006, vol. 6196, pp. 619607-1-619607-15.
Duparre et al., "Micro-optical artificial compound eyes", Bioinspiration & Biomimetics, Apr. 6, 2006, vol. 1, pp. R1-R16.
Duparre et al., "Artificial compound eye zoom camera", Bioinspiration & Biomimetics, Nov. 21, 2008, vol. 3, pp. 1-6.

(56) References Cited

OTHER PUBLICATIONS

Duparre et al., "Artificial apposition compound eye fabricated by micro-optics technology", Applied Optics, Aug. 1, 2004, vol. 4 3, No. 2 2, pp. 4303-4310.
Duparre et al., "Micro-optically fabricated artificial apposition compound eye", Electronic Imaging—Science and Technology, Prod. SPIE 5301, Jan. 2004, pp. 25-33.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Artificial compound eyes—different concepts and their application to ultra flat image acquisition sensors", MOEMS and Miniaturized Systems IV, Proc. SPIE 5346, Jan. 24, 2004, pp. 89-100.
Duparre et al., "Ultra-Thin Camera Based on Artificial Apposition Compound Eyes", 10th Microoptics Conference, Sep. 1-3, 2004, 2 pgs.
Duparre et al., "Microoptical telescope compound eye", Optics Express, Feb. 7, 2005, vol. 13, No. 3, pp. 889-903.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Microoptical Artificial Compound Eyes—Two Different Concepts for Compact Imaging Systems", 11th Microoptics Conference, Oct. 30-Nov. 2, 2005, 2 pgs.
Eng et al., "Gaze correction for 3D tele-immersive communication system", IVMSP Workshop, 2013 IEEE 11th. IEEE, Jun. 10, 2013.
Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 2009, 163 pgs.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Fangmin et al., "3D Face Reconstruction Based on Convolutional Neural Network", 2017 10th International Conference on Intelligent Computation Technology and Automation, Oct. 9-10, 2017, Changsha, China.
Farrell et al., "Resolution and Light Sensitivity Tradeoff with Pixel Size", Proceedings of the SPIE Electronic Imaging 2006 Conference, Feb. 2, 2006, vol. 6069, 8 pgs.
Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fechteler et al., Fast and High Resolution 3D Face Scanning, IEEE International Conference on Image Processing, Sep. 16-Oct. 19, 2007, 4 pgs.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 49-58.
Fischer et al., "Optical System Design", 2nd Edition, SPIE Press, Feb. 14, 2008, pp. 191-198.
Garg et al., "Unsupervised CNN for Single View Depth Estimation Geometry to the Rescue", In European Conference on Computer Vision, Springer, Cham, Jul. 2016, 16 pgs.
Gastal et al., "Shared Sampling for Real-Time Alpha Matting", Computer Graphics Forum, EUROGRAPHICS 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Godard et al., "Unsupervised Monocular Depth Estimation with Left-Right Consistency", In Proceedings of the IEEE Conference on Computer Vision and Pattern Recognition, 2017, 14 pgs.
Goldman et al., "Video Object Annotation, Navigation, and Composition", In Proceedings of UIST 2008, Oct. 19-22, 2008, Monterey CA, USA, pp. 3-12.
Goodfellow et al., "Generative Adversarial Nets, 2014. Generative adversarial nets", In Advances in Neural Information Processing Systems (pp. 2672-2680).
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez et al., "Laser Scan Quality 3-D Face Modeling Using a Low-Cost Depth Camera", 20th European Signal Processing Conference, Aug. 27-31, 2012, Bucharest, Romania, pp. 1995-1999.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Higo et al., "A Hand-held Photometric Stereo Camera for 3-D Modeling", IEEE International Conference on Computer Vision, 2009, pp. 1234-1241.
Hirschmuller, "Accurate and Efficient Stereo Processing by Semi-Global Matching and Mutual Information", IEEE Conference on Computer Vision and Pattern Recognition (CVPR), San Diego, CA, USA, Jun. 20-26, 2005, 8 pgs.
Hirschmuller et al., "Memory Efficient Semi-Global Matching, ISPRS Annals of the Photogrammetry", Remote Sensing and Spatial Information Sciences, vol. I-3, 2012, XXII ISPRS Congress, Aug. 25-Sep. 1, 2012, Melbourne, Australia, 6 pgs.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-Tight-modulators/ on Oct. 13, 2017, 4 pgs.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pgs.

(56) References Cited

OTHER PUBLICATIONS

Horisaki et al., "Superposition Imaging for Three-Dimensionally Space-Invariant Point Spread Functions", Applied Physics Express, Oct. 13, 2011, vol. 4, pp. 112501-1-112501-3.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horn et al., "LightShop: Interactive Light Field Manipulation and Rendering", In Proceedings of I3D, Jan. 1, 2007, pp. 121-128.
Hossain et al., "Inexpensive Construction of a 3D Face Model from Stereo Images", IEEE International Conference on Computerand Information Technology, Dec. 27-29, 2007, 6 pgs.
Hu et al., "A Quantitative Evaluation of Confidence Measures for Stereo Vision", IEEE Transactions on Pattern Analysis and Machine Intelligence, vol. 34, Issue 11, Nov. 2012, pp. 2121-2133.
Humenberger ER al., "A Census-Based Stereo Vision Algorithm Using Modified Semi-Global Matching and Plane Fitting to Improve Matching Quality", IEEE Computer Society Conference on Computer Vision and Pattern Recognition Workshops (CVPRW), IEEE, Jun. 13-18, 2010, San Francisco, CA, 8 pgs.
Isaksen et al., "Dynamically Reparameterized Light Fields", In Proceedings of SIGGRAPH 2000, 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Jackson et al., "Large Post 3D Face Reconstruction from a Single Image via Direct Volumetric CNN Regression", arXiv: 1703.07834v2, Sep. 8, 2017, 9 pgs.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
Joshi, Color Calibration for Arrays of Inexpensive Image Sensors, Mitsubishi Electric Research Laboratories, Inc., TR2004-137, Dec. 2004, 6 pgs.
Joshi et al., "Synthetic Aperture Tracking: Tracking Through Occlusions", I CCV IEEE 11th International Conference on Computer Vision; Publication [online], Oct. 2007 [retrieved Jul. 28, 2014], Retrieved from the Internet: <URL http:l/ieeexplore.ieee.org/stamp/stamp.jsp?tp=&arnumber=4409032&isnumber=4408819>, pp. 1-8.
Jourabloo, "Large-Pose Face Alignment via CNN-Based Dense 3D Model Fitting", I CCV IEEE 11th International Conference on Computer Vision; Publication [online], Oct. 2007 [retrieved Jul. 28, 2014], Retrieved from the Internet: <URL http:l/ieeexplore.IEEE.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. I-103-I-110.
Keeton, "Memory-Driven Computing", Hewlett Packard Enterprise Company, Oct. 20, 2016, 45 pgs.
Kim, "Scene Reconstruction from a Light Field", Master Thesis, Sep. 1, 2010 (Sep. 1, 2010), pp. 1-72.
Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pages.
Kitamura et al., "Reconstruction of a high-resolution image on a compound-eye image-capturing system", Applied Optics, Mar. 10, 2004, vol. 43, No. 8, pp. 1719-1727.
Kittler et al., "3D Assisted Face Recognition: A Survey of 3D Imaging, Modelling, and Recognition Approaches", Proceedings of the IEEE Computer Society Conference on Computer Vision and Pattern Recognition, Jul. 2005, 7 pgs.
Konolige, Kurt "Projected Texture Stereo", 2010 IEEE International Conference on Robotics and Automation, May 3-7, 2010, pp. 148-155.
Kotsia et al., "Facial Expression Recognition in Image Sequences Using Geometric Deformation Features and Support Vector Machines", IEEE Transactions on Image Processing, Jan. 2007, vol. 16, No. 1, pp. 172-187.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., DOI:10.1109/ICRA.201135980382.
Lane et al., "A Survey of Mobile Phone Sensing", IEEE Communications Magazine, vol. 48, Issue 9, Sep. 2010, pp. 140-150.
Lao et al., "3D template matching for pose invariant face recognition using 3D facial model built with isoluminance line based stereo vision", Proceedings 15th International Conference on Pattern Recognition, Sep. 3-7, 2000, Barcelona, Spain, pp. 911-916.
Lee, "NFC Hacking: The Easy Way", Defcon Hacking Conference, 2012, 24 pgs.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal matting", CVPR 2011, Jun. 20-25, 2011, pp. 2193-2200.
Lee et al., "Automatic Upright Adjustment of Photographs", IEEE Conference on Computer Vision and Pattern Recognition (CVPR), 2012, pp. 877-884.
Lensvector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), 2006, vol. 1, pp. 61-68.
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, 1996, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images with Different Focuses Using Support Vector Machines", IEEE Transactions on Neural Networks, vol. 15, No. 6, Nov. 8, 2004, pp. 1555-1561.
Lim, "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, p. 147:1-147:10.
Ma et al., "Constant Time Weighted Median Filtering for Stereo Matching and Beyond", ICCV'13 Proceedings of the 2013 IEEE International Conference on Computer Vision, IEEE Computer Society, Washington DC, USA, Dec. 1-8, 2013, 8 pgs.
Martinez et al., "Simple Telemedicine for Developing Regions: Camera Phones and Paper-Based Microfluidic Devices for Real-

(56) References Cited

OTHER PUBLICATIONS

Time, Off-Site Diagnosis", Analytical Chemistry (American Chemical Society), vol. 80, No. 10, May 15, 2008, pp. 3699-3707.
McGuire et al., "Defocus video matting", ACM Transactions on Graphics (TOG)—Proceedings of ACM SIGGRAPH 2005, vol. 24, Issue 3, Jul. 2005, pp. 567-576.
Medioni et al., "Face Modeling and Recognition in 3-D", Proceedings of the IEEE International Workshop on Analysis and Modeling of Faces and Gestures, 2013, 2 pgs.
Merkle et al., "Adaptation and optimization of coding algorithms for mobile 3DTV", Mobile3DTV Project No. 216503, Nov. 2008, 55 pgs.
Michael et al., "Real-time Stereo Vision: Optimizing Semi-Global Matching", 2013 IEEE Intelligent Vehicles Symposium (IV), IEEE, Jun. 23-26, 2013, Australia, 6 pgs.
Milella et al., "3D reconstruction and classification of natural environments by an autonomous vehicle using multi-baseline stereo", Intelligent Service Robotics, vol. 7, No. 2, Mar. 2, 2014, pp. 79-92.
Min et al., "Real-Time 3D Face Identification from a Depth Camera", Proceedings of the IEEE International Conference on Pattern Recognition, Nov. 11-15, 2012, 4 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pgs.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Ng et al., "Light Field Photography with a Hand-held Plenoptic Camera", Stanford Tech Report CTSR Feb. 2005, Apr. 20, 2005, pp. 1-11.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nguyen et al., "Error Analysis for Image-Based Rendering with Depth Information", IEEE Transactions on Image Processing, vol. 18, Issue 4, Apr. 2009, pp. 703-716.
Nishihara, H.K. "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Super-Resolution Image Reconstruction", IEEE Signal Processing Magazine, May 2003, pp. 21-36.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "3D Face Reconstruction from Stereo Video", First International Workshop on Video Processing for Security, Jun. 7-9, 2006, Quebec City, Canada, 2006, 8 pgs.
Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs.
Polight, "Designing Imaging Products Using Reflowable Autofocus Lenses", printed Nov. 2, 2012 from http://www.polight.no/tunable-polymer-autofocus-lens-html-11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds from Real World Events", Proc. of IEEE Visualization '97, Phoenix, Arizona, Oct. 19-24, 1997, pp. 277-283, 552.
Ranjan et al., "HyperFace: A Deep Multi-Task Learning Framework for Face Detection, Landmark Localization, Pose Estimation, and Gender Recognition", May 11, 2016 (May 11, 2016), pp. 1-16.
Rhemann et al., "Fast Cost-vol. Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction: A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Rusinkiewicz et al., "Real-Time 3D Model Acquisition", ACM Transactions on Graphics (TOG), vol. 21, No. 3, Jul. 2002, pp. 438-446.
Saatci et al., "Cascaded Classification of Gender and Facial Expression using Active Appearance Models", IEEE, FGR'06, 2006, 6 pgs.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Seitz et al., "Plenoptic Image Editing", International Journal of Computer Vision 48, Conference Date Jan. 7, 1998, 29 pgs., DOI: 10.1109/ICCV.1998.710696 Source: DBLP Conference: Computer Vision, Sixth International Conference.
Shechtman et al., "Increasing Space-Time Resolution in Video", European Conference on Computer Vision, LNCS 2350, May 28-31, 2002, pp. 753-768.
Shotton et al., "Real-time human pose recognition in parts from single depth images", CVPR 2011, Jun. 20-25, 2011, Colorado Springs, CO, USA, pp. 1297-1304.

(56) References Cited

OTHER PUBLICATIONS

Shum et al., "Pop-Up Light Field: An Interactive Image-Based Modeling and Rendering System", Apr. 2004, ACM Transactions on Graphics, vol. 23, No. 2, pp. 143-162, Retrieved from http://131.107.65.14/en-us/um/people/jiansun/papers/PopupLightField_TOG.pdf on Feb. 5, 2014.
Shum et al., "A Review of Image-based Rendering Techniques", Visual Communications and Image Processing 2000, May 2000, 12 pgs.
Sibbing et al., "Markerless reconstruction of dynamic facial expressions", 2009 IEEE 12th International Conference on Computer Vision Workshops, ICCV Workshop: Kyoto, Japan, Sep. 27-Oct. 4, 2009, Institute of Electrical and Electronics Engineers, Piscataway, NJ, Sep. 27, 2009 (Sep. 27, 2009), pp. 1778-1785.
Silberman et al., "Indoor segmentation and support inference from RGBD images", ECCV'12 Proceedings of the 12th European conference on Computer Vision, vol. PartV, Oct. 7-13, 2012, Florence, Italy, pp. 746-760.
Stober, "Stanford researchers developing 3-D camera with 12,616 lenses", Stanford Report, Mar. 19, 2008, Retrieved from http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding fora Distributed Multiview Coding System Using a Coset Code", Hindawi Publishing Corporation, EURASIP Journal on Image and Video Processing, vol. 2009, Article ID 251081, Online: Apr. 22, 2009, 12 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Thin observation module by bound optics (TOMBO) concept and experimental verification", Applied Optics, Apr. 10, 2001, vol. 40, No. 11, pp. 1806-1813.
Tanida et al., "Color imaging with an integrated compound imaging system", Optics Express, Sep. 8, 2003, vol. 11, No. 18, pp. 2109-2117.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer, vol. 77, No. 9, Sep. 1996, pp. 93-100.
Tseng et al., "Automatic 3-D depth recovery from a single urban-scene image", 2012 Visual Communications and Image Processing, Nov. 27-30, 2012, San Diego, CA, USA, pp. 1-6.
Uchida et al., 3D Face Recognition Using Passive Stereo Vision, IEEE International Conference on Image Processing 2005, Sep. 14, 2005, 4 pgs.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Using Plane + Parallax for Calibrating Dense Camera Arrays", IEEE Conference on Computer Vision and Pattern Recognition (CVPR), 2004, 8 pgs.
Vaish et al., "Synthetic Aperture Focusing Using a Shear-Warp Factorization of the Viewing Transform", IEEE Workshop on A3DISS, CVPR, 2005, 8 pgs.
Van Der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park-Observational Astronomy (ASTR 310), Oct. 19, 2006, pp. 1-5 (online), [retrieved on May 13, 2014], Retrieved from the Internet <URL http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pgs.
Wang, "Calculation of Image Position, Size and Orientation Using First Order Properties", Dec. 29, 2010, OPTI521 Tutorial, 10 pgs.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pg., published Aug. 5, 2007.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Facial Feature Point Detection: A Comprehensive Survey", arXiv: 1410.1037v1, Oct. 4, 2014, 32 pgs..
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Widanagamaachchi et al., "3D Face Recognition from 2D Images: A Survey", Proceedings of the International Conference on Digital Image Computing: Techniques and Applications, Dec. 1-3, 2008, 7 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of Yefractive ellipsoidal micro-lenses for an apposition eye camera objective", Proceedings of SPIE, Optical Design and Engineering II, Oct. 15, 2005, pp. 59622C-1-59622C-11.
Wu et al., "A virtual view synthesis algorithm based on image inpainting", 2012 Third International Conference on Networking and Distributed Computing, Hangzhou, China, Oct. 21-24, 2012, pp. 153-156.
Xu, "Real-Time Realistic Rendering and High Dynamic Range Image Display and Compression", Dissertation, School of Com-

(56) References Cited

OTHER PUBLICATIONS puter Science in the College of Engineering and Computer Science at the University of Central Florida, Orlando, Florida, Fall Term 2005, 192 pgs.
Yang et al., "Superresolution Using Preconditioned Conjugate Gradient Method", Proceedings of SPIE—The International Society for Optical Engineering, Jul. 2002, 8 pgs.
Yang et al., "A Real-Time Distributed Light Field Camera", Eurographics Workshop on Rendering (2002), published Jul. 26, 2002, pp. 1-10.
Yang et al., Model-based Head Pose Tracking with Stereovision, Microsoft Research, Technical Report, MSR-TR-2001-102, Oct. 2001, 12 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zbontar et al., Computing the Stereo Matching Cost with a Convolutional Neural Network, CVPR, 2015, pp. 1592-1599.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet camera", proceedings of SPIE, vol. 7705, Apr. 23, 2010, pp. 770505-770505-8, XP055113797 ISSN: 0277-786X, DOI: 10.1117/12.852171.
Zhang et al., "Spacetime Faces: High Resolution Capture for Modeling and Animation", ACM Transactions on Graphics, 2004, 11pgs.
Zheng et al., "Balloon Motion Estimation Using Two Frames", Proceedings of the Asilomar Conference on Signals, Systems and Computers, IEEE, Comp. Soc. Press, US, vol. 2 of 2, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.
"File Formats Version 6", Alias Systems, 2004, 40 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
"Exchangeable image file format for digital still cameras: Exif Version 2.2"_, Japan Electronics and Information Technology Industries Association, Prepared by Technical Standardization Committee on AV & IT Storage.
Systems and Equipment, JEITA CP-3451, Apr. 2002, Retrieved from http://www.exif.org/Exif2-2.PDF, 154 pgs.
International Search Report and Written Opinion for International Application No. PCT/US20/54641, dated Feb. 17, 2021, 13 pages.
Cui, Zhaopeng, et al. "Polarimetric multi-view stereo." *Proceedings of the IEEE conference on computer vision and pattern recognition.* 2017, pp. 1558-1567.
Kadambi, Achuta, et al. "Polarized 3d: High-quality depth sensing with polarization cues." *Proceedings of the IEEE International Conference on Computer Vision.* 2015, pp. 3370-3378.
Yvain Quéau, Jean-Denis Durou, Jean-Frangois Aujol. Normal Integration: A Survey. 2016. hal-01334349v4, 19 pages.
Arnab et al. "Pixelwise instance segmentation with a dynamically instantiated network," In: Proceedings of the IEEE Conference on Computer Vision and Pattern Recognition, Apr. 7, 2017, Retrieved on Oct. 26, 2020 from https://openaccess.thecvf.com/content_cvpr_2017/papers/Arnab_Pixelwise_Instance_Seqmentation_CFPR_2017_paper.pdf, 11 pages.
Atkinson et al. "High-sensitivity analysis of polarization by surface reflection" In: Machine Vision and Applications, Aug. 3, 2018, Retrieved on Oct. 26, 2020 from https://link.springer.com/content/pdf/10.1007/s00138-018-0962-7.pdf, 19 pages.
Azorin-Lopez, Jorge, et al. "A Novel Active Imaging Model to Design Visual Systems: A Case of Inspection System for Specular Surfaces." Sensors 17.7 (2017): 1466, 30 pages.
Bai et al. "Deep watershed transform for instance segmentation," In: Proceedings of the IEEE Conference on Computer Vision and Pattern Recognition, Nov. 24, 2016, Retrieved on Oct. 26, 2020 from https://openaccess.thecvf.com/content_cvpr_2017/papers/Bai_Deep_Watershed_Transform_CVPR_2017_paper.pdf, 10 pages.
Bajard, Alban, et al. "Non conventional Imaging Systems for 3D Digitization of transparent and/or specular manufactured objects." QCAV2013, 11th Interntional Conference on Quality Control by Artificial Vision. 2013, 9 pages.
Barnes, Bryan M., et al. "Enhancing 9 nm Node Dense Patterned Defect Optical Inspection using Polarization, Angle, and Focus." Metrology, Inspection, and Process Control for Microlithography XXVII. vol. 8681. International Society for Optics and Photonics, 2013, 8 pages.
Brugés Martelo, Javier, et al. "Paperboard Coating Detection Based on Full-Stokes Imaging Polarimetry." Sensors 21.1 (2021): 208, 14 pages.
Chen, Hua, et al. "Polarization Phase-Based Method For Material Classification In Computer Vision," International Journal of Computer Vision 28(1), 1996, pp. 73-83.
He et al. Mask r-cnn, In *Proceedings of the IEEE International Conference on Computer Vision*, pp. 2961-2969, 2017.
Kirillov et al., "Instancecut: from edges to instances with multicut," In: Proceedings of the IEEE Conference on Computer Vision and Pattern Recognition, Nov. 24, 2016, Retrieved on Oct. 26, 2020 from https://openaccess.thecvf.com/content_cvpr_2017/papers/Kiriliov_InstanceCut_From_Edges_CVPR_2017_paper.pdf, 11 pages.
Meriaudeau, Fabrice, et al. "Polarization imaging for industrial inspection." Image Processing: Machine Vision Applications. vol. 6813. International Society for Optics and Photonics, 2008, 11 pages.
Miyazaki, Daisuke, et al. "Surface normal estimation of black specular objects from multiview polarization images." Optical Engineering 56.4 (2016): 041303, 18 pages.
Miyazaki, Daisuke, et al. "Polarization-based surface normal estimation of black specular objects from multiple viewpoints." 2012 Second International Conference on 3D Imaging, Modeling, Processing, Visualization & Transmission. IEEE, 2012, 8 pages.
Miyazaki et al. Transparent surface modeling from a pair of polarization images. *IEEE Transactions on Pattern Analysis & Machine Intelligence*, vol. 26, (1):73-82, Jan. 2004.
Morel, Olivier, et al. "Three-Dimensional Inspection of Highly-Reflective Metallic Objects by Polarization Imaging." Electronic Imaging Newsletter 15.2 (2005): 4.
Morel, Olivier, et al. "Visual Behaviour Based Bio-Inspired Polarization Techniques in Computer Vision and Robotics." Developing and Applying Biologically-Inspired Vision Systems: Interdisciplinary Concepts. IGI Global, 2013. 243-272.
Morel, O., et al. "Polarization Imaging for 3D Inspection of Highly Reflective Metallic Objects" Optics and Spectroscopy, vol. 101, No. 1, pp. 11-17, (2006).
Rahmann, Stefan. "Polarization images: a geometric interpretation for shape analysis." Proceedings 15th International Conference on Pattern Recognition. ICPR-2000. vol. 3. IEEE, 2000, 5 pages.
Ren et al. End-to-end instance segmentation with recurrent attention. In *Proceedings of the IEEE Conference on Computer Vision and Pattern Recognition*, pp. 6656-6664, 2017.
Romera-Paredes et al. Recurrent instance segmentation. In *European Conference on Computer Vision*, pp. 312-329. Springer, 2016.
Sajjan, "Learning to See Transparent Objects," In: Google, Feb. 12, 2020, Retrieved on Oct. 26, 2020 from https://ai.ggogleblog.com/2020/02/learning-to-see-transparent-objects.html, 6 pages.
Stolz, Christophe, et al. "Short review of polarimetric imaging based method for 3D measurements" Optics, Photonics and Digital Technologies for Imaging Applications IV. vol. 9896. International Society for Optics and Photonics, 2016, 9 pages.
Stolz, Christophe, et al. "Real time polarization imaging of weld pool surface." Twelfth International Conference on Quality Control by Artificial Vision 2015. vol. 9534. International Society for Optics and Photonics, 2015, 7 pages.
Xu, L. M., et al. "Light source optimization for automatic visual inspection of piston surface defects" The International Journal of Advanced Manufacturing Technology 91.5 (2017): 2245-2256.

(56) References Cited

OTHER PUBLICATIONS

Written Opinion for International Application No. PCT/US2020/048604, dated Nov. 13, 2020, 8 pages.
Written Opinion for International Application No. PCT/US2020/051243, dated Dec. 9, 2020, 9 pages.
Callenberg et al., "Snapshot Difference Imaging using Time-of-Flight Sensors," CoRR, May 2017, arxiv.org/abs/1705.07108, 10 pages.
Fischler et al., "Random Sample Consensus: A Paradigm for Model Fitting with Applications to Image Analysis and Automated Cartography," Communications of the ACM, Jun. 1981, 24(6):381-395.
Garrido-Jurado et al., "Automatic generation and detection of highly reliable fiducial markers under occlusion," Pattern Recognition, Jun. 2014, 47(6):2280-2292.
Huafeng et al., "Multi-features fusion network for face anti-spoofing," Xiamen University, MAC-adv-group, Mar. 11, 2019, 3 pages.
Huynh et al., "Robust Shape from Polarization and Shading," 2010 International Conference on Pattern Recognition, 2010, pp. 810-813.
An et al., "Charuco board-based omnidirectional camera calibration method," Electronics, Dec. 2018, 7(12):421.
International Preliminary Report on Patentability in International Appln. No. PCT/US20/54641, dated Apr. 12, 2022, 6 pages.
Mahmoud, "Utilizing radiation for smart robotic applications using visible, thermal, and polarization images," Electronic Theses and Dissertations, 2014, 888:143 pages.
Office Action in Canadian Appln. No. 3,109,406, dated Sep. 21, 2021, 5 pages.
Shinoda et al., "Snapshot multispectral polarization imaging using a photonic crystal filter array," Optics Express, Jun. 2018, 26(12): 14 pages.
Tian et al., "Face Anti-Spoofing by Learning Polarization Cues in a Real-World Scenario," ICAIP 2020: 2020 4th International Conference on Advances in Image Processing, Nov. 2020, pp. 129-137.
Wang et al., "Deep Spatial Gradient and Temporal Depth Learning for Face Anti-spoofing," IEEE, 2020, pp. 5042-5051.
Gruev et al., "Material detection with a ccd polarization imager," 2010 IEEE 39th Applied Imagery Pattern Recognition Workshop, Sep. 20, 2022, 7 pages.
Office Action in Chinese Appln. No. 202080083702.4, dated Sep. 28, 2022, 14 pages (with English translation).
Office Action in Japanese Appln. No. 2022-521149, dated Sep. 13, 2022, 18 pages (with English translation).

\* cited by examiner

SYSTEMS AND METHODS FOR AUGMENTATION OF SENSOR SYSTEMS AND IMAGING SYSTEMS WITH POLARIZATION

CROSS-REFERENCE TO RELATED APPLICATION(S)

This application is a U.S. National Phase Patent Application of International Application Number PCT/US20/54641, filed on Oct. 7, 2020, which claims priority to and the benefit of U.S. Provisional Patent Application No. 62/911,952, filed in the United States Patent and Trademark Office on Oct. 7, 2019 and which claims priority to and the benefit of U.S. Provisional Patent Application No. 62/942,113, filed in the United States Patent and Trademark Office on Nov. 30, 2019, and which claims priority to and the benefit of U.S. Provisional Patent Application No. 63/001,445, filed in the United States Patent and Trademark Office on Mar. 29, 2020, the entire disclosure of each of which is incorporated by reference herein.

FIELD

Aspects of embodiments of the present disclosure relate to the field of sensor systems, including sensor systems augmented with polarization.

BACKGROUND

Sensor systems and imaging systems such as radar, lidar, cameras (e.g., visible light and/or infrared), and the like detect objects and features in the environment through the interactions of electromagnetic radiation with the environment. For example, camera systems and lidar systems detect light reflected off of objects in a scene or in an environment. Likewise, radar systems transmit lower frequency electromagnetic waves (e.g., radio frequency or microwave frequency) and determine properties of the objects based on the reflections of those signals. Other sensor systems may use other forms of radiation, such as pressure waves or sound waves in the case of ultrasound imaging.

SUMMARY

Aspects of embodiments of the present disclosure relate to systems and methods for augmentation of sensor systems and imaging systems using polarization. According to some aspects of embodiments of the present disclosure, sensors configured to detect the polarization of received electromagnetic radiation is used to augment the performance or behavior of other imaging modalities, such as cameras configured to detect the intensity of light without regard to the polarization of the light. In some aspects of embodiments of the present disclosure, sensors configured to detect the polarization of received electromagnetic radiation are used to form images that would otherwise be formed using comparative imaging systems such as digital cameras. Some aspects of embodiments of the present disclosure relate to camera systems configured to detect the polarization of light.

According to one embodiment of the present disclosure, a multi-modal sensor system includes: an underlying sensor system; a polarization camera system configured to capture polarization raw frames corresponding to a plurality of different polarization states; and a processing system including a processor and memory, the processing system being configured to control the underlying sensor system and the polarization camera system, the memory storing instructions that, when executed by the processor, cause the processor to: control the underlying sensor system to perform sensing on a scene and the polarization camera system to capture a plurality of polarization raw frames of the scene; extract first tensors in polarization representation spaces based on the plurality of polarization raw frames; and compute a characterization output based on an output of the underlying sensor system and the first tensors in polarization representation spaces.

The polarization camera system may include a polarization camera module including: a first polarization camera including a first polarizing filter at a first polarization orientation, the first polarization camera having a first optical axis; a second polarization camera including a second polarizing filter at a second polarization orientation, the second polarization camera having a second optical axis substantially parallel to the first optical axis; and a third polarization camera including a third polarizing filter at a third polarization orientation, the third polarization camera having a third optical axis substantially parallel to the first optical axis.

The polarization camera module may further include a fourth polarization camera including a fourth polarizing filter at a fourth polarization orientation, the fourth polarization camera having a fourth optical axis substantially parallel to the first optical axis.

The first tensors may include a degree of linear polarization (DOLP) and an angle of linear polarization (AOLP), and the memory may further store instructions that, when executed by the processor, cause the processor to compute the DOLP and the AOLP based on polarization raw frames captured by the first polarization camera, the second polarization camera, and the third polarization camera, the instructions including instructions to: initialize an estimated DOLP and an estimated AOLP based on stakes vectors; estimate a scene geometry based on parallax shifts in the polarization raw frames to generate a coarse model; and iteratively: refine the coarse model based on the estimated DOLP and the estimated AOLP to generate an estimated geometry; and update the estimated DOLP and the estimated AOLP based on the estimated geometry, until a change in the estimated DOLP and a change in the estimated AOLP are both less than corresponding threshold values.

The polarization camera system may include a stereo polarization camera system including: a first polarization camera module having a first optical axis, the first polarization camera module being configured to capture a first plurality of polarization raw frames corresponding to a first plurality of different polarization states; and a second polarization camera module having a second optical axis and spaced apart from the first polarization camera module along a baseline, the second polarization camera module being configured to capture a second plurality of polarization raw frames corresponding to a second plurality of different polarization states, the first optical axis being substantially parallel to the second optical axis.

The first polarization camera module may include a first plurality of color filters configured to transmit light in three or more different first color spectra, and the second polarization camera module may include a second plurality of color filters configured to transmit light in three or more different second color spectra, wherein the three or more second color spectra may be different from the three or more first color spectra.

The memory may further store instructions that, when executed by the processor, cause the processor to: control the stereo polarization camera system to capture multi-spectral stereo polarization imaging data in the first color spectra and in the second color spectra; and extract first tensors in polarization representation spaces from the multi-spectral stereo polarization imaging data.

The underlying sensor system may include an active scanning system including an active emitter and a detector. The active scanning system may include a radar system. The active scanning system may include a lidar system. The active scanning system may include an active stereo depth camera system.

The multi-modal sensor system may be mounted on a vehicle.

The memory may further store instructions that, when executed by the processor of the processing system, cause the processor to: compute a sparse point cloud based on the output of the underlying sensor system; compute surface normals from the polarization raw frames; compute a 3-D surface based on the surface normals; and correct the 3-D surface based on the sparse point cloud to compute a 3-D model of the scene.

The memory may further store instructions that, when executed by the processor of the processing system, cause the processor to: compute a segmentation map based on the first tensors in the polarization representation spaces, the segmentation map identifying one or more regions of interest in the scene; steer the active emitter to emit beams toward the one or more regions of interest; and detect a reflection of the beams emitted by the active emitter using the detector of the active scanning system.

The memory may further store instructions that cause the processor to implement a convolutional neural network trained to compute a segmentation map based on the first tensors.

The underlying sensor system may include a color camera system.

The color camera system may be a digital single lens reflex camera or a video camera.

The output of the color camera of the underlying sensor system may include a color image, and the memory may further store instructions that, when executed by the processor, cause the processor to: compute a plurality of surface normals of the scene based on the first tensors; and store the computed surface normals of the scene in a same file as the color image captured by the color camera.

According to one embodiment of the present disclosure, a polarization camera system includes: a polarization camera configured to capture polarization raw frames of a scene, the polarization raw frames corresponding to a plurality of different polarization states; and a processing system having a processor and memory, the processing system being configured to control the polarization camera, the memory storing instructions that, when executed by the processor, cause the processor to: control the polarization camera to capture a plurality of polarization raw frames; and synthesize a high dynamic range (HDR) image based on the polarization raw frames.

Each of the polarization raw frames may be captured based on a same set of exposure settings, at least one of the polarization raw frames may include saturated pixels in a portion of the polarization raw frame due to specular reflection from a surface in the scene, the memory may further stores instructions that, when executed by the processor, cause the processor to synthesize the HDR image without saturated pixels in a portion of the HDR image corresponding to the portion of the polarization raw frame based on data from corresponding portions of other ones of the polarization raw frames.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1A:
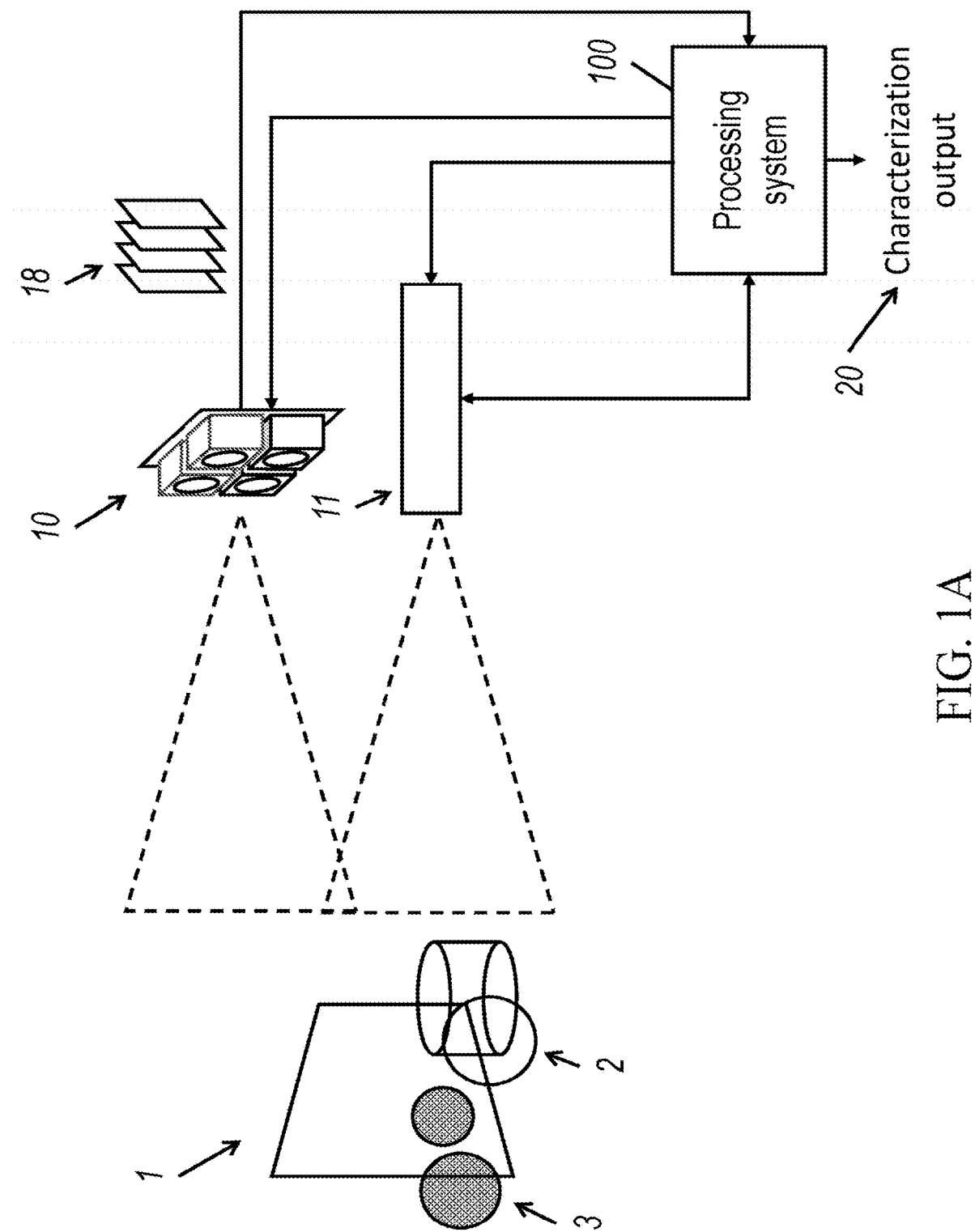
FIG. 1A is a schematic block diagram of an imaging system augmented with a polarization camera system according to embodiments of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein.

Optically challenging objects such as transparent objects occur in many real-world applications of computer vision or machine vision systems, including automation and analysis for manufacturing, life sciences, and automotive industries. For example, in manufacturing, computer vision systems may be used to automate: sorting, selection, and placement of parts; verification of placement of components during manufacturing; and final inspection and defect detection. As additional examples, in life sciences, computer vision systems may be used to automate: measurement of reagents; preparation of samples; reading outputs of instruments; characterization of samples; and picking and placing container samples. Further examples in automotive industries include detecting transparent objects in street scenes for assisting drivers or for operating self-driving vehicles. Additional examples may include assistive technologies, such as self-navigating wheelchairs capable of detecting glass doors and other transparent barriers and devices for assisting people with vision impairment that are capable of detecting transparent drinking glasses and to distinguish between real objects and print-out spoofs.

In contrast to opaque objects, transparent objects lack texture of their own (e.g., surface color information, as the term is used in the field of computer graphics, such as in "texture mapping"). As a result, comparative systems generally fail to correctly identify instances of transparent objects that are present in scenes captured using standard imaging systems (e.g., cameras configured to capture monochrome intensity images or color intensity images such as red, green, and blue or RGB images). This may be because the transparent objects do not have a consistent texture (e.g., surface color) for the algorithms to latch on to or to learn to detect (e.g., during the training process of a machine learning algorithm). Similar issues may arise from partially transparent or translucent objects, as well as some types of reflective objects (e.g., shiny metal) and very dark objects (e.g., matte black objects).

Accordingly, aspects of embodiments of the present disclosure relate to using polarization imaging to provide additional information for augmenting sensor systems to detect transparent objects and other optically challenging objects and features in scenes. In addition, aspects of embodiments of the present disclosure also apply to detecting other optically challenging objects such as transparent, translucent, and reflective objects as well as dark objects.

As used herein, the term "optically challenging" refers to objects made of materials that satisfy one or more of the following four characteristics at a sufficient threshold level or degree: non-Lambertian (e.g., not matte); translucent; multipath inducing; and/or non-reflective. In some circumstances an object exhibiting only one of the four characteristics may be optically challenging to detect. In addition, objects or materials may exhibit multiple characteristics simultaneously. For example, a translucent object may have a surface reflection and background reflection, so it is challenging both because of translucency and the multipath. In some circumstances, an object may exhibit one or more of the four characteristics listed above, yet may not be optically challenging to detect because these conditions are not exhibited at a level or degree that would pose a problem to a comparative computer vision systems. For example, an object may be translucent, but still exhibit enough surface texture to be detectable and segmented from other instances of objects in a scene. As another example, a surface must be sufficiently non-Lambertian to introduce problems to other vision systems. In some embodiments, the degree or level to which an object is optically challenging is quantified using the full-width half max (FWHM) of the specular lobe of the bidirectional reflectance distribution function (BRDF) of the object. If this FWHM is below a threshold, the material is considered optically challenging.

Figure 1B:
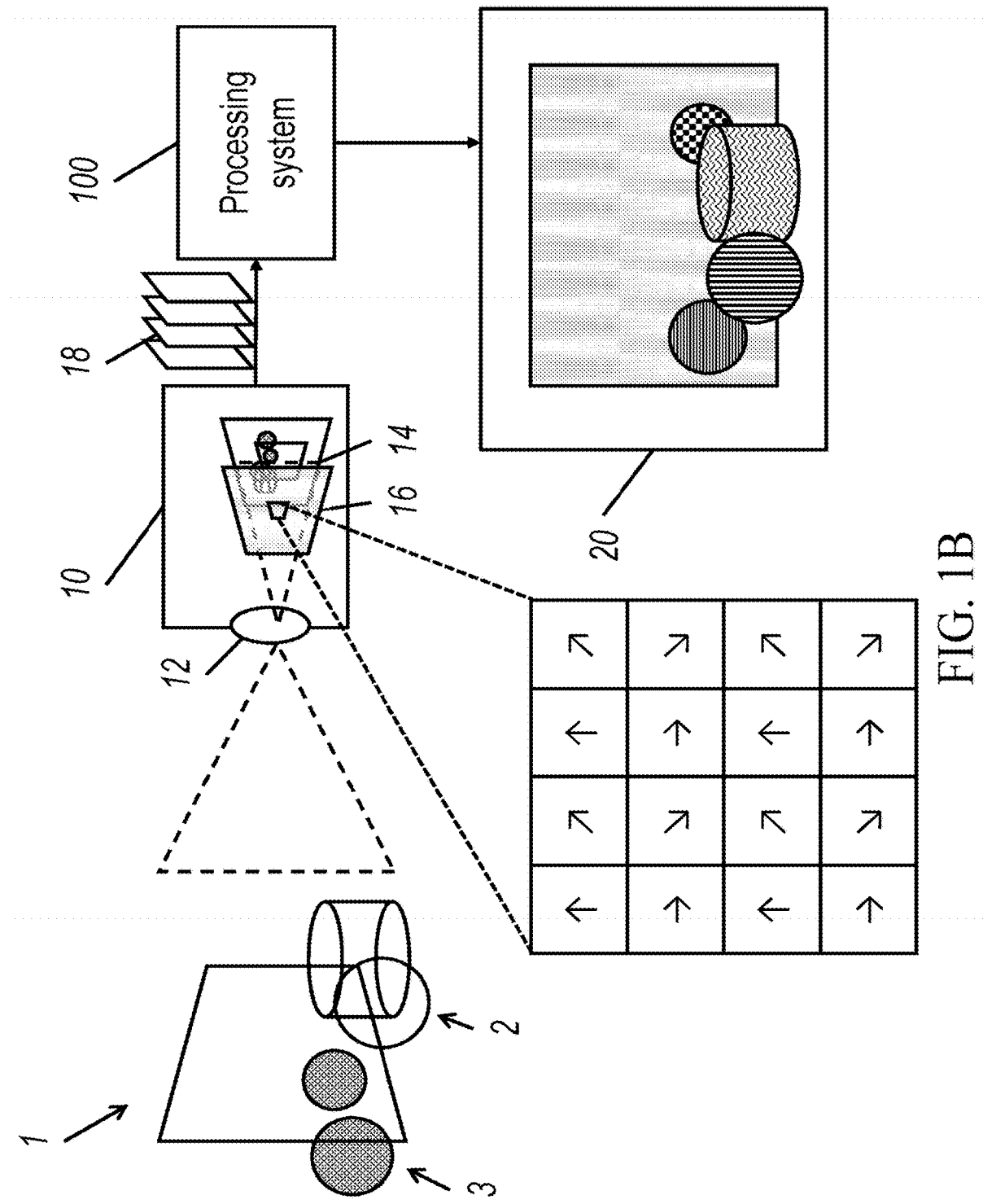
FIG. 1B is a schematic block diagram of a system using a polarization camera according to one embodiment of the present invention.

FIG. 1A is a schematic block diagram of an imaging system augmented with a polarization camera system according to embodiments of the present disclosure. FIG. 1B is a schematic block diagram of a system using a polarization camera according to one embodiment of the present invention. In the arrangement shown in FIG. 1A and FIG. 1B, a scene 1 includes transparent objects 2 (e.g., depicted as a ball such as a glass marble, a cylinder such as a drinking glass or tumbler, and a plane such as a pane of transparent acrylic) that are placed in front of opaque matte objects 3 (e.g., a baseball and a tennis ball). A polarization camera 10 has a lens 12 with a field of view, where the lens 12 and the camera 10 are oriented such that the field of view encompasses the scene 1. The lens 12 is configured to direct light (e.g., focus light) from the scene 1 onto a light sensitive medium such as an image sensor 14 (e.g., a complementary metal oxide semiconductor (CMOS) image sensor or charge-coupled device (CCD) image sensor). As shown in FIG. 1A, the polarization camera 10 may be used to augment the sensor data captured by another imaging system 11.

The polarization camera 10 further includes a polarizer or polarizing filter or polarization mask 16 placed in the optical path between the scene 1 and the image sensor 14. According to various embodiments of the present disclosure, the polarizer or polarization mask 16 is configured to enable the polarization camera 10 to capture images of the scene 1 with the polarizer set at various specified angles (e.g., at 45° rotations or at 60° rotations or at non-uniformly spaced rotations).

As one example, FIG. 1B depicts an embodiment where the polarization mask 16 is a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, the polarization camera 10 using a polarization mask 16 such as that shown in FIG. 1B is capable of concurrently or simultaneously capturing light at four different linear polarizations. One example of a polarization camera is the Blackfly® S Polarization Camera produced by FLIR® Systems, Inc. of Wilsonville, Oreg.

While the above description relates to some possible implementations of a polarization camera using a polarization mosaic, embodiments of the present disclosure are not limited thereto and encompass other types of polarization cameras that are capable of capturing images at multiple different polarizations. For example, the polarization mask 16 may have fewer than four polarizations or more than four different polarizations, or may have polarizations at different angles than those stated above (e.g., at angles of polarization of: 0°, 60°, and 120° or at angles of polarization of 0°, 30°, 60°, 90°, 120°, and 150°). As another example, the polarization mask 16 may be implemented using an electronically controlled polarization mask, such as an electro-optic modulator (e.g., may include a liquid crystal layer), where the polarization angles of the individual pixels of the mask may be independently controlled, such that different portions of the image sensor 14 receive light having different polarizations. As another example, the electro-optic modulator may be configured to transmit light of different linear polarizations when capturing different frames, e.g., so that the camera captures images with the entirety of the polarization mask set to, sequentially, to different linear polarizer angles (e.g., sequentially set to: 0 degrees; 45 degrees; 90 degrees; or 135 degrees). As another example, the polarization mask 16 may include a polarizing filter that rotates mechanically, such that different polarization raw frames are captured by the polarization camera 10 with the polarizing filter mechanically rotated with respect to the lens 12 to transmit light at different angles of polarization to image sensor 14. Furthermore, while the above examples relate to the use of a linear polarizing filter, embodiments of the present disclosure are not limited thereto and also include the use of polarization cameras that include circular polarizing filters (e.g., linear polarizing filters with a quarter wave plate). Accordingly, in various embodiments of the present disclosure, a polarization camera uses a polarizing filter to capture multiple polarization raw frames at different polarizations of light, such as different linear polarization angles and different circular polarizations (e.g., handedness).

As a result, the polarization camera 10 captures multiple input images 18 (or polarization raw frames) of the scene including the surface under inspection 2 of the object under inspection 1. In some embodiments, each of the polarization raw frames 18 corresponds to an image taken behind a polarization filter or polarizer at a different angle of polarization $\phi_{pol}$ (e.g., 0 degrees, 45 degrees, 90 degrees, or 135 degrees). Each of the polarization raw frames 18 is captured from substantially the same pose with respect to the scene 1 (e.g., the images captured with the polarization filter at 0 degrees, 45 degrees, 90 degrees, or 135 degrees are all captured by a same polarization camera 10 located at a same location and orientation), as opposed to capturing the polarization raw frames from disparate locations and orientations with respect to the scene. The polarization camera 10 may be configured to detect light in a variety of different portions of the electromagnetic spectrum, such as the human-visible portion of the electromagnetic spectrum, red, green, and blue portions of the human-visible spectrum, as well as invisible portions of the electromagnetic spectrum such as infrared and ultraviolet.

In some embodiments of the present disclosure, such as some of the embodiments described above, the different polarization raw frames are captured by a same polarization camera 10 and therefore may be captured from substantially the same pose (e.g., position and orientation) with respect to the scene 1. However, embodiments of the present disclosure are not limited thereto. For example, a polarization camera 10 may move with respect to the scene 1 between different polarization raw frames (e.g., when different raw polarization raw frames corresponding to different angles of polarization are captured at different times, such as in the case of a mechanically rotating polarizing filter), either because the polarization camera 10 has moved or because objects 3 have moved (e.g., if the object is on a moving conveyor system). In some embodiments, different polarization cameras capture images of the object at different times, but from substantially the same pose with respect to the object (e.g., different cameras capturing images of the same surface of the object at different points in the conveyor system). Accordingly, in some embodiments of the present disclosure different polarization raw frames are captured with the polarization camera 10 at different poses or the same relative pose with respect to the objects 2 and 3 being imaged in the scene 1.

The polarization raw frames 18 are supplied to a processing circuit 100, described in more detail below, which computes a processing output 20 based on the polarization raw frames 18. In the embodiment shown in FIG. 1B, the processing output 20 is an instance segmentation map identifying instances of different objects 2 and 3 that are present in the scene 1, but embodiments of the present disclosure are not limited thereto. Specific examples of processing outputs 20 that are computed based on polarization raw frames will be described in more detail below. In the embodiment shown in FIG. 1A, the processing circuit 100 is configured to control both the polarization camera 10 and the additional imaging system 11.

Figures 1C, 1D:
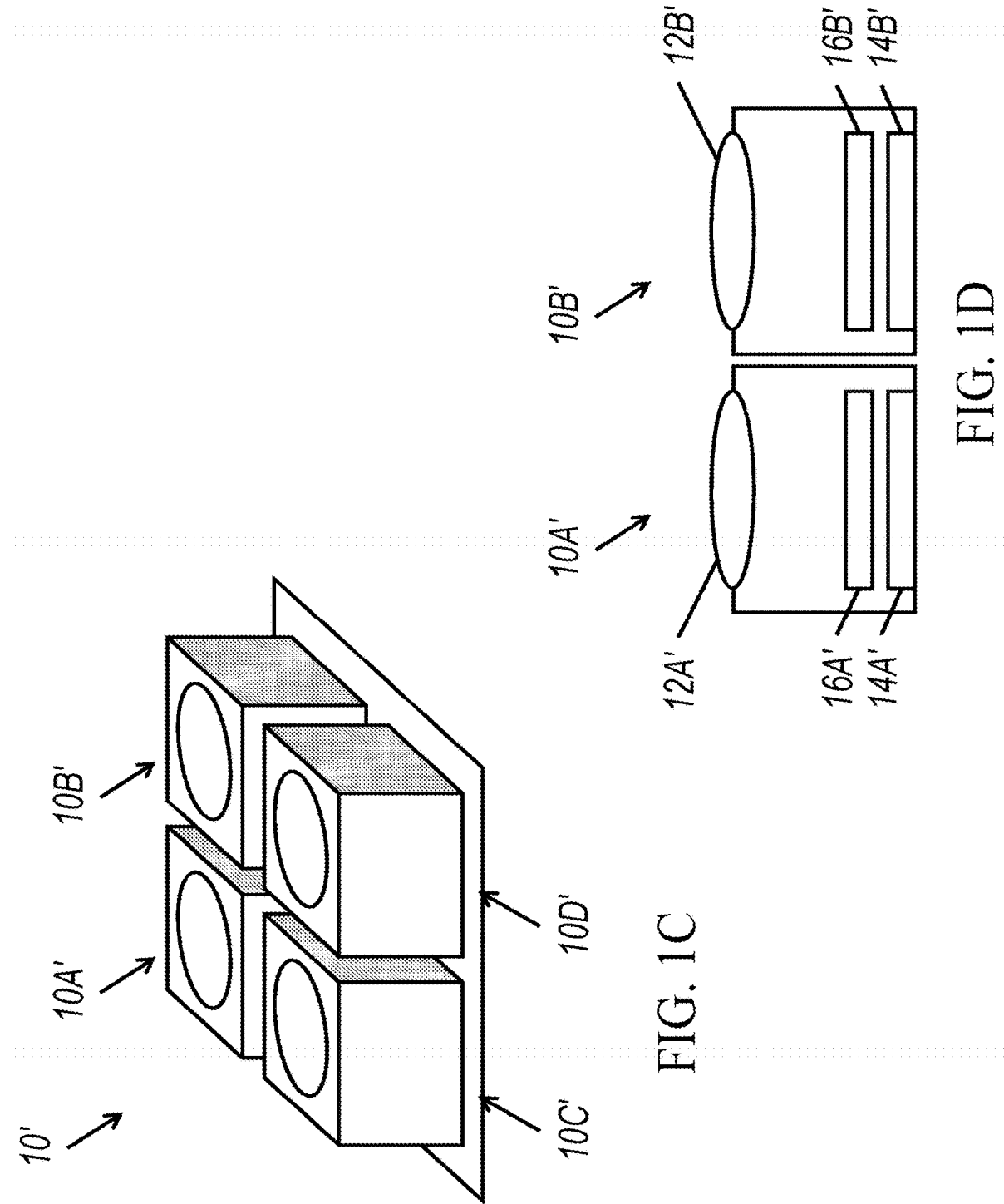
FIG. 1C is a perspective view of a polarization camera module according to one embodiment of the present disclosure.
FIG. 1D is a cross sectional view of a portion of a polarization camera module according to one embodiment of the present disclosure.

FIG. 1C is a perspective view of a polarization camera module according to one embodiment of the present disclosure. FIG. 1D is a cross sectional view of a portion of a polarization camera module according to one embodiment of the present disclosure. Some aspects of embodiments of the present disclosure relate to a polarization camera module in which multiple polarization cameras (e.g., multiple cameras, where each camera has a polarizing filter in its optical path) are arranged adjacent to one another and in an array and may be controlled to capture images in a group (e.g., a single trigger may be used to control all of the cameras in the system to capture images concurrently or substantially simultaneously). The polarizing filters in the optical paths of each of the cameras in the array cause differently polarized light to reach the image sensors of the cameras. The individual polarization cameras in the camera system have optical axes that are substantially perpendicular to one another, are placed adjacent to one another, and have substantially the same field of view, such that the cameras in the camera system capture substantially the same view of a scene 1, but with different polarizations. In some embodiments, the individual polarization cameras are arranged such that parallax shift between cameras is substantially negligible based on the designed operating distance of the camera system to objects in the scene, where larger spacings between the cameras may be tolerated if the designed operating distance is large. In some embodiments of the present disclosure, the polarization camera module includes at least three polarization cameras, each having a polarizing filter with a different polarization state (e.g., each at a different angle of linear polarization, such as 0°, 60°, and 120°).

For example, in the embodiment of the polarization camera module 10' shown in FIG. 1C, four cameras 10A', 10B', 10C', and 10D' are arranged in a 2×2 grid to form a camera array, where the four cameras have substantially parallel optical axes. The four cameras may be controlled together such that they capture images substantially simultaneously and using the same exposure settings (e.g., same aperture, length of exposure, and gain or "ISO" settings). In various embodiments of the present disclosure, each of the separate cameras 10A', 10B', 10C', and 10D' includes a different polarizing filter.

FIG. 1D shows a cross sectional view of two of the polarization cameras 10A' and 10B' shown in FIG. 1C. As seen in FIG. 1D, each a polarization camera (10A' and 10B') system includes a corresponding lens, a corresponding image sensor, and a corresponding polarizing filter. In particular, polarization camera 10A' includes lens 12A', image sensor 14A', and polarizing filter 16A'. Likewise, polarization camera 10B' includes lens 12B', image sensor 14B', and polarizing filter 16B'. In some embodiments of the present disclosure, the image sensors four cameras 10A', 10B', 10C', and 10D' are monolithically formed on a same semiconductor die, and the four cameras are located in a same housing with separate apertures for the lenses 12 corresponding to the different image sensors. Similarly, the polarizing filters 16 may correspond to different portions of a single physical layer that has different polarizing filters (e.g., different linear polarizing angles) in different regions of the layer (corresponding to the different cameras).

In some embodiments of the present disclosure, each of the cameras in the camera system 10' has a corresponding polarizing filter that is configured to filter differently polarized light. For example, in the embodiment shown in FIGS. 1C and 1D, polarizing filter 16A' of camera 10A' may be a linear polarizing filter oriented at an angle of 0°, polarizing filter 16B' of camera 10B' may be a linear polarizing filter oriented at an angle of 45°, polarizing filter 16C' of camera 10C' may be a linear polarizing filter oriented at an angle of 90°, and polarizing filter 16D' of camera 10D' may be a linear polarizing filter oriented at an angle of 135°. In some embodiments, one or more of the cameras may include a circular polarizer. In some embodiments of the present disclosure, the camera system 10' includes polarizing filters configured to filter light in at least two different polarizations. In some embodiments of the present disclosure, the camera system 10' includes polarizing filters configured to filter light in at least three different polarizations. In the embodiment shown in FIG. 1D, the polarizing filter 16 is located behind the lens 12 (e.g., between the lens 12 and the image sensor 14), but embodiments of the present disclosure are not limited thereto. In some embodiments, the polarizing filter is located in front of the lens 12.

In some embodiments, the various individual cameras of the camera array are registered with one another by determining their relative poses (or relative positions and orientations) by capturing multiple images of a calibration target, such as a checkerboard pattern, an ArUco target (see, e.g., Garrido-Jurado, Sergio, et al. "Automatic generation and detection of highly reliable fiducial markers under occlusion." *Pattern Recognition* 47.6 (2014): 2280-2292) or a ChArUco target (see, e.g., An, Gwon Hwan, et al. "Charuco board-based omnidirectional camera calibration method." *Electronics* 7.12 (2018): 421). In particular, the process of calibrating the targets may include computing intrinsic matrices characterizing the internal parameters of each camera (e.g., matrices characterizing the focal length, image sensor format, and principal point of the camera) and extrinsic matrices characterizing the pose of each camera with respect to world coordinates (e.g., matrices for performing transformations between camera coordinate space and world or scene coordinate space).

While not shown in FIG. 1D, in some embodiments of the present disclosure, each polarization camera may also include a color filter having in a mosaic pattern such as a Bayer filter, such that individual pixels of the image sensors 14 receive light corresponding to, for example, red (R), green (G), and blue (B) portions of the spectrum, such that each camera captures light in a visible portion of the electromagnetic spectrum in accordance with a mosaic pattern. In some embodiments, a demosaicing process is used to compute separate red, green, and blue channels from the raw data. In some embodiments of the present disclosure, each polarization camera may be used without a color filter or with filters used to transmit or selectively transmit various other portions of the electromagnetic spectrum, such as infrared light.

Figure 1E:
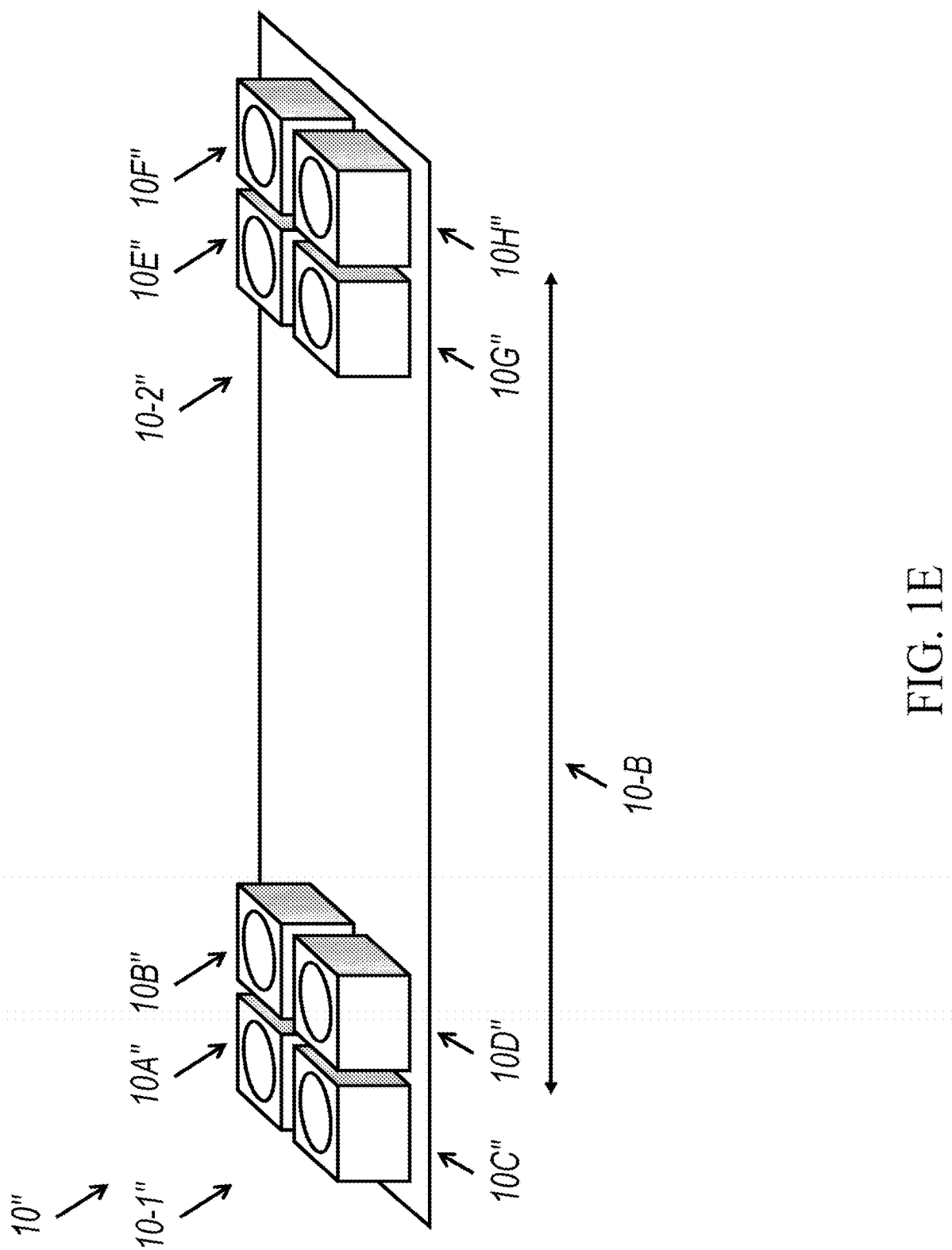
FIG. 1E is a perspective view of a stereo polarization camera system according to one embodiment of the present disclosure.

FIG. 1E is a perspective view of a stereo polarization camera system according to one embodiment of the present disclosure. In some applications, stereo vision techniques are used to capture multiple images of scene from different perspectives. As noted above, in some embodiments of the present disclosure, individual polarization cameras within a camera system are placed adjacent to one another such that parallax shifts between the cameras is substantially negligible based on the designed operating distance of the camera system to the subjects being imaged. In stereo polarization camera systems, some of the individual polarization cameras are spaced apart such that parallax shifts are significant and detectable for objects in the designed operating distance of the camera system. This enables the distances to various surfaces in a scene (the "depth") to be detected in accordance with a magnitude of a parallax shift (e.g., larger parallax shifts in the locations of corresponding portions of the images indicate that those corresponding portions are on surfaces that are closer to the camera system and smaller parallax shifts indicate that the corresponding portions are on surfaces that are farther away from the camera system). These techniques for computing depth based on parallax shifts are sometimes referred to as Depth from Stereo Accordingly, FIG. 1E depicts a stereo polarization camera system 10" having a first polarization camera module 10-1" and a second polarization camera module 10-2" having substantially parallel optical axes and spaced apart along a baseline 10-B. In the embodiment shown in FIG. 1E, the first polarization camera module 10-1" and includes polarization cameras 10A", 10B", 10C", and 10D" arranged in a 2×2 array similar to that shown in FIGS. 1C and 1D. Likewise, the second polarization camera module 10-2" and includes polarization cameras 10E", 10F", 10G", and 10H" arranged in a 2×2 array, and the overall stereo polarization camera module 10" includes eight individual polarization cameras (e.g., eight separate image sensors behind eight separate lenses). In some embodiments of the present disclosure, corresponding polarization cameras of polarization camera modules 10-1" and 10-2" are configured to capture polarization raw frames with substantially the same polarizations. For example, cameras 10A" and 10E" may both have linear polarizing filters at a same angle of 0°, cameras 10B" and 10F" may both have linear polarizing filters at a same angle of 45°, cameras 10C" and 10G" may both have linear polarizing filters at a same angle of 90°, and cameras 10D" and 10H" may both have linear polarizing filters at a same angle of 135°.

Embodiments of the present disclosure are not limited to the particular embodiment shown in FIG. 1E. In some embodiments, a stereo polarization camera system includes three or more polarization camera modules, where each polarization camera module includes multiple polarization cameras arranged in array and configured, using polarizing filters, to capture polarization raw frames of different polarizations. As noted above, in some embodiments of the present disclosure, one or more of the individual polarization cameras of a polarization camera module may include a color filter and, as such, one or more of the polarization cameras in a stereo polarization camera module may also include a color filter.

In a manner similar to that described for calibrating or registering cameras within a camera module, the various polarization camera modules of a stereo polarization camera system may also be registered with one another by capturing multiple images of calibration targets and computing intrinsic and extrinsic matrices for the various camera modules.

While the embodiment of a stereo polarization camera system shown in FIG. 1E includes two polarization camera modules, each having four polarization cameras, embodiments of the present disclosure are not limited thereto.

For example, in some embodiments of the present disclosure, a stereo polarization camera system includes a plurality of polarization camera modules, where each of the polarization camera modules includes three or more individual polarization cameras, each of the individual polarization cameras of a polarization camera module having polarizing filters with different polarization states (e.g., different angles of linear polarization).

In some embodiments of the present disclosure, a stereo polarization camera system includes a plurality of polarization camera modules that are spaced apart along one or more baselines, where each of the polarization camera modules includes a single polarization camera configured to capture polarization raw frames with different polarizations, in accordance with embodiments such as that described above with respect to FIG. 1B. For example, in some embodiments of the present disclosure, the polarization camera of each module may include a polarization mask (e.g., similar to the polarization mask shown in FIG. 1B) such that each individual polarization camera captures images where the pixels detect light in accordance with a mosaic pattern of different polarizing filters (e.g., polarizing filters at different angles). For example, in the embodiment shown in FIG. 1B, each 2×2 block of pixels of the polarization mask includes linear polarizers at linear polarization angles of 0°, 45°, 90°, 135°. In other embodiments of the present disclosure, the individual polarization cameras may include mechanically or electronically controllable polarizing filters, as discussed above with respect to FIG. 1B, to enable the polarization cameras to capture polarization raw frames of different polarizations.

While the above embodiments specified that the individual polarization camera modules or the polarization cameras that are spaced apart along one or more baselines in the stereo polarization camera system have substantially parallel optical axes, embodiments of the present disclosure are not limited thereto. For example, in some embodiment of the present disclosure, the optical axes of the polarization camera modules are angled toward each other such that the polarization camera modules provide differently angled views of objects in the designed working distance (e.g., where the optical axes cross or intersect in the neighborhood of the designed working distance from the stereo camera system).

According to various embodiments of the present disclosure, the processing circuit 100 is implemented using one or more electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a processing output 20, such as an instance segmentation map, from input polarization raw frames 18. The operations performed by the processing circuit 100 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, or located within a same embedded device or computer system) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the processing circuit 100 may be referred to herein as a computer or a computer system, which may include memory storing instructions that, when executed by the one or more electronic circuits, implement the systems and methods described herein.

Figure 2B:
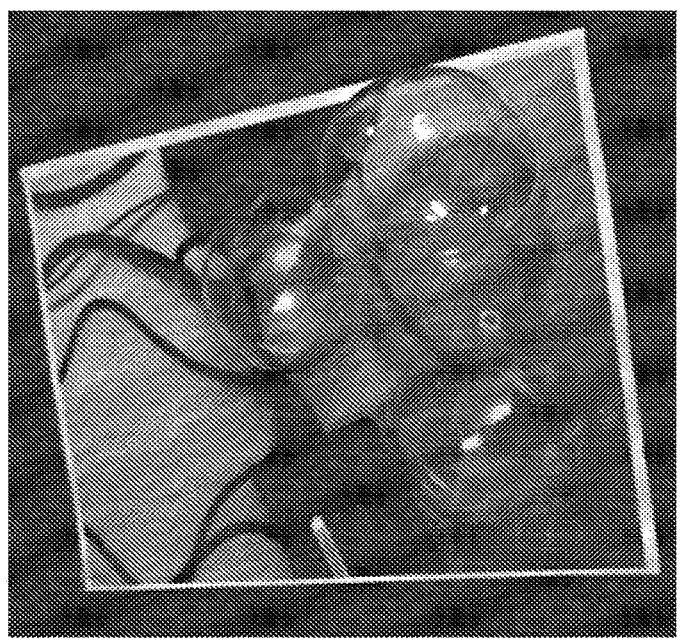
FIGS. 2A, 2B, 2C, and 2D provide background for illustrating the segmentation maps computed by a comparative approach and semantic segmentation or instance segmentation based on polarization raw frames according to aspects of embodiments of the present disclosure.
Figure 2A:
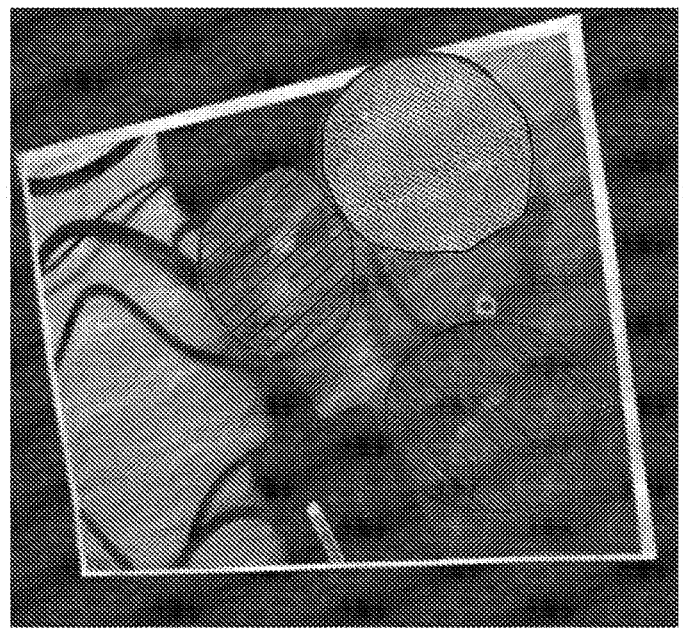

FIGS. 2A, 2B, 2C, and 2D provide background for illustrating the segmentation maps computed by a comparative approach and semantic segmentation or instance segmentation based on polarization raw frames according to aspects of embodiments of the present disclosure. In more detail, FIG. 2A is an image or intensity image of a scene with one real transparent ball placed on top of a printout of photograph depicting another scene containing two transparent balls ("spoofs") and some background clutter. FIG. 2B depicts a segmentation mask as computed by a Mask Region-based Convolutional Neural Network (Mask R-CNN) identifying instances of transparent balls overlaid on the intensity image of FIG. 2A using different patterns of lines, where the real transparent ball is correctly identified as an instance, and the two spoofs are incorrectly identified as instances. In other words, the Mask R-CNN algorithm has been fooled into labeling the two spoof transparent balls as instances of actual transparent balls in the scene.

Figure 2D:
Figure 2C:
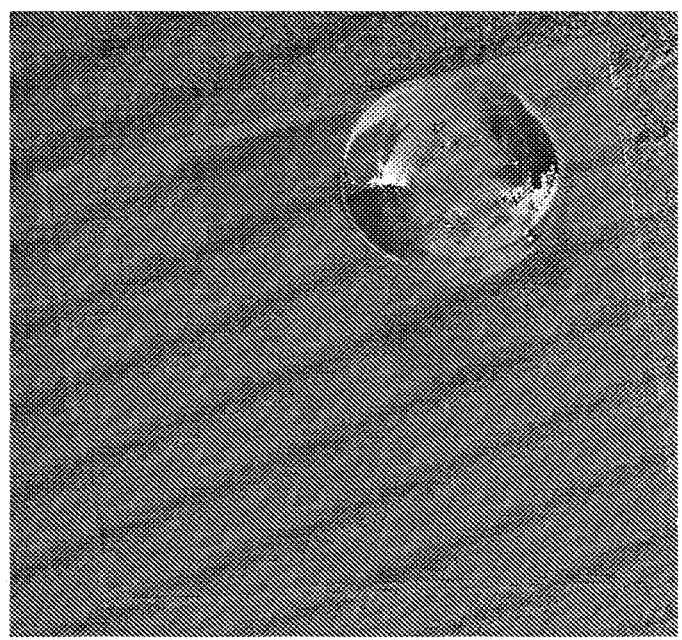

FIG. 2C is an angle of linear polarization (AOLP) image computed from polarization raw frames captured of the scene according to one embodiment of the present invention. As shown in FIG. 2C, transparent objects have a very unique texture in polarization space such as the AOLP domain, where there is a geometry-dependent signature on edges and a distinct or unique or particular pattern that arises on the surfaces of transparent objects in the angle of linear polarization. In other words, the intrinsic texture of the transparent object (e.g., as opposed to extrinsic texture adopted from the background surfaces visible through the transparent object) is more visible in the angle of polarization image of FIG. 2C than it is in the intensity image of FIG. 2A.

FIG. 2D depicts the intensity image of FIG. 2A with an overlaid segmentation mask as computed using polarization data in accordance with an embodiment of the present invention, where the real transparent ball is correctly identified as an instance using an overlaid pattern of lines and the two spoofs are correctly excluded as instances (e.g., in contrast to FIG. 2B, FIG. 2D does not include overlaid patterns of lines over the two spoofs). While FIGS. 2A, 2B, 2C, and 2D illustrate an example relating to detecting a real transparent object in the presence of spoof transparent objects, embodiments of the present disclosure are not limited thereto and may also be applied to other optically challenging objects, such as transparent, translucent, and non-matte or non-Lambertian objects, as well as non-reflective (e.g., matte black objects) and multipath inducing objects.

Accordingly, some aspects of embodiments of the present disclosure relate to extracting, from the polarization raw frames, tensors in representation space (or first tensors in first representation spaces, such as polarization feature maps) to be supplied as input to surface characterization algorithms or other computer vision algorithms. These first tensors in first representation space may include polarization feature maps that encode information relating to the polarization of light received from the scene such as the AOLP image shown in FIG. 2C, degree of linear polarization (DOLP) feature maps, and the like (e.g., other combinations from Stokes vectors or transformations of individual ones of the polarization raw frames). For example, in some embodiments of the present disclosure, the feature extractor 700 further computes surface normals in accordance with equations (2), (3), (4), and (5), discussed in more detail below, based on the polarization raw frames. In some embodiments, these polarization feature maps are used together with non-polarization feature maps (e.g., intensity images such as the image shown in FIG. 2A) to provide additional channels of information for use by semantic segmentation algorithms.

While embodiments of the present invention are not limited to use with particular computer vision algorithms for analyzing images, some aspects of embodiments of the present invention relate to deep learning frameworks for polarization-based detection of optically challenging objects (e.g., transparent, translucent, non-Lambertian, multipath inducing objects, and non-reflective or very dark objects), where these frameworks may be referred to as Polarized Convolutional Neural Networks (Polarized CNNs). This Polarized CNN framework includes a backbone that is suitable for processing the particular texture of polarization and can be coupled with other computer vision architectures such as Mask R-CNN (e.g., to form a Polarized Mask R-CNN architecture) to produce a solution for accurate and robust characterization of transparent objects and other optically challenging objects. Furthermore, this approach may be applied to scenes with a mix of transparent and non-transparent (e.g., opaque objects) and can be used to characterize transparent, translucent, non-Lambertian, multipath inducing, dark, and opaque surfaces of the object or objects under inspection.

Polarization Feature Representation Spaces

Some aspects of embodiments of the present disclosure relate to systems and methods for extracting features from polarization raw frames in operation 650, where these extracted features are used in operation 690 in the robust detection of optically challenging characteristics in the surfaces of objects. In contrast, comparative techniques relying on intensity images alone may fail to detect these optically challenging features or surfaces (e.g., comparing the intensity image of FIG. 2A with the AOLP image of FIG. 2C, discussed above). The term "first tensors" in "first representation spaces" will be used herein to refer to features computed from (e.g., extracted from) polarization raw frames 18 captured by a polarization camera, where these first representation spaces include at least polarization feature spaces (e.g., feature spaces such as AOLP and DOLP that contain information about the polarization of the light detected by the image sensor) and may also include non-polarization feature spaces (e.g., feature spaces that do not require information regarding the polarization of light reaching the image sensor, such as images computed based solely on intensity images captured without any polarizing filters).

Figure 3:
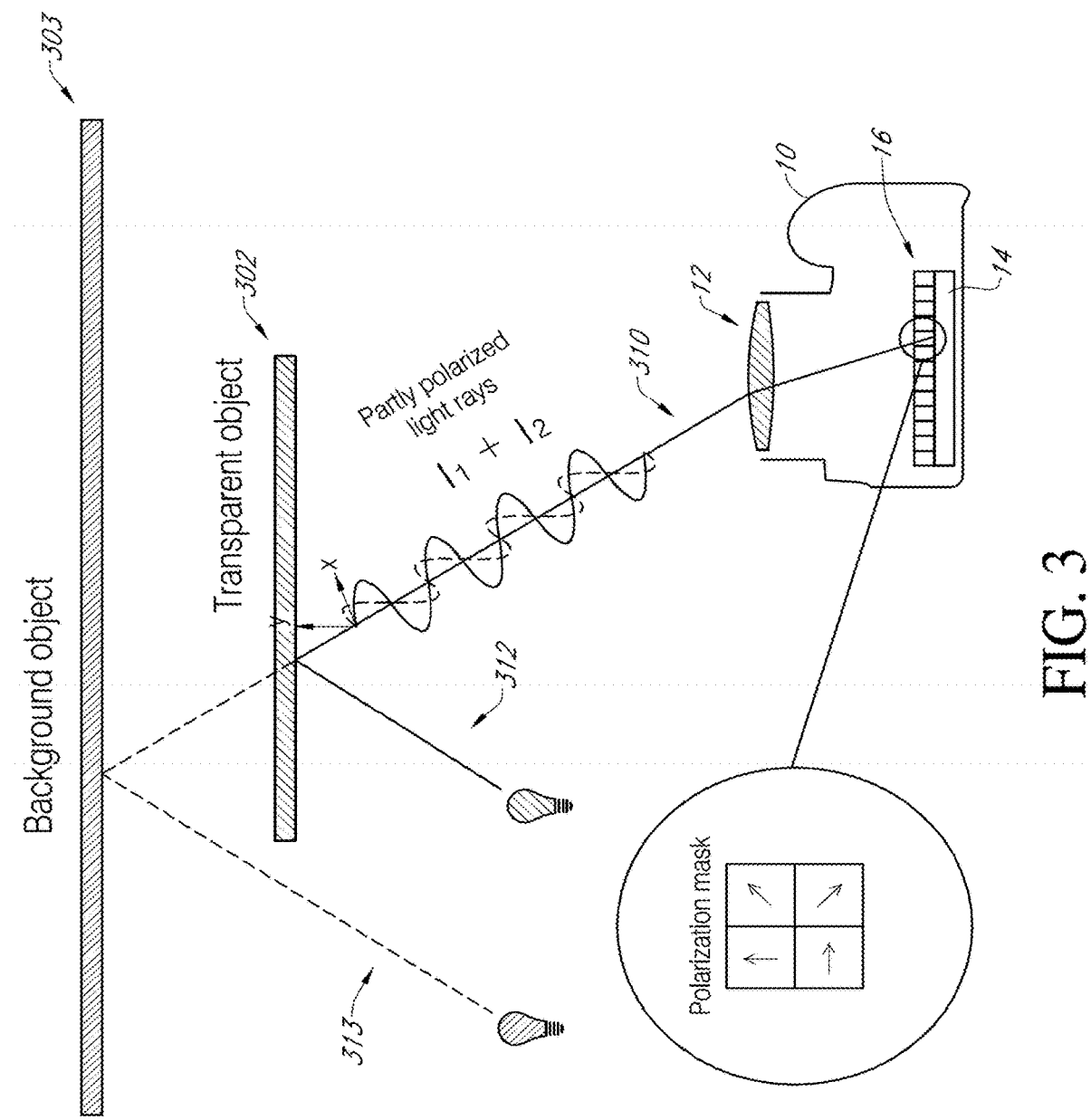
FIG. 3 is a high-level depiction of the interaction of light with transparent objects and non-transparent (e.g., diffuse and/or reflective) objects.

The interaction between light and transparent objects is rich and complex, but the material of an object determines its transparency under visible light. For many transparent household objects, the majority of visible light passes straight through and a small portion (~4% to ~8%, depending on the refractive index) is reflected. This is because light in the visible portion of the spectrum has insufficient energy to excite atoms in the transparent object. As a result, the texture (e.g., appearance) of objects behind the transparent object (or visible through the transparent object) dominate the appearance of the transparent object. For example, when looking at a transparent glass cup or tumbler on a table, the appearance of the objects on the other side of the tumbler (e.g., the surface of the table) generally dominate what is seen through the cup. This property leads to some difficulties when attempting to detect surface characteristics of transparent objects such as glass windows and glossy, transparent layers of paint, based on intensity images alone:

FIG. 3 is a high-level depiction of the interaction of light with transparent objects and non-transparent (e.g., diffuse and/or reflective) objects. As shown in FIG. 3, a polarization camera 10 captures polarization raw frames of a scene that includes a transparent object 302 in front of an opaque background object 303. A light ray 310 hitting the image sensor 14 of the polarization camera 10 contains polarization information from both the transparent object 302 and the background object 303. The small fraction of reflected light 312 from the transparent object 302 is heavily polarized, and thus has a large impact on the polarization measurement, in contrast to the light 313 reflected off the background object 303 and passing through the transparent object 302.

Similarly, a light ray hitting the surface of an object may interact with the shape of the surface in various ways. For example, a surface with a glossy paint may behave substantially similarly to a transparent object in front of an opaque object as shown in FIG. 3, where interactions between the light ray and a transparent or translucent layer (or clear coat layer) of the glossy paint causes the light reflecting off of the surface to be polarized based on the characteristics of the transparent or translucent layer (e.g., based on the thickness and surface normals of the layer), which are encoded in the light ray hitting the image sensor. Similarly, as discussed in more detail below with respect to shape from polarization (SfP) theory, variations in the shape of the surface (e.g., direction of the surface normals) may cause significant changes in the polarization of light reflected by the surface of the object. For example, smooth surfaces may generally exhibit the same polarization characteristics throughout, but a scratch or a dent in the surface changes the direction of the surface normals in those areas, and light hitting scratches or dents may be polarized, attenuated, or reflected in ways different than in other portions of the surface of the object. Models of the interactions between light and matter generally consider three fundamentals: geometry, lighting, and material. Geometry is based on the shape of the material. Lighting includes the direction and color of the lighting. Material can be parameterized by the refractive index or angular reflection/transmission of light. This angular reflection is known as a bi-directional reflectance distribution function (BRDF), although other functional forms may more accurately represent certain scenarios. For example, the bidirectional subsurface scattering distribution function (BSSRDF) would be more accurate in the context of materials that exhibit subsurface scattering (e.g. marble or wax).

A light ray 310 hitting the image sensor 16 of a polarization camera 10 has three measurable components: the intensity of light (intensity image/I), the percentage or proportion of light that is linearly polarized (degree of linear polarization/DOLP/p), and the direction of that linear polarization (angle of linear polarization/AOLP/p). These properties encode information about the surface curvature and material of the object being imaged, which can be used by the predictor 750 to detect transparent objects, as described in more detail below. In some embodiments, the predictor 750 can detect other optically challenging objects based on similar polarization properties of light passing through translucent objects and/or light interacting with multipath inducing objects or by non-reflective objects (e.g., matte black objects).

Therefore, some aspects of embodiments of the present invention relate to using a feature extractor 700 to compute first tensors in one or more first representation spaces, which may include derived feature maps based on the intensity I, the DOLP $\rho$, and the AOLP $\phi$. The feature extractor 700 may generally extract information into first representation spaces (or first feature spaces) which include polarization representation spaces (or polarization feature spaces) such as "polarization images," in other words, images that are extracted based on the polarization raw frames that would not otherwise be computable from intensity images (e.g., images captured by a camera that did not include a polarizing filter or other mechanism for detecting the polarization of light reaching its image sensor), where these polarization images may include DOLP $\rho$ images (in DOLP representation space or feature space), AOLP $\phi$ images (in AOLP representation space or feature space), other combinations of the polarization raw frames as computed from Stokes vectors, as well as other images (or more generally first tensors or first feature tensors) of information computed from polarization raw frames. The first representation spaces may include non-polarization representation spaces such as the intensity I representation space.

Measuring intensity I, DOLP $\rho$, and AOLP $\phi$ at each pixel requires 3 or more polarization raw frames of a scene taken behind polarizing filters (or polarizers) at different angles, $\phi_{pol}$ (e.g., because there are three unknown values to be determined: intensity I, DOLP $\rho$, and AOLP $\phi$. For example, the FLIR® Blackfly® S Polarization Camera described above captures polarization raw frames with polarization angles $\phi_{pol}$ at 0 degrees, 45 degrees, 90 degrees, or 135 degrees, thereby producing four polarization raw frames $I_{\phi_{pol}}$, denoted herein as $I_0$, $I_{45}$, $I_{90}$, and $I_{135}$.

The relationship between $I_{\phi_{pol}}$ and intensity I, DOLP $\rho$, and AOLP $\phi$ at each pixel can be expressed as:

$$I_{\phi_{pol}} = I(1 + \rho \cos(2(\phi - \phi_{pol}))) \quad (1)$$

Accordingly, with four different polarization raw frames $I_{\phi_{pol}}$ ($I_0$, $I_{45}$, $I_{90}$, and $I_{135}$), a system of four equations can be used to solve for the intensity I, DOLP $\rho$, and AOLP $\phi$.

Shape from Polarization (SfP) theory (see, e.g., Gary A Atkinson and Edwin R Hancock. Recovery of surface orientation from diffuse polarization. IEEE transactions on image processing, 15(6):1653-1664, 2006) states that the relationship between the refractive index (n), azimuth angle ($\theta_a$) and zenith angle ($\theta_z$) of the surface normal of an object and the $\phi$ and $\rho$ components of the light ray coming from that object follow the following characteristics when diffuse reflection is dominant:

$$\rho = \frac{\left(n - \frac{1}{n}\right)^2 \sin^2(\theta_z)}{2 + 2n^2 - \left(n + \frac{1}{n}\right)^2 \sin^2\theta_z + 4\cos\theta_z\sqrt{n^2 - \sin^2\theta_Z}} \quad (2)$$

$$\phi = \theta_a \quad (3)$$

and when the specular reflection is dominant:

$$\rho = \frac{2\sin^2\theta_z\cos\theta_z\sqrt{n^2 - \sin^2\theta_z}}{n^2 - \sin^2\theta_z - n^2\sin^2\theta_z + 2\sin^4\theta_z} \quad (4)$$

$$\phi = \theta_a - \frac{\pi}{2} \quad (5)$$

Note that in both cases $\rho$ increases exponentially as $\theta_z$ increases and if the refractive index is the same, specular reflection is much more polarized than diffuse reflection.

Accordingly, some aspects of embodiments of the present disclosure relate to applying SfP theory to detect the shapes of surfaces (e.g., the orientation of surfaces) based on the raw polarization frames 18 of the surfaces. This approach enables the shapes of objects to be characterized without the use of other computer vision techniques for determining the shapes of objects, such as time-of-flight (ToF) depth sensing and/or stereo vision techniques, although embodiments of the present disclosure may be used in conjunction with such techniques.

More formally, aspects of embodiments of the present disclosure relate to computing first tensors 50 in first representation spaces, including extracting first tensors in polarization representation spaces such as forming polarization images (or extracting derived polarization feature maps) in operation 650 based on polarization raw frames captured by a polarization camera 10.

Light rays coming from a transparent objects have two components: a reflected portion including reflected intensity $I_r$, reflected DOLP $\rho_r$, and reflected AOLP $\phi_r$, and the refracted portion including refracted intensity $I_t$, refracted DOLP $\rho_t$, and refracted AOLP $\phi_t$. The intensity of a single pixel in the resulting image can be written as:

$$I = I_r + I_t \quad (6)$$

When a polarizing filter having a linear polarization angle of $\phi_{pol}$ is placed in front of the camera, the value at a given pixel is:

$$I_{\phi pol} = I_r(1+\rho_r \cos(2(\phi_r-\phi_{pol}))) + I_t(1+\rho_t \cos(2(\phi_t-\phi_{pol}))) \quad (7)$$

Solving the above expression for the values of a pixel in a DOLP $\rho$ image and a pixel in an AOLP $\phi$ image in terms of $I_r$, $\rho_r$, $\phi_r$, $I_t$, $\rho_t$, and $\phi_t$:

$$\rho = \frac{\sqrt{(I_r\rho_r)^2 + (I_t\rho_t)^2 + 2I_t\rho_t I_r\rho_r \cos(2(\phi_r - \phi_t))}}{I_r + I_t} \quad (8)$$

$$\phi = \arctan\left(\frac{I_r\rho_r \sin(2(\phi_r - \phi_t))}{I_t\rho_t + I_r\rho_r \cos(2(\phi_r - \phi_t))}\right) + \phi_r \quad (9)$$

Accordingly, equations (7), (8), and (9), above, provide a model for forming first tensors 50 in first representation spaces that include an intensity image I, a DOLP image $\rho$, and an AOLP image $\phi$ according to one embodiment of the present disclosure, where the use of polarization images or tensor in polarization representation spaces (including DOLP image $\rho$ and an AOLP image based on equations (8) and (9)) enables the reliable detection of optically challenging surface characteristics of objects that are generally not detectable by comparative systems that use only intensity I images as input.

Equations (8) and (9), above, can be represented more generally in accordance with Stokes parameters:

$$\rho = \frac{\sqrt{(S_1)^2 + (S_2)^2}}{S_0} \quad (10)$$

$$\phi = 0.5 * \arctan\frac{S_2}{S_1} \quad (11)$$

where $S_0$, $S_1$, and $S_2$ are the Stokes parameters.

In more detail, first tensors in polarization representation spaces (among the derived feature maps 50) such as the polarization images DOLP $\rho$ and AOLP $\phi$ can reveal surface characteristics of objects that might otherwise appear textureless in an intensity I domain. A transparent object may have a texture that is invisible in the intensity domain I because this intensity is strictly dependent on the ratio of $I_r/I_t$ (see equation (6)). Unlike opaque objects where $I_t=0$, transparent objects transmit most of the incident light and only reflect a small portion of this incident light. As another example, thin or small deviations in the shape of an otherwise smooth surface (or smooth portions in an otherwise rough surface) may be substantially invisible or have low contrast in the intensity I domain (e.g., a domain that does not encode polarization of light), but may be very visible or may have high contrast in a polarization representation space such as DOLP $\rho$ or AOLP $\phi$.

As such, one exemplary method to acquire surface topography is to use polarization cues in conjunction with geometric regularization. The Fresnel equations relate the AOLP $\phi$ and the DOLP $\rho$ with surface normals. These equations can be useful for detecting optically challenging objects by exploiting what is known as polarization patterns of the surfaces of these optically challenging objects. A polarization pattern is a tensor of size [M, N, K] where M and N are horizontal and vertical pixel dimensions, respectively, and where K is the polarization data channel, which can vary in size. For example, if circular polarization is ignored and only linear polarization is considered, then K would be equal to two, because linear polarization has both an angle and a degree of polarization (AOLP $\phi$ and DOLP $\rho$). Analogous to a Moire pattern, in some embodiments of the present disclosure, the feature extraction module 700 extracts a polarization pattern in polarization representation spaces (e.g., AOLP space and DOLP space).

While the preceding discussion provides specific examples of polarization representation spaces based on linear polarization in the case of using a polarization camera having one or more linear polarizing filters to capture polarization raw frames corresponding to different angles of linear polarization and to compute tensors in linear polarization representation spaces such as DOLP and AOLP, embodiments of the present disclosure are not limited thereto. For example, in some embodiments of the present disclosure, a polarization camera includes one or more circular polarizing filters configured to pass only circularly polarized light, and where polarization patterns or first tensors in circular polarization representation space are further extracted from the polarization raw frames. In some embodiments, these additional tensors in circular polarization representation space are used alone, and in other embodiments they are used together with the tensors in linear polarization representation spaces such as AOLP and DOLP. For example, a polarization pattern including tensors in polarization representation spaces may include tensors in circular polarization space, AOLP, and DOLP, where the polarization pattern may have dimensions [M, N, K], where K is three to further include the tensor in circular polarization representation space.

Accordingly, some aspects of embodiments of the present disclosure relate to supplying first tensors in the first representation spaces (e.g., including feature maps in polarization representation spaces) extracted from polarization raw frames as inputs to a predictor for computing or detecting surface characteristics of transparent objects and/or other optically challenging surface characteristics of objects under inspection. These first tensors may include derived feature maps which may include an intensity feature map I, a degree of linear polarization (DOLP) $\rho$ feature map, and an angle of linear polarization (AOLP) $\phi$ feature map, and where the DOLP $\rho$ feature map and the AOLP $\phi$ feature map are examples of polarization feature maps or tensors in polarization representation spaces, in reference to feature maps that encode information regarding the polarization of light detected by a polarization camera.

In some embodiments, the feature maps or tensors in polarization representation spaces are supplied as input to, for example, detection algorithms that make use of SfP theory to characterize the shape of surfaces of objects imaged by the polarization cameras 10. For example, in some embodiments, in the case of diffuse reflection, equations (2) and (3) are used to compute the zenith angle ($\theta_z$) and the azimuth angle ($\theta_a$) of the surface normal of a surface in the scene based on the DOLP $\rho$ and the index of refraction n. Likewise, in the case of specular reflection, equations (3) and (5) are used to compute the zenith angle ($\theta_z$) and the azimuth angle ($\theta_a$) of the surface normal of a surface in the scene based on the DOLP ρ and the index of refraction n. As one example, a closed form solution for computing the zenith angle ($\theta_z$) based on Equation (2) according to one embodiment of the present disclosure in accordance with the following steps:

$$aa = \left(n - \frac{1}{n}\right)^2 + \rho\left(n + \frac{1}{n}\right)^2$$

$$bb = 4\rho(n^2 + 1)(aa - 4\rho)$$

$$cc = bb^2 + 16\rho^2(16\rho^2 - aa^2)(n^2 - 1)^2$$

$$dd = \sqrt{\frac{-bb - \sqrt{cc}}{2(16\rho^2 - aa^2)}}$$

$$\theta_z = aa \sin dd$$

Additional details on computing surface normal directions based on polarization raw frames can be found, for example, in U.S. Pat. Nos. 10,260,866 and 10,557,705 and Kadambi, Achuta, et al. "Polarized 3D: High-quality depth sensing with polarization cues." *Proceedings of the IEEE International Conference on Computer Vision.* 2015, the entire disclosures of which are incorporated by reference herein.

Computing Polarization Cues from Multi-Camera Arrays

Ordinarily, multipolar cues are obtained from a monocular viewpoint. Existing methods use multipolar filters (e.g., a polarization mask as shown in FIG. 1B) or multiple CCD or CMOS sensors to multiplex different polarization channels in a single view (e.g., multiple sensors behind a single lens system) or time multiplexed systems (e.g., where different polarization raw frames are captured at different times, such as sequentially captured, which may require that the scene 1 remain substantially or constant from one capture to the next in order for the views to be the same). In particular, the techniques described above for calculating polarization cues such as the angle of linear polarization (AOLP) φ and the degree of linear polarization (DOLP) ρ generally assume that the polarization raw frames are captured from the same viewpoint.

However, there are some circumstances in which the above assumption of a single viewpoint may not hold. For example, polarization raw frames corresponding to different polarization states may be captured from different viewpoints when using a polarization camera array that includes multiple polarization cameras at different locations, such as the embodiments shown in FIGS. 1C, 1D, and 1E. While placing the individual polarization cameras closer together may reduce error, physical constraints (e.g., the size of the individual polarization cameras, such as the size and shape of their corresponding packaging as well as lenses and image sensors contained therein) may limit the placement of the polarization cameras.

Accordingly, some aspects of embodiments of the present disclosure relate to systems and methods for computing polarization cues such as AOLP φ and DOLP ρ from polarization raw frames captured from different viewpoints, such as by using an array of polarization cameras. Generally, this involves a technique for decoupling parallax cues due to the different positions of the separate polarization cameras and the desired polarization cues. This is challenging because parallax cues and polarization cues are linked in that both the parallax between two views and the sensed polarization are related to the geometry of the relationship between the polarization cameras and the imaged surface. The comparative approaches to obtaining AOLP and DOLP assume that the polarization channels are acquired from the same viewpoint and therefore applying comparative techniques to the data captured by the array of polarization cameras likely results in errors or ambiguity.

Figure 4:
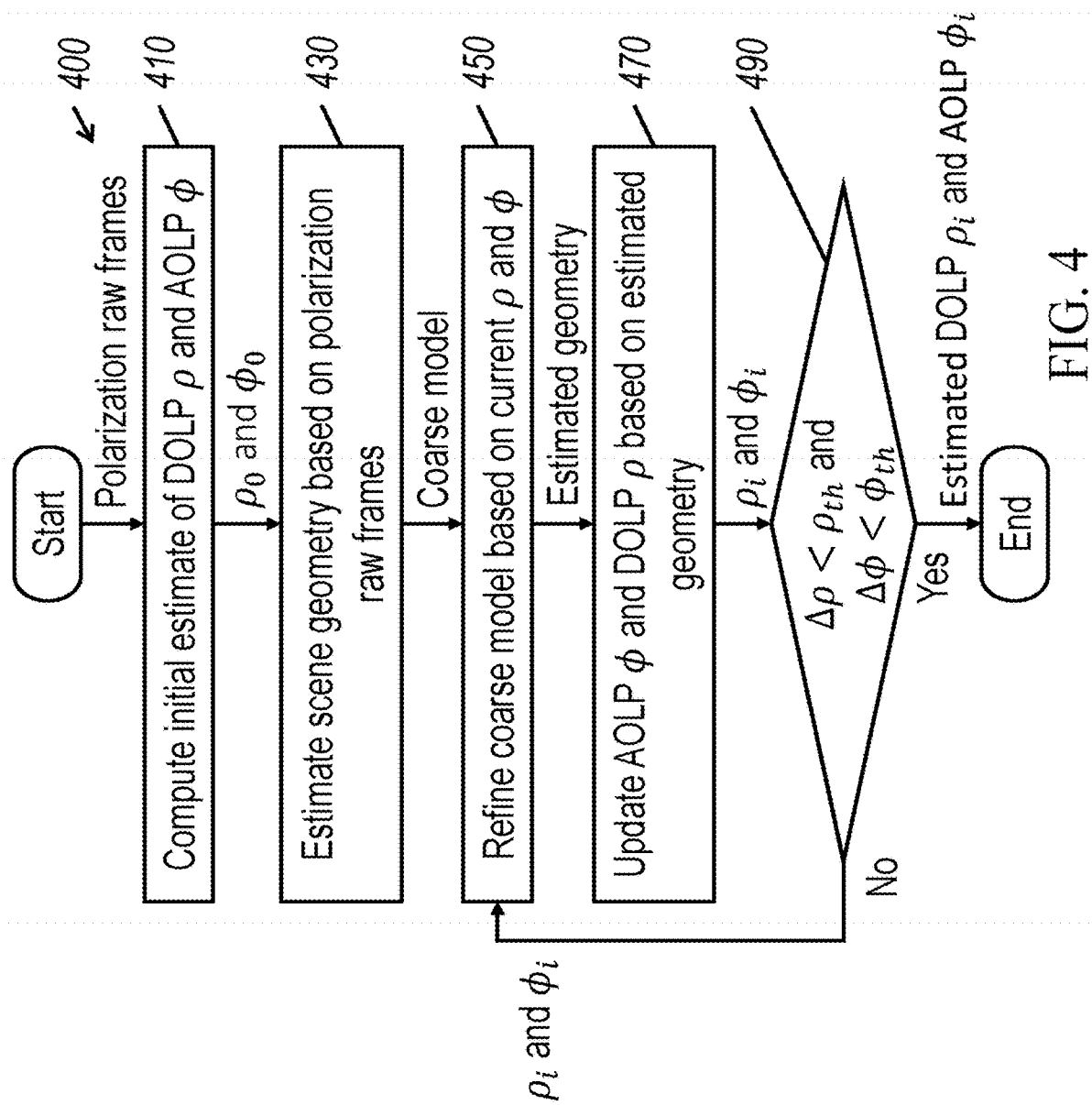
FIG. 4 is a flowchart of a method for estimating polarization cues under parallax ambiguities according to one embodiment of the present disclosure.

FIG. 4 is a flowchart of a method for estimating polarization cues under parallax ambiguities according to one embodiment of the present disclosure. In the embodiment shown in FIG. 4, polarization raw frames captured from a plurality of different viewpoints, such as by an array of polarization cameras such as that shown in FIGS. 1C, 1D, and 1E are supplied as input to the process. In some embodiments of the present disclosure, estimates of the DOLP ρ and AOLP φ in accordance with embodiments of the present disclosure are computed by a processing circuit 100 through an iterative process. Note that the estimated DOLP ρ and estimated AOLP φ correspond to tensors (e.g., two dimensional tensors) having aspect ratios corresponding to the polarization raw frames, e.g., where the values of the DOLP ρ tensor and AOLP φ tensor correspond to the estimated degree of linear polarization and the angle of linear polarization in various portions of the captured polarization raw frames.

In operation 410, the processing circuit computes an initial estimated DOLP $\rho_0$ and an initial estimated AOLP $\phi_0$ using the Stokes vectors (e.g., in accordance with equations (10) and (11), above or, more specifically, in accordance with equations (8) and (9). These initial estimated DOLP $\rho_0$ and AOLP $\phi_0$ will likely be incorrect due to the parallax shift between the different individual polarization cameras of the polarization camera array.

In operation 430, the processing circuit 100 estimates the geometry of the surfaces of the scene depicted in the polarization raw frames. In some embodiments of the present disclosure, the processing circuit 100 uses a view correspondence-based approach to generate a coarse model of the scene using parallax from the stereo view of the scene, due to the offset between the locations of the cameras in the array (e.g., using depth from stereo techniques, as discussed, for example, in Kadambi, A. et al. (2015)). In operation 450, this coarse geometry may then be refined using the current calculated DOLP $\rho_i$ and AOLP $\phi_i$ values (initially, i=0) (see, e.g., U.S. Pat. Nos. 10,260,866 and 10,557,705 and Kadambi, A. et al. (2015)).

The estimated geometry computed in operation 450 is then used to update the estimated values of the DOLP ρ and the AOLP φ. For example, in an i-th iteration, a previously calculated DOLP $\rho_{i-1}$ and a previously calculated AOLP $\phi_{i-1}$ may be used to compute the estimated geometry in operation 450 and, in operation 470, the processing system 100 refines the DOLP and AOLP calculations based on the new estimated geometry (in accordance with the Fresnel equations that relate AOLP and DOLP to slope) to compute new estimates DOLP $\rho_i$ and AOLP $\phi_i$.

In operation 490, the processing system 100 determines whether to continue with another iteration of the process of estimating the DOLP ρ and AOLP φ. In more detail, in some embodiments, a change in the DOLP Δρ is computed based on the difference between the updated DOLP $\rho_i$ and the previously calculated DOLP $\rho_{i-1}$ (e.g., $\Delta\rho=|\rho_i-\rho_{i-1}|$). Likewise, a change in the AOLP Δφ is computed based on the difference between the updated AOLP $\phi_i$ and the previously calculated AOLP $\phi_{i-1}$ (e.g., $\Delta\phi=|\phi_i-\phi_{i-1}|$). If either of these changes in polarization cues (e.g., both Δρ and Δφ) is greater than corresponding threshold values (e.g., $\rho_{th}$ and $\phi_{th}$) across the computed tensors, then the process continues by using the updated DOLP $\rho_i$ and AOLP $\phi_i$ to refine the coarse model in operation 450, and then updating the DOLP and AOLP values based on this new estimated geometry. If both of the changes in the polarization cues are less than their corresponding thresholds, then the estimation process is complete and the estimated DOLP $\rho_i$ and AOLP are output from the estimation process, and may be used in computing further processing outputs, such as instance segmentation maps.

Multi-Spectral Stereo with Polarization Imaging

In many circumstances, such as in remote sensing, multi-spectral images of scenes are capable of capturing information that would otherwise be hidden from view. For example, multi-spectral or hyper-spectral imaging is capable of detecting surface properties of scenes, such as detecting soil properties like moisture, organic content, and salinity, oil impacted soils, which may be useful in agriculture. As another example, multi-spectral imaging may enable the detection of camouflaged targets, such as military vehicles under partial vegetation cover or small military objects within relatively larger pixels. As a further example, multi-spectral imaging enables material identification and mapping, such as detecting the presence or absence of materials in relief geography, mapping of heavy metals and other toxic wastes in mining areas. Multi-spectral imaging also enables the detection of the presence of particular materials, such as water/oil spills (this is of particular importance to indoor robots so they can avoid or perform path planning around these spills and for robotic vacuum cleaners to detect, locate, and clean up spills and other small, dark, and/or specular dirt). Multi-spectral imaging may also be used for material inspection, such as detecting cracks and rust in industrial equipment such as industrial boilers and railway tracks, in which failure can be extremely hazardous and where recovery can be expensive.

In these above examples, computer vision techniques that use comparative and standard color images (e.g., red, green, and blue images) as input, may not be able to detect these types of objects, but the use of multi-spectral or hyper-spectral imaging, combined with polarization information, may provide additional cues that can be detected and recognized by computer vision algorithms and instance detection techniques (e.g., using trained convolutional neural networks).

Generally, the spectral radiance of a surface measures the rate of photons reflected from a surface as a function of surface area, slope, and incident wavelength. The spectral radiance function of most natural images are regular functions of wavelengths which makes it possible to represent these using a low-dimensional linear model. In other words, the spectral representation of light reflected from the surface can be represented as a linear combination of spectral basis functions:

$$s \approx \sum_{i=0}^{n} w_i B_i \quad (12)$$

where $w_i$ are the linear weights, $B_i$ represents the spectral basis function, and n is the dimensionality of the system. Related work in the area of spectral radiance profiles of natural objects show that, for the most part, the spectral radiance of natural objects can be represented accurately by five or six linear basis functions.

Accordingly, some aspects embodiments of the present disclosure, relate to collecting spectral information simultaneously with polarization information using a stereo imaging pair wherein each camera system (or camera module) of the stereo pair includes a camera array that allows for capturing both the spectral and polarization information.

Figure 5A:
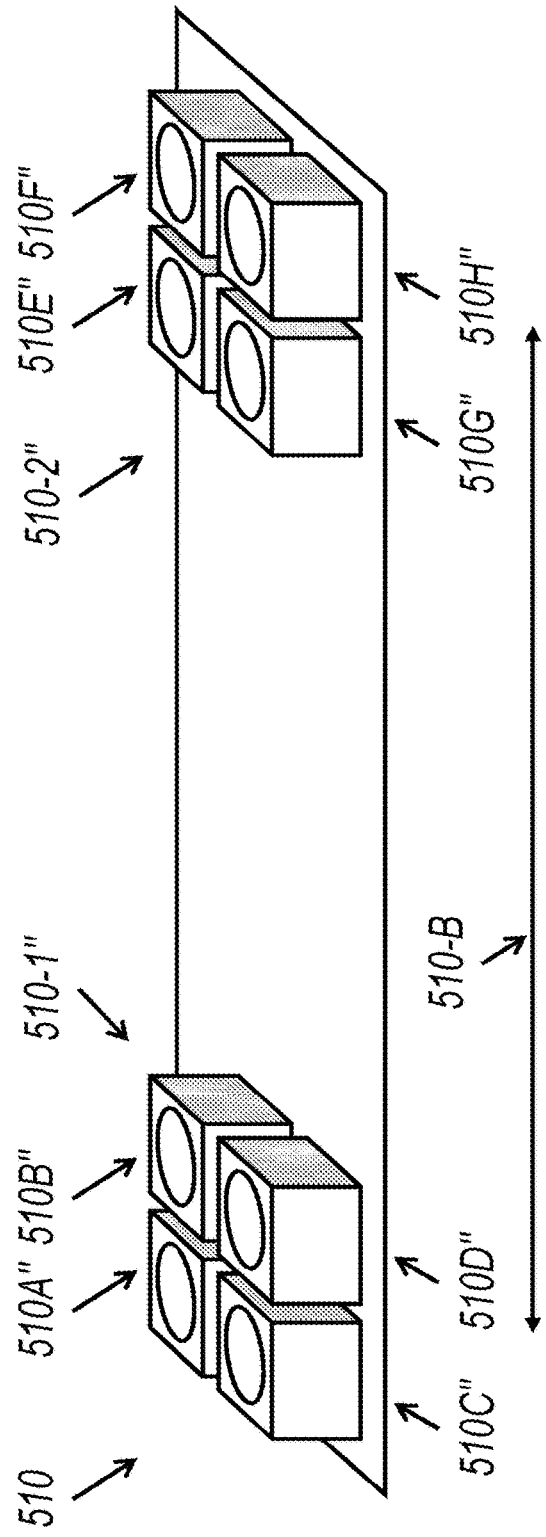
FIG. 5A is a perspective view of a multi-spectral stereo polarization camera system according to one embodiment of the present disclosure.

FIG. 5A is a perspective view of a multi-spectral stereo polarization camera system according to one embodiment of the present disclosure. Embodiments of a multi-spectral stereo polarization camera system as shown in FIG. 5A are substantially similar to the stereo polarization camera system shown in FIG. 1E in that FIG. 5A depicts a multi-spectral stereo polarization camera system 510 having a first polarization camera module 510-1" and a second polarization camera module 510-2" having substantially parallel optical axes and spaced apart along a baseline 510-B. In the embodiment shown in FIG. 5A, the first polarization camera module 510-1" and includes polarization cameras 510A", 510B", 510C", and 510D" arranged in a 2×2 array similar to that shown in FIGS. 1C and 1D. Likewise, the second polarization camera module 510-2" and includes polarization cameras 510E", 510F", 510G", and 510H" arranged in a 2×2 array, and the overall multi-spectral stereo polarization camera module 510 includes eight individual polarization cameras (e.g., eight separate image sensors behind eight separate lenses). In some embodiments of the present disclosure, corresponding polarization cameras of polarization camera modules 510-1" and 510-2" are configured to capture polarization raw frames with substantially the same polarizations. For example, cameras 510A" and 510E" may both have linear polarizing filters at a same angle of 0°, cameras 510B" and 510F" may both have linear polarizing filters at a same angle of 45°, cameras 510C" and 510G" may both have linear polarizing filters at a same angle of 90°, and cameras 510D" and 510H" may both have linear polarizing filters at a same angle of 135°.

Figure 5B:
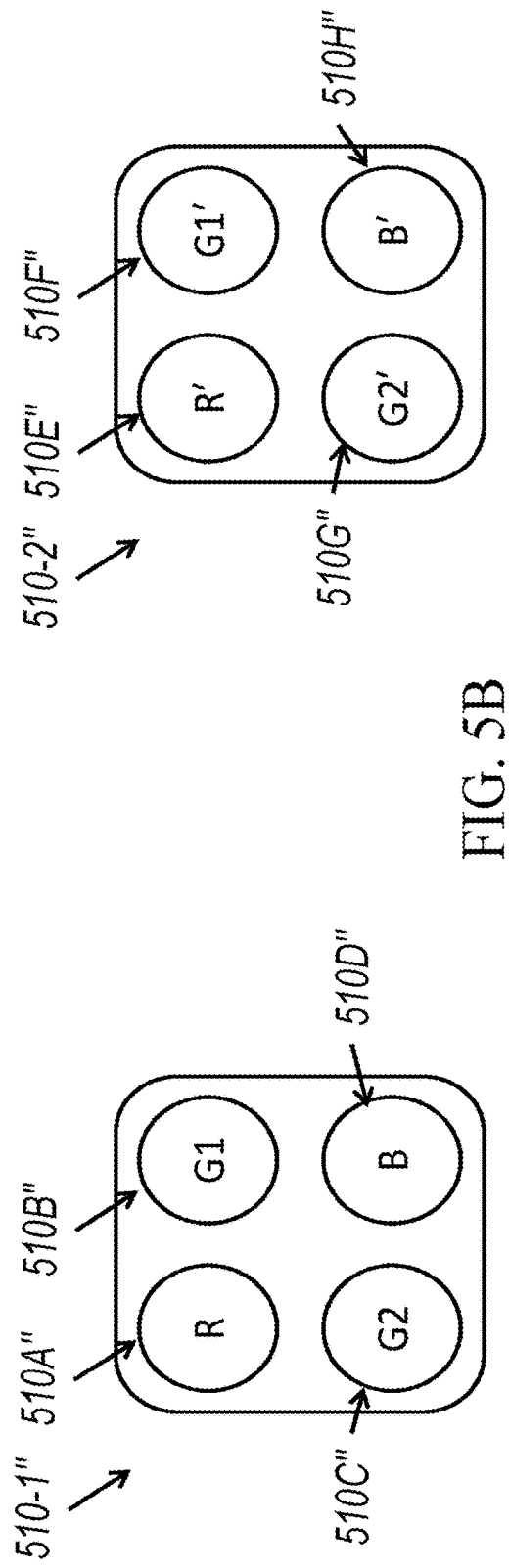
FIG. 5B is a view of a multi-spectral stereo polarization camera system according to one embodiment of the present disclosure, along a direction parallel to the optical axis of the multi-spectral stereo polarization camera system.
Figure 5C:
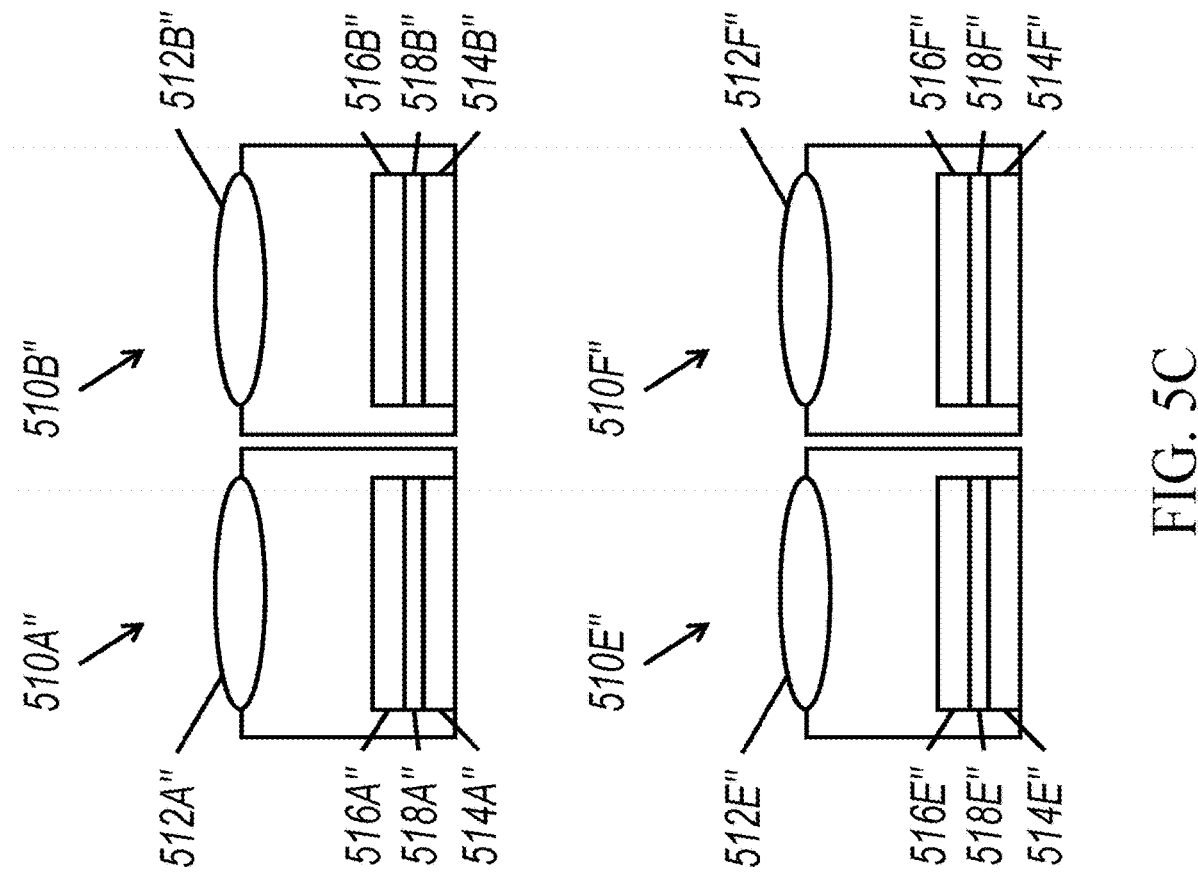
FIG. 5C depicts cut-away side views of example individual polarization cameras of a multi-spectral stereo polarization camera system according to one embodiment of the present disclosure.

FIG. 5B is a view of a multi-spectral stereo polarization camera system according to one embodiment of the present disclosure, along a direction parallel to the optical axis of the multi-spectral stereo polarization camera system. FIG. 5C depicts cut-away side views of example individual polarization cameras of a multi-spectral stereo polarization camera system according to one embodiment of the present disclosure. As shown in FIG. 5C, each of the individual polarization cameras (e.g., 510A", 510B", 510E", and 510F") includes a corresponding color filter 518 (e.g., 518A", 518B", 518E", and 518F") in the optical path of the individual polarization camera, in addition to a corresponding lens 512, a corresponding image sensors 514, and a corresponding polarizing filter 516. While FIG. 5C depicts the color filter 518 as being within a housing and behind the lens 512, embodiments of the present disclosure are not limited thereto. For example, in some embodiments, the color filter 518 is located in front of the lens 512. Likewise, in some embodiments, the polarizing filter is located in front of the lens 512.

In the embodiment shown in FIG. 5B, each of the individual polarization cameras includes a color filter that transmits light in only one corresponding portion of the visible spectrum (as opposed to a Bayer filter, which has a mosaic pattern and that typically transmits light in three different portions of the spectrum corresponding to red, green, and blue light). In the example embodiment shown in FIG. 5B, first polarization camera 510A" has a color filter 518A" that is configured to transmit light in a red (R) portion of the spectrum, second polarization camera 510B" has a color filter 518B" that is configured to transmit light in a first green (G1) portion of the spectrum, third polarization camera 510C" has a color filter 518C" that is configured to transmit light in a second green (G2) portion of the spectrum (which may be different from the first green portion G1 of the spectrum, e.g., with a peak shifted by 15 to 20 nm), and fourth polarization camera 510D" has a color filter 518D" that is configured to transmit light in a blue (B) portion of the spectrum. Together, the four polarization cameras of the first polarization camera module 510-1" capture light at four different polarization states (e.g., four different linear polarizations of 0°, 45°, 90°, and 135°) and four different colors (e.g., R, G1, G2, and B). In the particular embodiment shown in FIG. 5B, for example, the first polarization camera 510A" captures red light polarized at 0°, the second polarization camera 510B" captures first green light polarized at 45°, the third polarization camera 510C" captures second green light polarized at 90°, and the fourth polarization camera 510D" captures blue light polarized at 135°. However, embodiments of the present disclosure are not limited thereto. For example, in various embodiments the color filters may be associated with different polarizing filters.

In a similar manner, the individual polarization cameras (e.g., cameras 510E", 510F", 510G", and 510BH") of the second polarization camera module 510-2" includes a separate color filter 518 that are configured to transmit light in different portions of the electromagnetic spectrum and different from one another. In some embodiment of the present invention, each of the color filters of the second polarization camera module 510-2" transmits light in a portion of the spectrum that is shifted by some amount (e.g., where the peak of the spectral profile of the color filter is shifted, either toward the longer wavelengths or toward shorter wavelengths, by about 10 nanometers to about 20 nanometers) from the corresponding color filter in the first polarization camera module 510-1".

In the example embodiment shown in FIG. 5B, fifth polarization camera 510E" has a color filter 518E" that is configured to transmit light in a red (R') portion of the spectrum that is shifted by about 10 to 20 nanometers from the spectrum R transmitted by corresponding color filter 518A" of the corresponding polarization camera 510A" of the first polarization camera module 510-1". Likewise, sixth polarization camera 510F" has a color filter 518F" that is configured to transmit light in a first green (G1') portion of the spectrum that is shifted by about 10 to 20 nanometers from the spectrum G1 transmitted by corresponding color filter 518B" of the corresponding polarization camera 510B" of the first polarization camera module 510-1" (and, in some embodiments, also a different spectrum from spectrum G2). The seventh polarization camera 510G" has a color filter 518G" that is configured to transmit light in a second green (G2') portion of the spectrum that is shifted by about 10 to 20 nanometers from the spectrum G2 transmitted by corresponding color filter 518C" of the corresponding polarization camera 510C" of the first polarization camera module 510-1" (and, in some embodiments, also a different spectrum for spectrum G1). The eighth polarization camera 510H" has a color filter 518H" that is configured to transmit light in a blue (B') portion of the spectrum that is shifted by about 10 to 20 nanometers from the spectrum B transmitted by corresponding color filter 518D" of the corresponding polarization camera 510D" of the first polarization camera module 510-1".

Together, the four polarization cameras of the second polarization camera module 510-2" capture light at four different polarization states (e.g., four different linear polarizations of 0°, 45°, 90°, and 135°) and four different colors (e.g., R', G1', G2', and B') that are also different from the four colors captured by the first polarization camera module 510-1". As a result, the multi-spectral stereo polarization camera system 510 shown in FIGS. 5A, 5B, and 5C is configured to detect light of eight different colors and at four different polarization angles.

While some embodiments of the present disclosure are described in detail above with respect to FIGS. 5A, 5B, and 5C, embodiments of the present disclosure are not limited thereto. For example, as noted above, in some embodiments of the present disclosure, each polarization camera module may include only three polarization cameras. In some embodiments, the three individual polarization cameras may include corresponding linear polarizers with linear polarization filters at 0°, 45°, and 90° or at 0°, 60°, and 120°. In some embodiments, the three individual polarization cameras of the first polarization camera module have corresponding color filters to transmit red (R), green (G), and blue (B) light having corresponding first spectral profiles, and the three individual polarization cameras of the second polarization camera module may have corresponding color filters to transmit red (R'), green (G'), and blue (B') light having second spectral profiles that are different from the first spectral profile (e.g., where each of the second spectral profiles is shifted from corresponding first spectral profiles by 10 to 20 nm).

In addition, while some embodiments of the present disclosure are described above with respect to color filters that transmit different portions of the visible electromagnetic spectrum, embodiments of the present disclosure are not limited thereto, and may also include the use of color filters that selectively transmit light in other portions of the electromagnetic spectrum, such as infrared light or ultraviolet light.

In some embodiments of the present disclosure, the two different polarization camera modules of the multi-spectral stereo polarization camera system include polarization cameras that are configured to capture polarization raw frames of different polarization states (e.g., different polarization angles), such as using a polarization mask as shown in FIG. 1B or a mechanically or electronically controllable polarizing filter. According to some embodiments of the present disclosure, each polarization camera further includes a color filter configured to filter light in a plurality of colors in accordance to a mosaic pattern such as a Bayer pattern, where each polarization camera may have a different color filter to enable multi-spectral or hyper-spectral capture. For example, in some embodiments, a first polarization camera of a stereo pair includes a first color filter configured to capture light in the R, G1, G2, B spectra (or R, G, B spectra), as described above, and a second polarization camera of the stereo pair includes a second color filter configured to capture light in the R', G1', G2', B' spectra (or R', G', B'), as described above.

Some aspects of embodiments of the present disclosure relate to capturing multi-spectral scenes using hardware arrangements such as those discussed above by determining the spectral basis functions for representation. By estimating the spectral power distribution of scene illumination and using the spectral reflectivity function of the Macbeth color chart, it is possible to simulate a set of basis functions B representing that illumination. This becomes especially feasible when estimating the spectral profile of natural sunlight for outdoor use as is typically the case with multispectral imaging for geo-spatial applications. Once the spectral basis functions are determined, it is straightforward to determine the spectral coefficients for each scene by simply solving for w (weights) in the following equation $$p = TS = TBw \tag{13}$$

where, p represents the pixel values in the different spectral (color) channels (e.g., eight different color channels R, G1, G2, B, R', G1', G2', and B'), T represents the spectral responsivities of the various spectral channels (e.g., the captured values), S is the illumination source, which can be decomposed into a spectral basis, B represents the spectral basis functions, and w represents the coefficients for the basis functions.

Accordingly, applying equation (13) above enables computation of per-pixel polarization information as well as spectral information.

The multi-spectral or hyper-spectral information computed from multi-spectral hardware, such as that described above, maybe supplied as inputs to other object detection or instance segmentation algorithms (e.g., using convolutional neural networks that are trained or retrained based on labeled multi-spectral polarization image training data), or may be supplied as inputs to classical computer vision algorithms (e.g., such as for detecting the depth of surfaces based on parallax shift of multi-spectral and polarization cues) for detecting the presence of objects in the scenes imaged by stereo multi-spectral polarization camera systems according to embodiments of the present disclosure.

While some embodiments of the present disclosure as described above relate to multi-viewpoint multi-spectral polarization imaging using a stereo camera system (e.g., a stereo pair), embodiments of the present disclosure are not limited thereto. For example, in some embodiments of the present disclosure, a multi-spectral camera system (e.g., using a camera system configured to capture six or more different spectra, such as R, G, B, R', G', and B', as discussed above) sweeps across multiple viewpoints over time, such as when an object of interest is located on a conveyor belt that passes through the field of view of the camera system, or where the camera system moves across the field of view of the object of interest.

As one example, for applications in satellite imaging one has the added advantage of viewing the scene from multiple angles that are highly correlated. The systematic way in which satellites move in straight lines above a given point on the ground allows satellites to obtain highly correlated multi-spectral and polarization data of the surfaces of the ground for each viewing angle across a wide range of viewing angles. Accordingly, in some embodiments of the present disclosure, a processing system 100 determines, for each point on the ground, the optimal angle at which the degree of polarization (DOLP) signal is strongest, thereby providing a strong correlation as to its surface orientation. See, e.g., equations (2) and (4). In addition, because specularity is generally highly viewpoint dependent, most of the views of a given surface will be non-specular, such that equation (2) may be sufficient to compute the orientation of the surface being imaged, without needing to select between the non-specular (or diffuse) equation versus the specular equation (4).

In addition, satellite imaging enables the capture of images of objects captured from very different viewpoints. This large baseline enables the estimation of coarse distances of ground-based objects by leveraging multispectral imaging with polarization and parallax shifts due to the large changes in position. Detecting these coarse distances provides information for disaster management, power transmission line monitoring, and security. For example, utility companies are concerned with the uncontrolled growth of vegetation in and around power transmission and distribution lines due to risks of fire or damage to the transmission lines. By imaging the areas around the power lines from different viewpoints, detecting the parallax shift of the objects when viewed from different viewpoints enables estimations of the surface height of the vegetation and the height of the transmission and distribution lines. Accordingly, this enables the automatic detection of when ground vegetation reaches critical thresholds with respect to proximity of said lines with respect to vegetation growth. To monitor such data both at day and night, some embodiments of the present disclosure relate to fusing polarization data with thermal sensors (e.g., infrared sensors) to provide clear heat signatures irrespective of illumination conditions.

Image Segmentation Using Polarimetric Cues

Some aspects of embodiments of the present disclosure relate to performing instance segmentation using polarimetric cues captured in accordance with embodiments of the present disclosure. Some techniques for performing instance segmentation using polarimetric cues are described in more detail in U.S. Provisional Patent Application No. 62/942,113, filed in the United States Patent and Trademark Office on Nov. 30, 2019 and U.S. Provisional Patent Application No. 63/001,445, filed in the United States Patent and Trademark Office on Mar. 29, 2020, the entire disclosures of which are incorporated by reference herein.

Figure 6A:
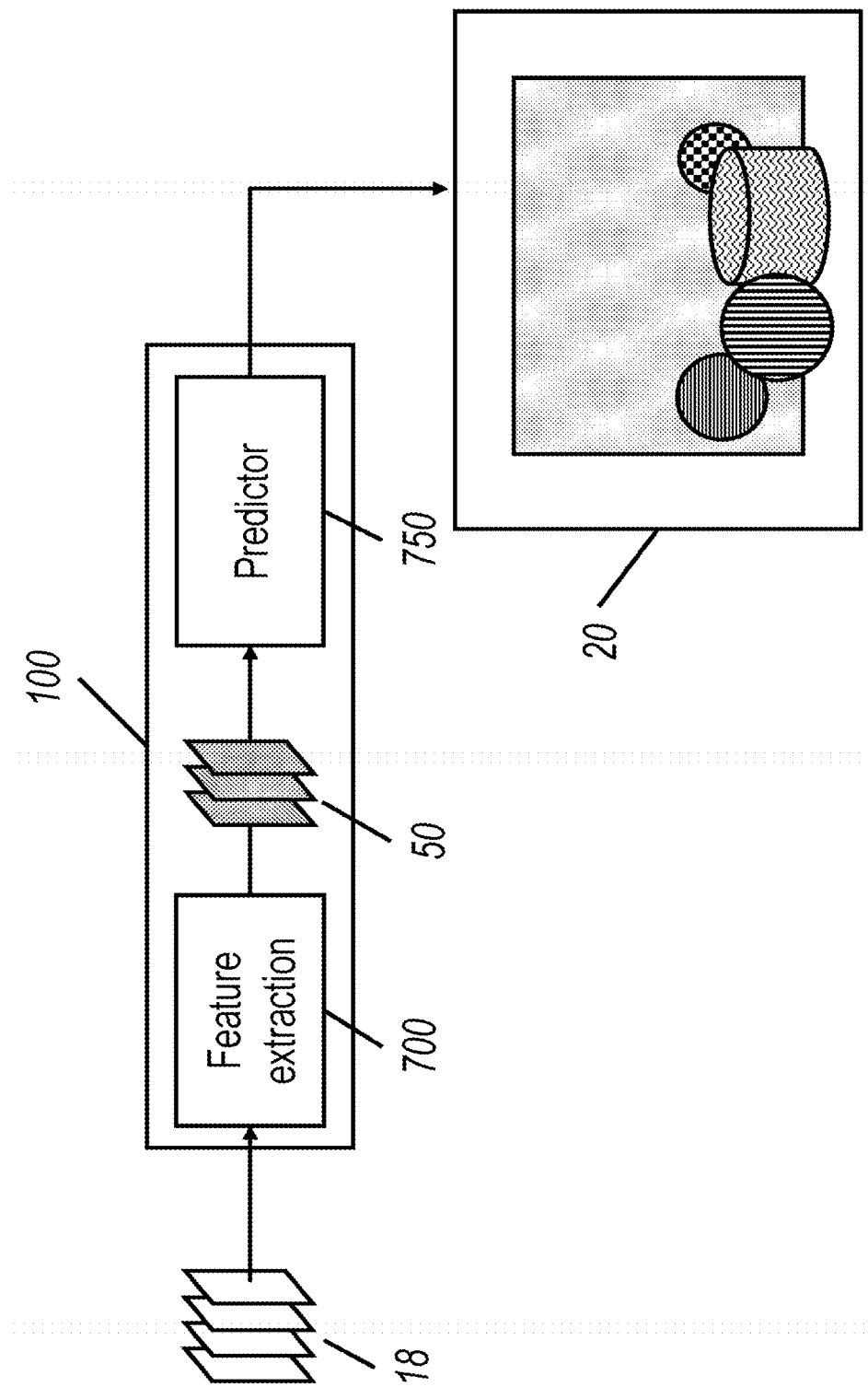
FIG. 6A is a block diagram of processing circuit 100 for computing surface characterization outputs based on polarization data according to one embodiment of the present invention.
Figure 6B:
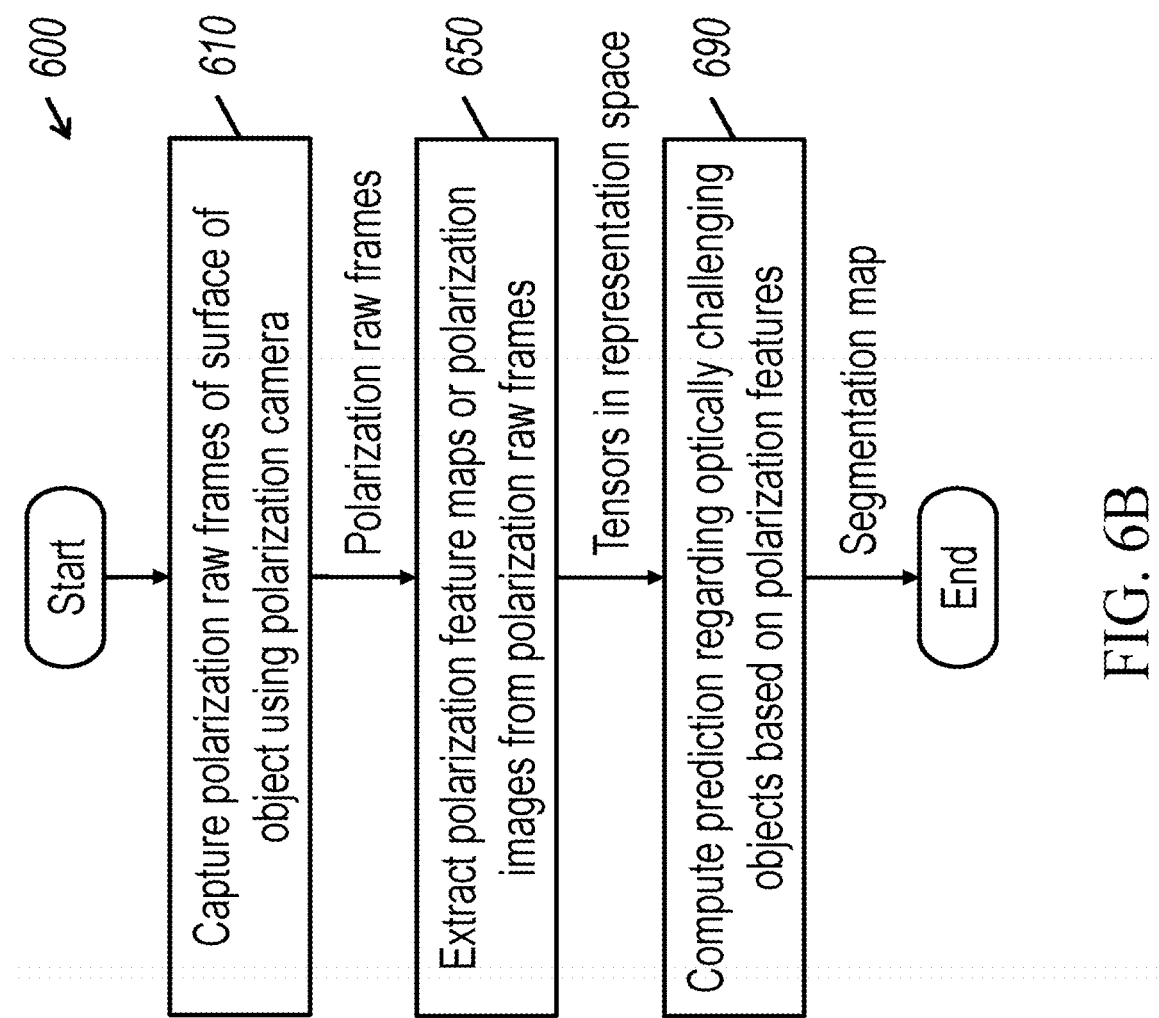
FIG. 6B is a flowchart of a method 600 for performing surface characterization based on input images to compute a surface characterization output according to one embodiment of the present invention.

FIG. 6A is a block diagram of processing circuit 100 for computing surface characterization outputs based on polarization data according to one embodiment of the present invention. FIG. 6B is a flowchart of a method 600 for performing surface characterization based on input images to compute a surface characterization output according to one embodiment of the present invention.

According to various embodiments of the present disclosure, the processing circuit 100 is implemented using one or more electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a characterization output 20 from input polarization raw frames 18. The operations performed by the processing circuit 100 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, or located within a same embedded device or computer system) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the processing circuit 100 may be referred to herein as a computer or a computer system, which may include memory storing instructions that, when executed by the one or more electronic circuits, implement the systems and methods described herein.

As shown in FIG. 6A, in some embodiments, a processing circuit 100 includes a feature extractor or feature extraction system 700 and a predictor 750 (e.g., a classical computer vision prediction algorithm and/or a trained statistical model such as a trained neural network) configured to compute a prediction output 20 (e.g., a statistical prediction) regarding surface characteristics of objects based on the output of the feature extraction system 700. Various embodiments of the present disclosure are described herein in the context of surface characterization in circumstances where surface features may be optically challenging to detect, and/or where polarization-based imaging techniques provide information on surface normal that may otherwise be difficult to obtain, embodiments of the present disclosure are not limited thereto. For example, some aspects of embodiments of the present disclosure may be applied to techniques for characterizing the surfaces of objects made of materials or have surface characteristics that are optically challenging to detect, such as surfaces of translucent objects, multipath inducing objects, objects that are not entirely or substantially matte or Lam bertian, and/or very dark objects. These optically challenging objects include objects and surface characteristics thereof that are difficult to resolve or detect through the use of images that are capture by camera systems that are not sensitive to the polarization of light (e.g., based on images captured by cameras without a polarizing filter in the optical path or where different images do not capture images based on different polarization angles). For example, these surface characteristics may have surface appearances or colors that are very similar to the surfaces on which the characteristics appear (e.g., dents have the same color as the underlying material and scratches on transparent materials such as glass may also be substantially transparent). In addition, while embodiments of the present disclosure are described herein in the context of detecting optically challenging surface characteristics, embodiments of the present disclosure are not limited to detecting only optically challenging surface defects. For example, in some embodiments, a predictor 750 is configured (e.g., a statistical model is trained using training data) to detect both surface characteristics that are optically challenging as well as surface characteristics that are robustly detectable without using polarization information.

Polarization may be used to detect surface characteristics or features that would otherwise be optically challenging when using intensity information (e.g., color intensity information) alone. For example, polarization information can detect changes in geometry and changes in material in the surfaces of objects. The changes in material (or material changes), such as boundaries between different types of materials (e.g., a black metallic object on a black road or a colorless liquid on a surface may both be substantially invisible in color space, but would both have corresponding polarization signatures in polarization space), may be more visible in polarization space because differences in the refractive indexes of the different materials cause changes in the polarization of the light. Likewise, differences in the specularity of various materials cause different changes in the polarization phase angle of rotation, also leading to detectable features in polarization space that might otherwise be optically challenging to detect without using a polarizing filter. Accordingly, this causes contrast to appear in images or tensors in polarization representation spaces, where corresponding regions of tensors computed in intensity space (e.g., color representation spaces that do not account for the polarization of light) may fail to capture these surface characteristics (e.g., where these surface characteristics have low contrast or may be invisible in these spaces). Examples of optically challenging surface characteristics include: the particular shapes of the surfaces (e.g., degree of smoothness and deviations from ideal or acceptable physical design tolerances for the surfaces); surface roughness and shapes of the surface roughness patterns (e.g., intentional etchings, scratches, and edges in the surfaces of transparent objects and machined parts), burrs and flash at the edges of machined parts and molded parts; and the like. Polarization would also be useful to detect objects with identical colors, but differing material properties, such as scattering or refractive index.

In addition, as discussed above, polarization may be used to obtain the surface normals of objects based on the degree of linear polarization (DOLP) $\rho$ and the angle of linear polarization (AOLP) $\phi$ computed from the polarization raw frames based on, for example, equations (2), (3), (4), and (5). These surface normal, in turn, provide information about the shapes of the surfaces.

As shown in FIG. 6B and referring, for example, to FIG. 1B, in operation 610 the processing circuit 100 captures polarization raw frames 18 of surfaces in a scene 1. For example, in some embodiments, the processing circuit 100 controls one or more polarization cameras 10 (e.g., one or more individual polarization cameras, which may be organized into polarization camera arrays and/or stereo polarization camera systems that include multiple polarization camera modules) to capture polarization raw frames 18 depicting a surfaces of object in a scene 1.

Figure 7A:
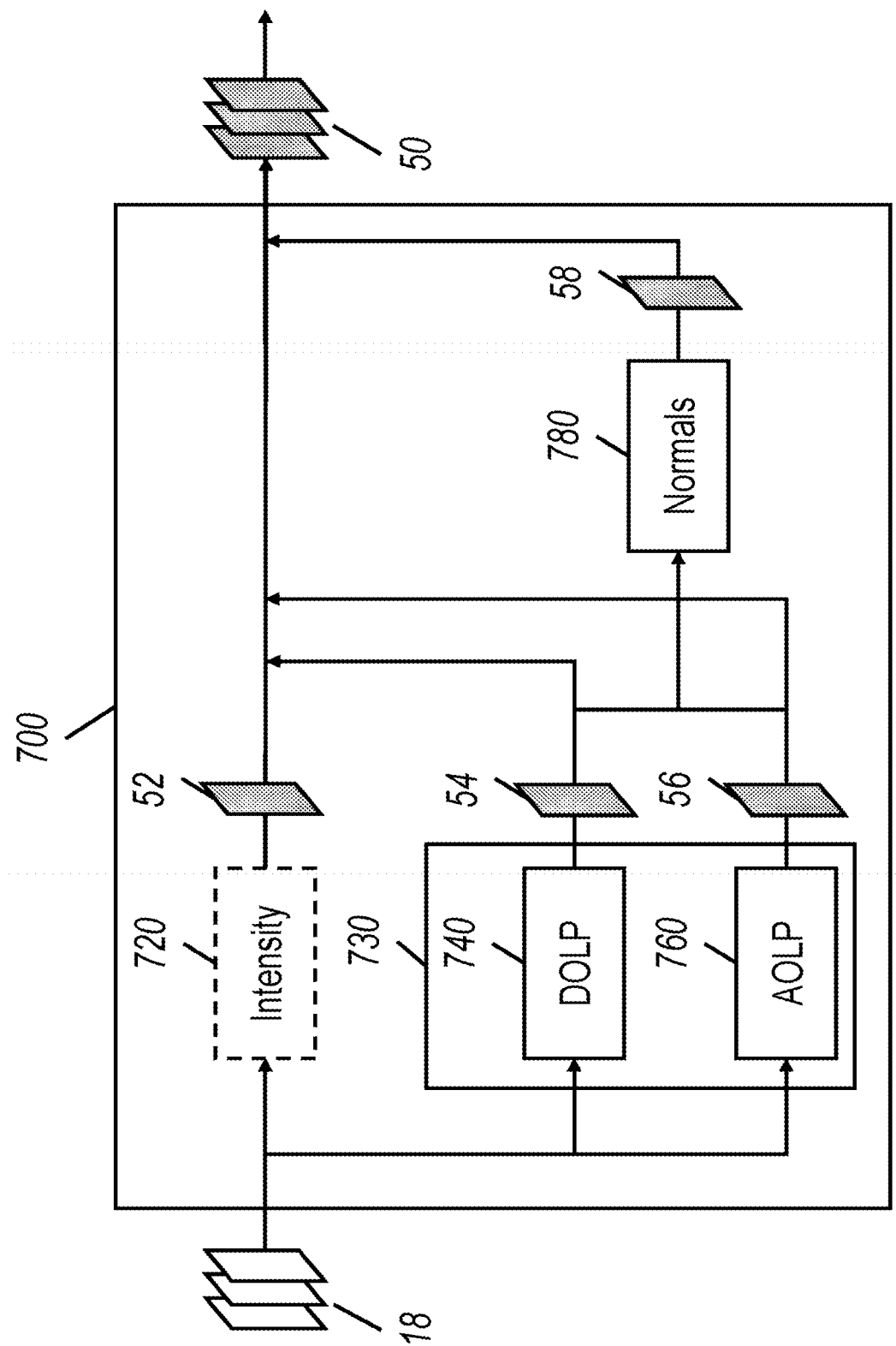
FIG. 7A is a block diagram of a feature extractor 700 according to one embodiment of the present invention.
Figure 7B:
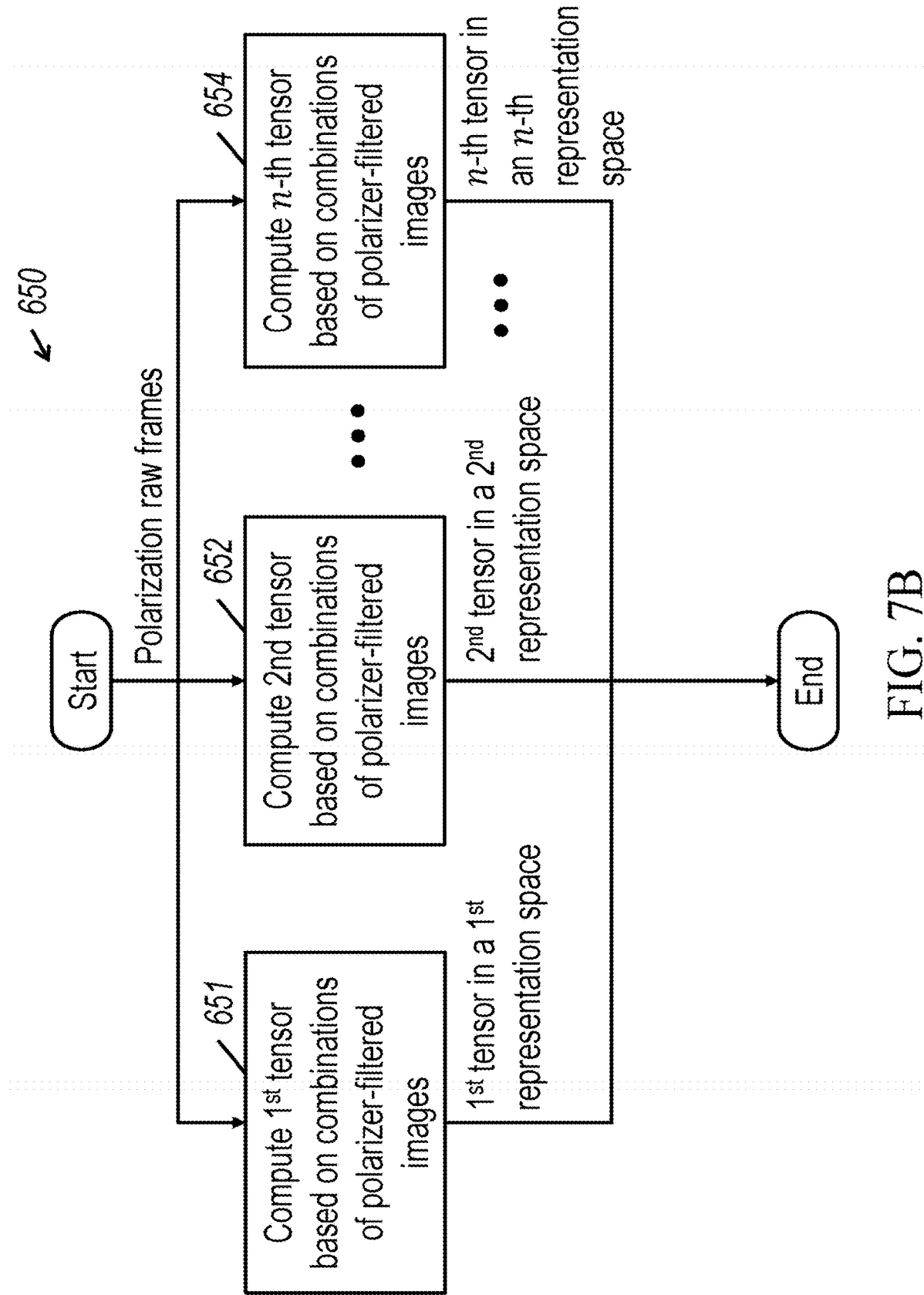
FIG. 7B is a flowchart depicting a method according to one embodiment of the present invention for extracting features from polarization raw frames.

FIG. 7A is a block diagram of a feature extractor 700 according to one embodiment of the present invention. FIG. 7B is a flowchart depicting a method according to one embodiment of the present invention for extracting features from polarization raw frames. In the embodiment shown in FIG. 7A, the feature extractor 700 includes an intensity extractor 720 configured to extract an intensity image I 52 in an intensity representation space (e.g., in accordance with equation (7), as one example of a non-polarization representation space) and polarization feature extractors 730 configured to extract features in one or more polarization representation spaces. In some embodiments of the present disclosure, the intensity extractor 720 is omitted and the feature extractor does not extract an intensity image I 52. In the embodiment shown in FIG. 7A, the features extracted in polarization representation spaces (e.g., DOLP $\rho$ and AOLP $\phi$) are supplied to a surface normals calculator 780 to compute surface normals 58 of objects in the scene As shown in FIG. 7B, the extraction of polarization images in operation 650 may include extracting, in operation 651, a first tensor in a first polarization representation space from the polarization raw frames from a first Stokes vector. In operation 652, the feature extractor 700 further extracts a second tensor in a second polarization representation space from the polarization raw frames. For example, the polarization feature extractors 730 may include a DOLP extractor 740 configured to extract a DOLP $\rho$ image 54 (e.g., a first polarization image or a first tensor in accordance with equation (8) with DOLP as the first polarization representation space) and an AOLP extractor 760 configured to extract an AOLP $\phi$ image 56 (e.g., a second polarization image or a second tensor in accordance with equation (9), with AOLP as the second polarization representation space) from the supplied polarization raw frames 18. In addition, in various embodiments, the feature extraction system 700 extracts two or more different tensors (e.g., n different tensors) in two or more representation spaces (e.g., n representation spaces), where the n-th tensor is extracted in operation 614. As discussed above, in some embodiments of the present disclosure, the polarization feature extractors 730 extract polarization features in polarization representation spaces including both linear polarization representation spaces (e.g., tensors in the aforementioned AOLP and DOLP representation spaces extracted from polarization raw frames captured with a linear polarizing filter) and circular polarization representation spaces (e.g., tensors extracted from polarization raw frames captured with a circular polarizing filter). In various embodiments, the representation spaces include, but are not limited to, polarization representation spaces.

The polarization representation spaces may include combinations of polarization raw frames in accordance with Stokes vectors. As further examples, the polarization representations may include modifications or transformations of polarization raw frames in accordance with one or more image processing filters (e.g., a filter to increase image contrast or a denoising filter). The feature maps 52, 54, and 56 in first polarization representation spaces may then be supplied to a predictor 750 for detecting surface characteristics based on the feature maps 50.

While FIG. 7B illustrates a case where two or more different tensors are extracted from the polarization raw frames 18 in more than two different representation spaces, embodiments of the present disclosure are not limited thereto. For example, in some embodiments of the present disclosure, exactly one tensor in a polarization representation space is extracted from the polarization raw frames 18. For example, one polarization representation space of raw frames is AOLP $\phi$ and another is DOLP $\rho$ (e.g., in some applications, AOLP may be sufficient for detecting surface characteristics of transparent objects or surface characteristics of other optically challenging objects such as translucent, non-Lambertian, multipath inducing, and/or non-reflective objects).

Furthermore, as discussed above with respect to FIG. 7A, in some embodiments of the present disclosure, one or more feature vectors are computed based on features computed from other representation spaces. In the particular example shown in FIG. 7A, the surface normals calculator 780 computes surface normals of surfaces in the imaged scene 1 in surface normals space (e.g., azimuth angle $\theta_a$ and zenith angle $\theta_z$) based on the computed AOLP $\phi$ and DOLP $\rho$ tensors. In some embodiments, the surface normal are encoded using Cartesian coordinates (e.g., a three-dimensional vector indicating a direction of the surface normal). The computed surface normals 58 may be included among the features 50 extracted by the feature extractor 700.

Accordingly, extracting features such as polarization feature maps, polarization images, and/or surface normals from polarization raw frames 18 produces first tensors 50 from which optically challenging surface characteristics may be detected from images of surfaces of objects under inspection. In some embodiments, the first tensors extracted by the feature extractor 700 may be explicitly derived features (e.g., hand crafted by a human designer) that relate to underlying physical phenomena that may be exhibited in the polarization raw frames (e.g., the calculation of AOLP and DOLP images in linear polarization spaces and the calculation of tensors in circular polarization spaces, as discussed above). In some additional embodiments of the present disclosure, the feature extractor 700 extracts other non-polarization feature maps or non-polarization images, such as intensity maps for different colors of light (e.g., red, green, and blue light) and transformations of the intensity maps (e.g., applying image processing filters to the intensity maps). In some embodiments of the present disclosure, the feature extractor 700 further computes surface normals of surfaces depicted by the polarization raw frames, in accordance with shape from polarization techniques, as described above. In some embodiments of the present disclosure the feature extractor 700 may be configured to extract one or more features that are automatically learned (e.g., features that are not manually specified by a human) through an end-to-end supervised training process based on labeled training data. In some embodiments, these learned feature extractors may include deep convolutional neural networks, which may be used in conjunction with traditional computer vision filters (e.g., a Haar wavelet transform, a Canny edge detector, a depth-from-stereo calculator through block matching, and the like).

In some embodiments of the present disclosure, the predictor 750 implements one or more classical computer vision algorithms (e.g., depth from stereo using block matching) based on the first tensors 50.

In some embodiments of the present disclosure, the predictor 750 implements an image segmentation algorithm, such as by including a trained convolutional neural network. Image segmentation refers to labeling pixels based on the class of object contained within the pixel. Traditional algorithms are adapted to conventional red-green-blue (RGB) channel or gray channel (hereafter RGB/gray) information, using RGB/gray image gradients to enforce decision boundaries. For many industrial applications, RGB/gray image gradients might not be present. One example is a photograph of a black car on a black road. It is difficult to segment this scene to separate the car from the road. However, by capturing both RGB/gray gradients and polarimetric gradients using polarization camera systems in accordance with embodiments of the present disclosure, computer vision systems can be trained, based on the combined RGB/gray and polarization cues (e.g., including surface normals computed from the polarization cues), to perform semantic segmentation of images in conditions that would be optically challenging when using only RGB/gray images. As used herein, convolutional neural networks that are configured to take polarization cues as input (e.g., features in polarization feature spaces, as extracted from polarization raw frames by the feature extractor 700, such as AOLP DOLP $\rho$, and/or surface normals computed based on AOLP and DOLP) will be referred to herein as Polarized CNNs, of which the Polarized Mask R-CNN described above and in U.S. Provisional Patent Application No. 62/942,113, filed in the United States Patent and Trademark Office on Nov. 30, 2019 and U.S. Provisional Patent Application No. 63/001,445, filed in the United States Patent and Trademark Office on Mar. 29, 2020.

Augmenting 3-D Surface Reconstruction with Polarization Imaging

Some aspects of embodiments of the present disclosure relate to recover high quality reconstructions of closed objects. In some embodiments of the present surface reconstruction is used in conjunction with high quality three-dimensional (3-D) models of the objects, such as computer-aided-design (CAD) models of the objects to be scanned to resolve ambiguities arising from a polarization-based imaging process. Previous attempts have devised methods for unknown geometry without having access to CAD models.

Capturing a high quality 3-D reconstruction of a physical object for which a high-quality 3-D computer model already exists is important in a variety of contexts, such as quality control in the fabrication and/or manufacturing of objects. For example, in the case of additive manufacturing or 3-D printing, a designer may create a 3-D model of an object and supply the 3-D model to a 3-D printer, which fabricates a physical object based on the 3-D model. During or after the 3-D printing process, the physical object fabricated by the 3-D printer may be scanned using a stereo polarization camera system according to some embodiments of the present disclosure, and the captured polarization data may be used to assist in the 3-D reconstruction of the surfaces of the physical object. This 3-D reconstruction can then be compared, in software, to the designed 3-D model to detect defects in the 3-D printing process. Similar techniques may be applied to other manufacturing processes, such as for creating 3-D reconstructions of the shapes of objects created through other manufacturing processes such as injection molding, die-casting, bending, and the like.

As one example, a stereo polarization camera system, such as that described above with respect to FIG. 1E, is used to image an object that is intended to be reconstructed in 3-D, e.g., to create a 3-D model of the object automatically from the captured polarization raw frames. Due to practical manufacturing constraints and/or defects in the manufacturing process, the surface of the object may have sparse irregularities, and may not be ideally smooth. These irregularities may appear as high frequency variations on the surface. High frequency variations (HFV) appear due to 3 scenarios:

First, there could be regions on the object surface that have valid high-frequency variations (e.g., designed and intended to be present). For example, when creating a replica of a Greek bust or statue, details near the eyes and hair of the scanned 3-D model may also be present in the high-quality 3-D model that was used to guide the fabrication of the physical object.

Second, there may be regions on the object surface that have high-frequency variations due to blemishes, defects, or other damage on the surface. For example, in the case of 3-D printing or additive manufacturing, high frequency patterns may arise due to the layer-wise manufacturing process, causing a "steeped" appearance to surfaces of the object. As another example, an injection molding process may leave seams or flashing in the produced object where the two parts of the mold meet. These details are not reflected in the high-quality 3-D model.

Third, combinations of the first and second forms of high frequency variations may occur physically close to one another (e.g., flashing may appear near the hair of the replica of the bust, thereby causing additional lines to appear in the hair).

High-frequency variations due to details are desirable on the real object, while the HFVs due to irregularities are not. However, it is important to be able to recover both of these kinds of HFVs in the 3D reconstruction for the purposes of inspection and profilometry. While some of these HFV details as well as irregularities may not be recovered by a commercially available 3D scanner (due to poor resolution arising from quantization error & other noise sources), embodiments of the present disclosure are able to handle these cases, as discussed in more detail below. Some exemplary implementations may make use of an additional structured lighting projector device to illuminate the object if the object has no visual features. Some embodiments of the present disclosure relate to the use of passive illumination (e.g., based on ambient lighting in the scene).

Figure 8A:
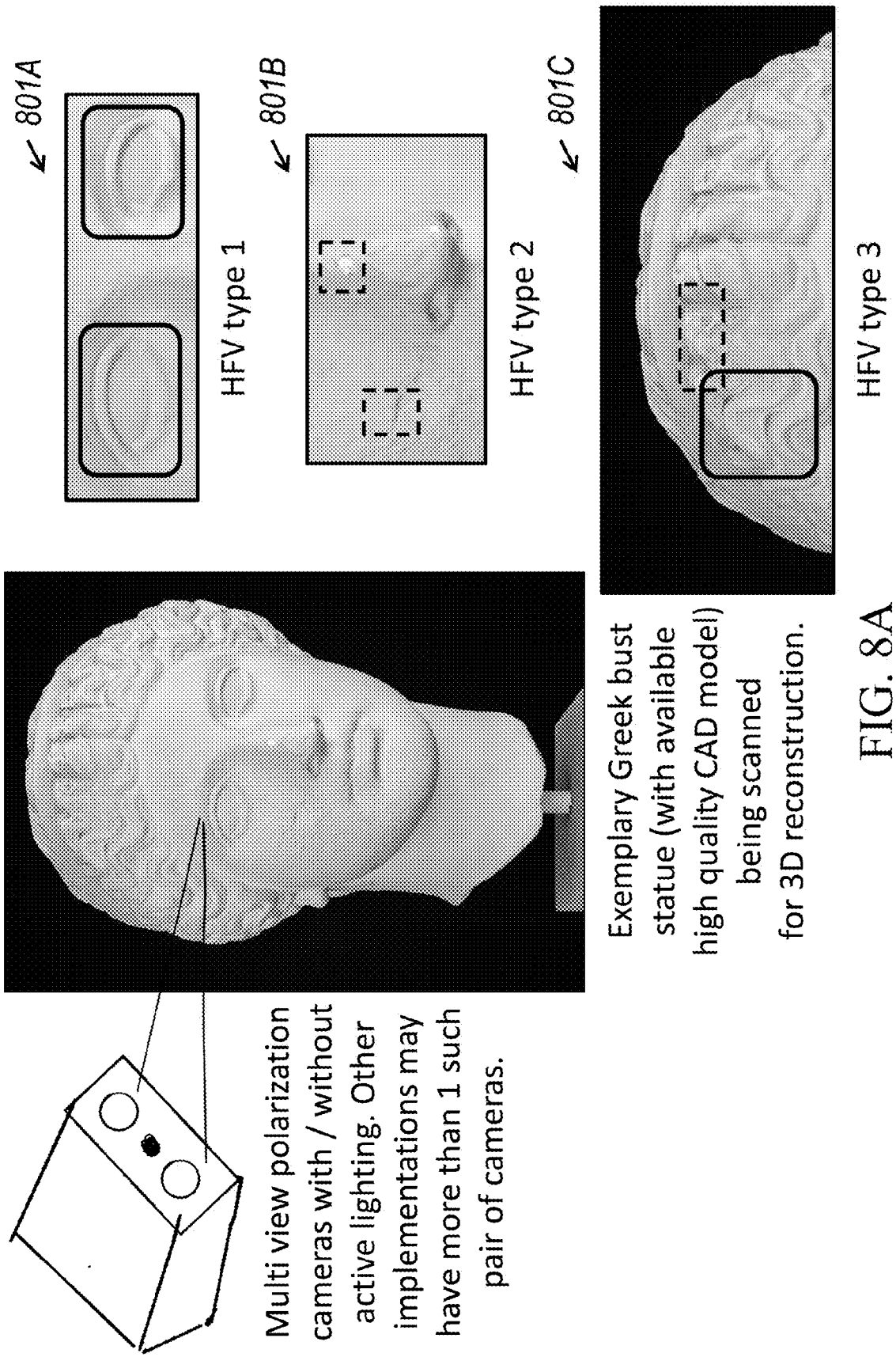
FIG. 8A is an illustration of a Greek bust statue being scanned by an exemplary implementation of the imaging setup proposed in this invention.
Figure 8B:
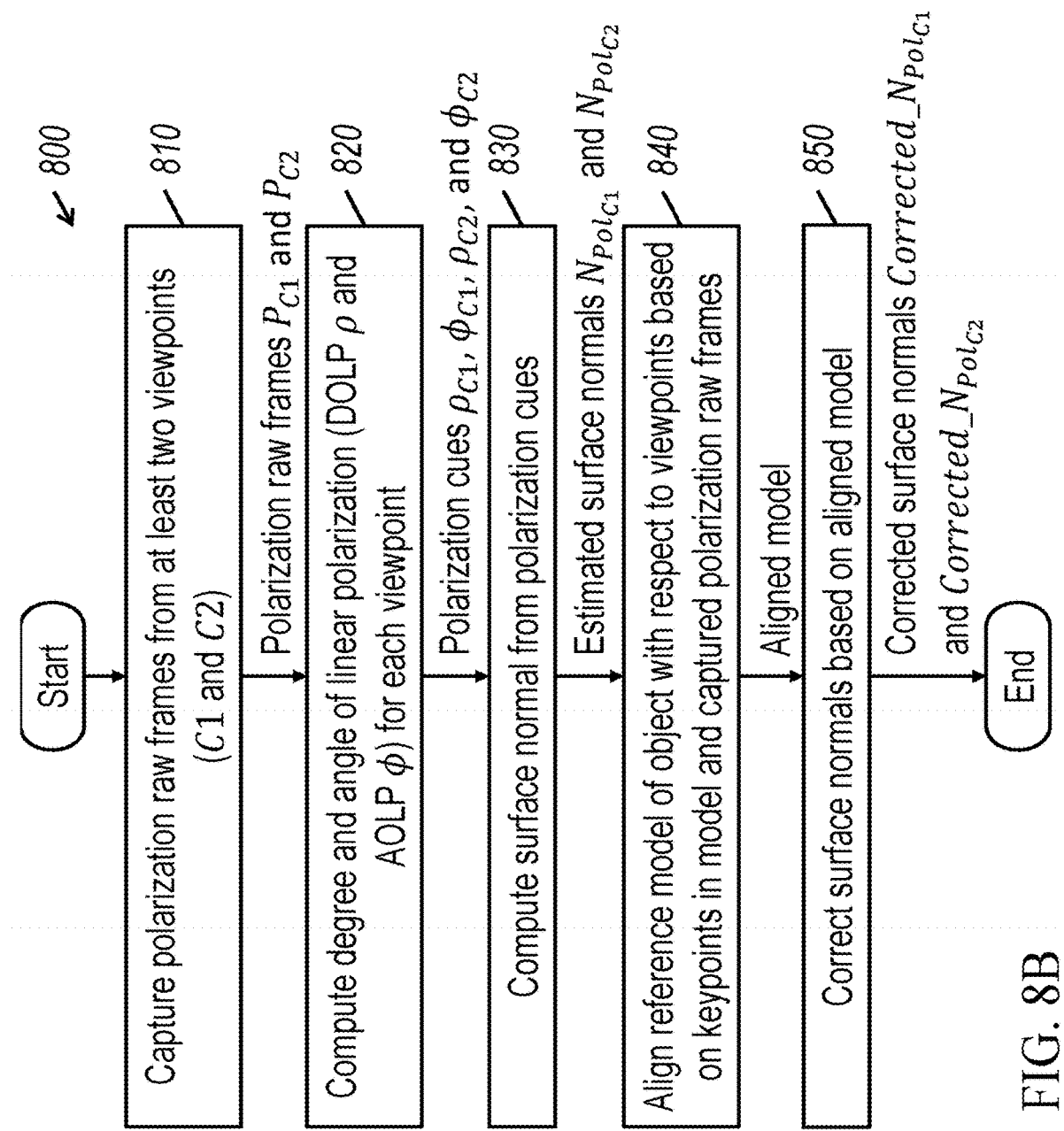
FIG. 8B is a flowchart of a method for 3-D surface reconstruction using polarization according to one embodiment of the present disclosure.

FIG. 8A is an illustration of a Greek bust statue being scanned by an exemplary implementation of the imaging setup proposed in this invention. Three types of High-Frequency-Variation (HFV) details are annotated (801A: desirable details such as hair and eyes; 801B: undesirable blemishes & defects near the cheek & nose; and 801C: a combination of cases A & B in close proximity with each other). These HFVs may not be recovered using standard 3D imaging techniques. Aspects of embodiments of the present invention relate to handling all of these cases. FIG. 8B is a flowchart of a method for 3-D surface reconstruction using polarization according to one embodiment of the present disclosure.

In some embodiments of the present disclosure, in operation 810, polarization raw frames 18 are captured of an object from multiple viewpoints using, for example, a stereo polarization camera system as describe above with respect to FIG. 1E. A set of four separate polar-angle images (0, 45, 90, 135) can be extracted from each of the raw images acquired. These may be denoted as $P_{C1}$ and $P_{C2}$. In exemplary implementations of this setup, the cameras may be in housed in standard stereo configurations (optical axes parallel to each other), or other configurations (e.g., where the optical axes intersect with each other).

In operation 820, degree and angle of linear polarization (DOLP $\rho$ and AOLP $\phi$) may be computed from Stokes vector formulation for both cameras using $P_{C1}$ and $P_{C2}$ as described above. These may be denoted as $\rho_{C1}$, $\phi_{C1}$, $\rho_{C2}$, and $\phi_{C2}$. In operation 830, surface normals (e.g., Zenith $\theta_z$ and Azimuth $\theta_a$) from polarization are computed using shape from polarization (SFP) using DOLP $\rho$ and AOLP $\phi$ as discussed above with respect to equations (2), (3), (4), and (5) for both cameras C1 and C2 (e.g., based on polarization raw frames $P_{C1}$ and $P_{C2}$). These surface normal from the two viewpoints may be denoted as $N_{Pol_{C1}}$ and $N_{Pol_{C2}}$.

However, these surface normals suffer from Azimuthal $\theta_a$ ambiguity by an angle of $\pi$, which can be disambiguated and corrected by using the CAD reference model as a constraint (e.g., by selecting the azimuthal angle $\theta_a$ that results in a surface that has the smaller distance or error with respect to the reference model). Accordingly, low-frequency noise (e.g., ambiguity by an angle of $\pi$) can be resolved using the reference model.

Depending on whether the object is dielectric or non-dielectric (taking cues from the strength of DOLP), an appropriate DOLP computation model may be employed to estimate the zenith angle as discussed above. In some embodiments, the material may be assumed to be dielectric with a refractive index of 1.5 because the refractive index of dielectrics is typically in the range [1.3, 1.6], and that this variation causes negligible change in DOLP $\rho$. In cases where the material is non-dielectric, the accuracy of the estimated zenith angle would suffer from refractive distortion. Refractive error in zenith is a low-frequency phenomenon and therefore may also be corrected by leveraging the reference model to use as a prior for resolving the refractive error.

Normals $N_{Pol_{C1}}$ and $N_{Pol_{C2}}$ may both independently be integrated over a sample space ($\Omega$) to recover the entire surface off the object or a part of the surface of the object (e.g., the surface normals indicate the slope of the surfaces of the object and therefore integrating over the slopes, after accounting for the direction of the normal versus the orthogonal direction of the slope, recovers the underlying shape of the object). The surface recovered from such integration should match the shape constrained by the CAD reference model. Differences between the surface recovered from integration and the reference model may indicate defective portions of the physical object.

In addition to only relying on the CAD model for resolving ambiguities and errors in 3-D reconstruction based on polarization data from one polarization camera (or one polarization camera array), some aspects of embodiments of the present disclosure relate to further improving the quality of the 3-D reconstruction by enforcing view-point consistency between the cameras of the stereo polarization camera system.

Accordingly, while some embodiments of the present disclosure relate to computing estimated surface normal as described above through operation 830 shown in FIG. 8B, some embodiments of the present disclosure relate to further refining the estimated surface normals. Still referring to FIG. 8B, in operation 840, the high-quality CAD reference model is aligned to orientation of the physical object based on visual keypoints that are estimated on the object in the polarization raw frames captured by the two cameras $P_{C1}$ and $P_{C2}$. These keypoints are correlated with the same set of keypoints in the CAD reference model to obtain the six degree of freedom (6DoF) pose of the object with respect to the cameras using Perspective-N-Point (PnP) (see, e.g., Fischler, M. A.; Bolles, R. C. (1981). "Random Sample Consensus: A Paradigm for Model Fitting with Applications to Image Analysis and Automated Cartography". *Communications of the ACM*. 24 (6): 381-395) and/or random sample consensus (RANSAC). Use of multiple registered cameras at different viewpoints enables a more accurate pose reconstruction than using a single camera having a single viewpoint, although embodiments of the present disclosure are not limited thereto and single view PnP may also be used. The CAD reference model may be transformed into the camera spaces corresponding to the different camera modules of the stereo camera system (e.g., transforming the pose of the CAD reference model to the pose of the actual physical object with respect to the camera system), thereby aligning the reference model to the physical object. In the case of two cameras, this may be denoted as $CAD_{C1}$ and $CAD_{C2}$. Surface normals are then extracted from $CAD_{C1}$ and $CAD_{C2}$ (e.g., based on the orientations of surfaces with respect to the virtual cameras corresponding to the camera modules of the stereo camera system). These reference surface normals may be denoted as $N_{CAD_{C1}}$ and $N_{CAD_{C2}}$.

The transformed CAD reference model can then be used as a guidance constraint to correct high frequency azimuthal $\pi$ ambiguity as well as the low frequency scaling error in zenith due to refractive distortion. Corrected normals will have consistency between the 2 cameras due to Multiview PnP, making this approach more robust. In more detail, in operation 850, the estimated normals $N_{Pol_{C1}}$ and $N_{Pol_{C2}}$ computed (in operation 830) from the polarization raw frames $P_{C1}$ and $P_{C2}$ from the two cameras are then corrected to compute corrected normals Corrected_$N_{Pol_{C1}}$ and Corrected_$N_{Pol_{C2}}$. The relative poses between the corrected normals should be consistent with the relative pose between the cameras ($N_{CAD_{C1}}$ and $N_{CAD_{C2}}$). This imposes additional pose-consistency constraints, thereby making SFP-normal correction more robust in general, and specifically in the case of fronto-parallel facets where Zenith $\theta_z$ is close to 0° (or 0 radians), which tend to have noisy estimated normal due to poor strength of the DOLP $\rho$ along the viewing direction. However, any given facet will be less likely to be fronto-parallel to both the camera modules of a stereo polarization camera system, given the spacing (or baseline) between the camera modules. Accordingly, regions with higher DOLP may be voted and selected from across the multiple cameras to recover more robust surface normal for surfaces that are fronto-parallel to a subset of the camera modules.

In some circumstances, specularity causes problems in surface reconstruction because the surface texture information is lost due to oversaturation in the intensity of the image. This causes estimated normals on a specular patch to be highly noisy. According to some embodiments of the present disclosure, the polarization camera system includes multiple cameras (e.g., two or more) that are viewing overlapping regions of the scene from multiple viewpoints (e.g., a stereo polarization camera system) spaced apart by a baseline. Specularity is generally a highly viewpoint dependent issue. That is, specularity is less likely to be observed by all the cameras in a setup such as the arrangement shown in FIG. 1E, where different cameras have different viewpoints of surfaces of an object.

In more detail, some aspects of embodiments of the present disclosure relate to automatically recovering robust surface normals, even in highly specular materials, by imaging the surfaces from multiple viewpoints. Under most lighting conditions, it is highly unlikely that any given patch of a surface will appear specular to all of the cameras in a stereo multi-view camera system.

Accordingly, in some embodiments of the present disclosure, a voting mechanism may be employed to reject normals from a specular patch observed in a particular camera, while selecting the normals from the other cameras for the particular patch, that are more likely to be consistent with each other as well as the CAD model. For example, surface normals may be computed based on the polarization raw frames captured from each of the polarization camera modules in the stereo polarization camera array. If the surface normals computed based on the polarization raw frames are highly inconsistent with one another (e.g., more than a threshold angular distance apart), then the computed surface normals that are closest to the surface normals of the reference model are assumed to be the correct values.

In other embodiments of the present disclosure, specular patches may be detected automatically by identifying saturated pixels in the polarization raw frames. The saturation of the pixels is used to suggest that the particular patch may be observing specularity and therefore information in that region may be inaccurate.

In still other embodiments of the present disclosure, the stereo camera system includes more than two polarization camera modules (e.g., three or more polarization camera modules) which image the surfaces of the objects from different viewpoints. Accordingly, a voting mechanism may be employed, in which the surface normals computed based on the polarization raw frames captured by the various cameras are clustered based on similarity (after transforming the surface normals to correspond to a same frame of reference, such as one of the polarization camera modules). Because most of the polarization camera modules are unlikely to observe specularity, most of the calculated normals should be consistent, within an error range. Accordingly, the clustering process may identify outliers in the calculated surface normals, as caused by the specular artifacts.

A pseudocode description of an algorithm for normals correction based on voting with a CAD reference model prior is presented in more detail as follows. As notation:

N_P_C1—shape-from-polarization (SFP) normals in Camera1

N_P_C2—SFP normals in Camera2

N_CAD_C1—Normals in CAD reference model aligned with the object pose with respect to Camera1

N_CAD_C2—Normals in CAD reference model aligned with the object pose with respect to Camera2

Trans_C2_C1—Camera2's pose with respect to Camera1 obtained through extrinsic and intrinsic camera calibration (e.g., determined by imaging calibration targets visible to both Camera1 and Camera2)

Trans_CAD_C1—Transform used to align CAD reference model with the object in Camera1 image space obtained through multiview PnP Trans_CAD_C2—Transform used to align CAD reference model with the object in Camera2 image space obtained through multiview PnP (~)—Consistency operator The consistency operator (~) may be modeled as a distance metric (e.g., a cosine similarity based angular distance metric) computed between the normals being compared for consistency. If the angular distance is less than a threshold, the normals being compared are consistent with each other, else not (!~). The normals being compared are transformed into the same coordinate frame (master-camera or Camera1 image space in this case) using the transforms listed above before applying the consistency operator (~).

Pseudocode Implementation of Voting Based on CAD Reference Model Prior:

```
For each pixel normal in N_P_C1 (master camera image space, in this case
Camera1):
    # Case 1: SFP normals in both cameras are consistent with CAD (No
ambiguity)
    if (N_P_C1 ~ N_P_C2) && (N_P_C1 ~ N_CAD_C1) && (N_P_C2 ~
N_CAD_C2) then:
        retain N_P_C1 or Trans_C2_C1*(N_P_C2) depending on which of the
2 camera normals are more aligned (consistent) with the CAD model
    # Case 2: SFP normals in the 2 cameras are consistent with each
other, but both are inconsistent with CAD normal (HFV Blemish/defect on
surface)
    else if (N_P_C1 ~ N_P_C2) && (N_P_C1 !~ N_CAD_C1) && (N_P_C2 !~
N_CAD_C2) then:
        retain N_P_C1
    # Case 3: SFP normals in only one of the cameras are consistent with
CAD (specularity / fronto parallel issue in the other camera)
    else if (N_P_C1 ~ N_CAD_C1) && (N_P_C2 !~ N_CAD_C2) then:
        retain N_P_C1 #specularity / fronto parallel facet issue in Camera2
    else if (N_P_C2 ~ N_CAD_C2) && (N_P_C1 !~ N_CAD_C1) then:
        retain Trans_C2_C1*(N_P_C2) #specularity / fronto parallel facet issue
in Camera1
    # Case 4: SFP normals in both cameras are inconsistent with each
other, as well as with CAD
    else if (N_P_C1 !~ N_CAD_C1) && (N_P_C2 !~ N_CAD_C2) && (N_P_C1 !~
N_P_C2) then:
        retain N_CAD_C1
```

In some embodiments of the present disclosure, the corrected surface normals Corrected_$N_{Pol_{C1}}$ and Corrected_$N_{Pol_{C2}}$ are integrated over sample space ($\Omega$) to synthesize a 3-D reconstruction of the object imaged by the stereo polarization camera system.

While the embodiments discussed above relate to the 3-D reconstruction of 3-D objects based on a high-quality 3-D model such as a CAD design model, some aspects of embodiments of the present disclosure further relate to 3-D reconstruction of generally flat surfaces or surfaces having known, simple geometry, using multi-view polarized camera system such as that shown in FIG. 1E. The simple geometry case may apply to circumstances where the objects to be analyzed are unknown, but can be approximated using, for example, flat planes, spheres, and other simple parametric curves of known geometry. For example, flat planes may apply to many surfaces in an environment for a self-driving vehicle, such as the surface of a road, as well as walls and signage. In addition, depending on the resolution and/or accuracy demanded by a particular application, many surfaces may be approximated as being locally flat.

Figure 9A:
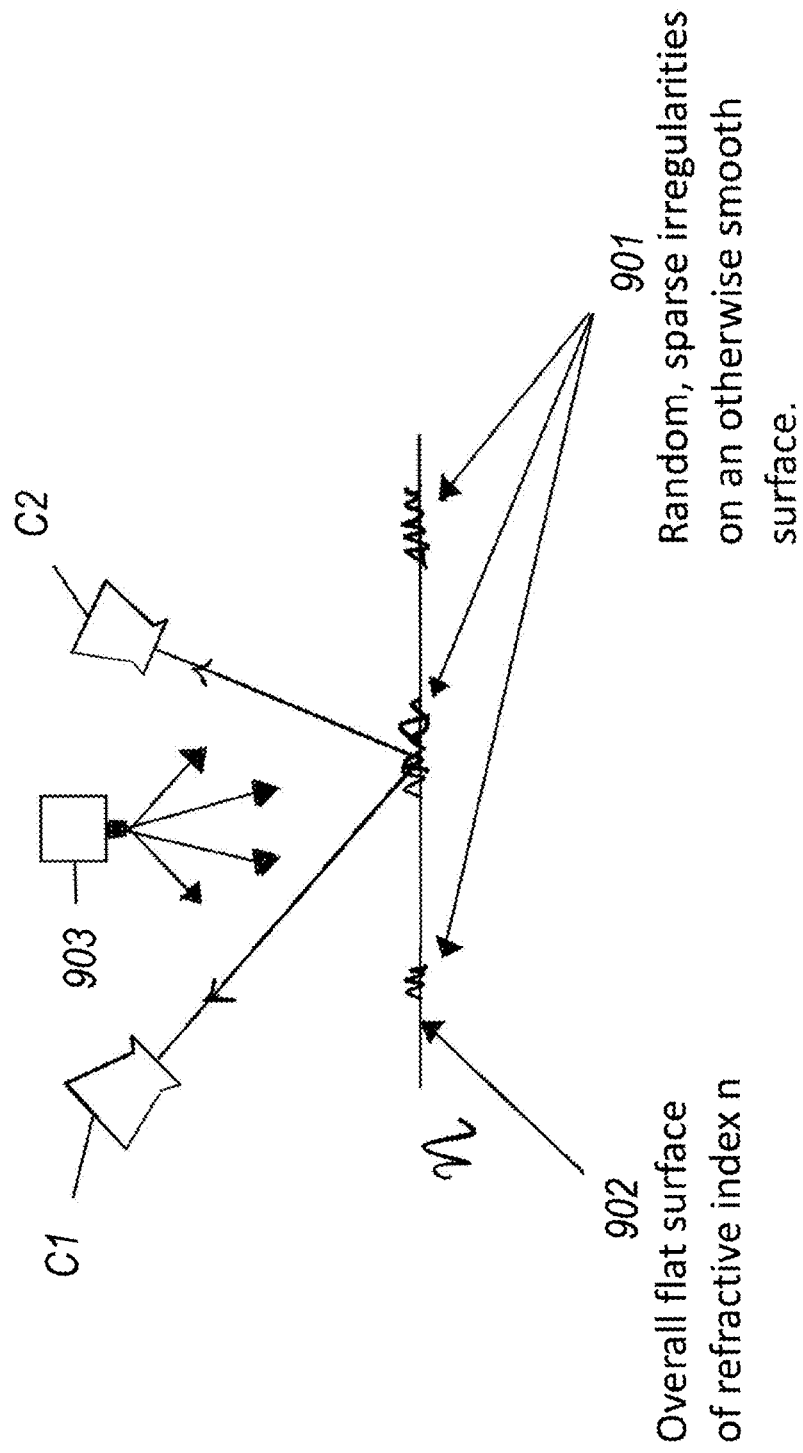
FIG. 9A is an illustration of a flat surface of refractive index n, being scanned by an exemplary implementation of the imaging setup according to one embodiment of the present invention.

FIG. 9A is an illustration of a flat surface of refractive index n, being scanned by an exemplary implementation of the imaging setup according to one embodiment of the present invention. For particular applications in profilometry and inspection, this surface is examined for its smoothness. Ideally, this surface is desired to be smooth. Practically, due to defects/wear and tear, there may be sparse irregularities 901 at random locations on this otherwise flat surface 902. These irregularities manifest as High-Frequency-Variation (HFV) details that may not be recovered using standard 3D imaging techniques due to noise and poor resolution. However, embodiments of the present invention are able to recover these HFV irregularities leveraging polarization in conjunction with flatness and multi-view constraints.

Accordingly, for the sake of discussion, some embodiments of the present disclosure relate to detecting random, sparse irregularities on an otherwise substantially smooth surface (e.g., a substantially flat surface). As a motivating example, embodiments of the present disclosure may be used to detect potholes in a road using a stereo polarization camera system, such that a self-driving vehicle can avoid those potholes, as practical based on traffic conditions. As another motivating example, embodiments of the present disclosure may be used to detect surface defects in surfaces with generally simple geometries, such as detecting surface irregularities in the smoothness of a pane of glass or in a sheet of metal.

In some embodiments of the present disclosure, a multi-view polarization camera system may further include a structured light projector 903 configured to project patterned light onto a scene to provide additional detectable surface texture for the depth from stereo processes to match between views (e.g., using block matching) for measuring parallax shifts. In some circumstances, the structured light projector is configured to project infrared light and the camera system includes cameras configured to detect infrared light along with light in other spectral bands. Any following analysis of the surfaces may then be performed based on the data collected in the other spectral bands such that the projected pattern is not inadvertently detected as defects in the surface of the material.

Figure 9B:
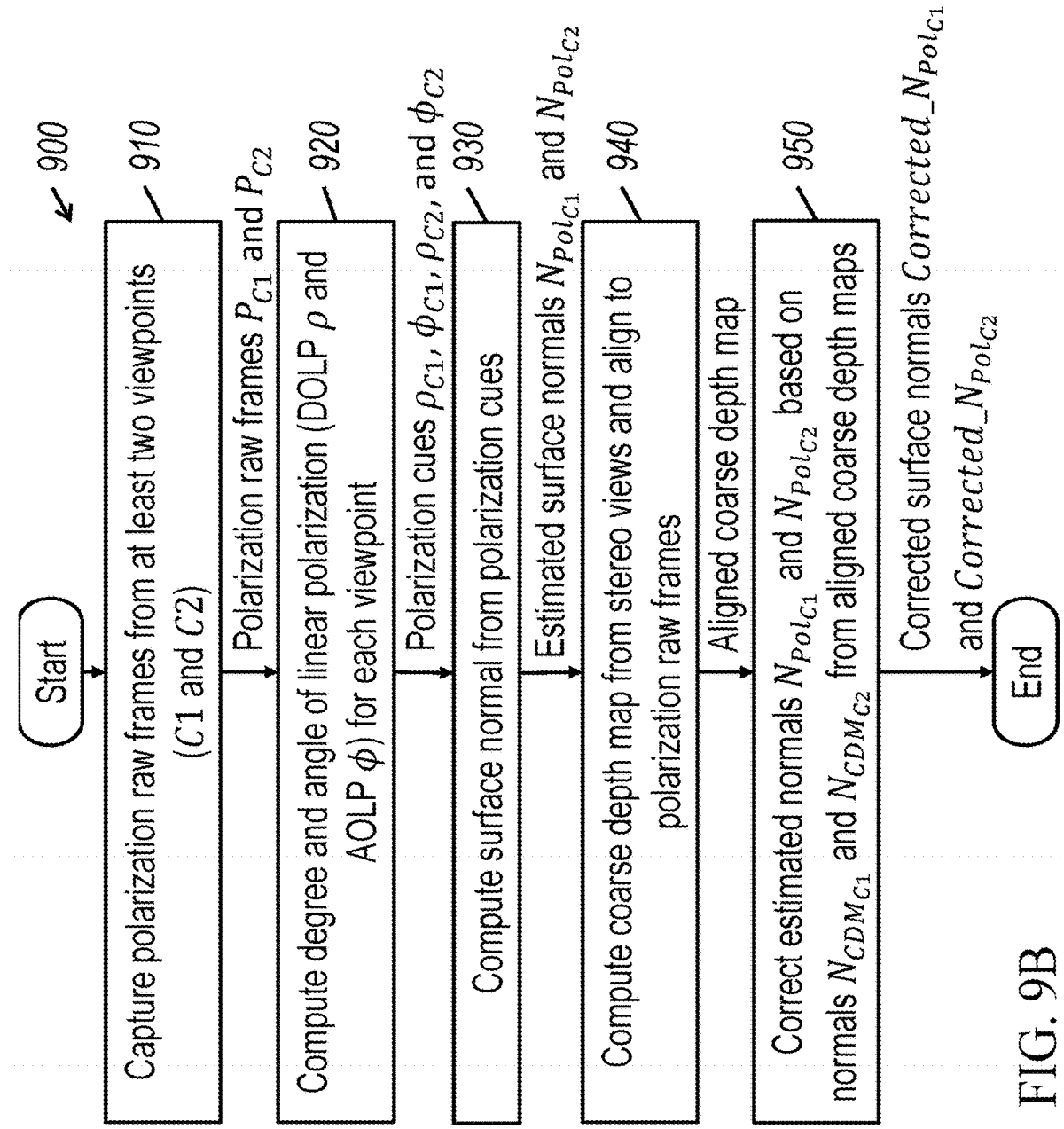
FIG. 9B is a flowchart of a method for 3-D surface reconstruction of flat or geometrically simple surfaces using polarization according to one embodiment of the present disclosure.

FIG. 9B is a flowchart of a method for 3-D surface reconstruction of flat or geometrically simple surfaces using polarization according to one embodiment of the present disclosure.

In a manner similar to that described above, in some embodiments of the present disclosure, in operation 910, polarization raw frames 18 are captured of a scene (e.g., including substantially flat or smooth surfaces) from multiple viewpoints using, for example, a stereo polarization camera system as describe above with respect to FIG. 1E. A set of four separate polar-angle images (0, 45, 90, 135) can be extracted from each of the raw images acquired. These may be denoted as $P_{C1}$ and $P_{C2}$. In exemplary implementations of this setup, the cameras may be in housed in standard stereo configurations (optical axes parallel to each other), or other configurations (e.g., where the optical axes intersect with each other).

In operation 920, degree and angle of linear polarization (DOLP $\rho$ and AOLP $\phi$) are computed from Stokes vector formulation for both cameras using $P_{C1}$ and $P_{C2}$ as described above. These may be denoted as $\rho_{C1}$, $\phi_{C1}$, $\rho_{C2}$, and $\phi_{C2}$.

In operation 930, surface normals (e.g., Zenith $\theta_z$ and Azimuth $\theta_a$) from polarization can be obtained using shape from polarization (SFP) using DOLP $\rho$ and AOLP $\phi$ as discussed above with respect to equations (2), (3), (4), and (5) for both cameras C1 and C2 (e.g., based on polarization raw frames $P_{C1}$ and $P_{C2}$). Depending on whether the object is dielectric or non-dielectric (taking cues from the strength of DOLP), an appropriate DOLP computation model may be employed to estimate the zenith angle as discussed above. In some embodiments, the material may be assumed to be dielectric with a refractive index of 1.5 because the refractive index of dielectrics is typically in the range [1.3, 1.6], and that this variation causes negligible change in DOLP $\rho$. In cases where the material is non-dielectric, the accuracy of the estimated zenith angle would suffer from refractive distortion.

These surface normal from the two viewpoints may be denoted as $N_{Pol_{C1}}$ and $N_{Pol_{C2}}$. However, these surface normals suffer from Azimuthal $\theta_a$ ambiguity by an angle of $\pi$, which can be disambiguated and corrected by using the coarse depth map as a constraint (e.g., by selecting the azimuthal angle $\theta_a$ that results in a surface that has the smaller distance or error with respect to the reference model). Accordingly, low-frequency noise (e.g., ambiguity by an angle of $\pi$) can be resolved using the coarse depth map created from the stereo view of the scene.

In addition, in operation 940, a coarse depth map (CDM) is computed based on the parallax shift between pairs of cameras in the stereo polarization camera system, based on depth-from-stereo approaches (e.g., where larger parallax shifts indicate surfaces that are closer to the camera system and smaller parallax shifts indicate that surfaces are farther away). As noted above, in some embodiments, the stereo polarization camera system includes a structured light illumination system, which may improve the matching of corresponding portions of the images when the surfaces do not have intrinsic texture or other visual features. In operation 940, the computed coarse depth map is also aligned to the image spaces corresponding the viewpoints C1 and C2 (e.g., using the relative pose and the extrinsic matrices from the camera calibration), where the coarse depth maps corresponding to these image spaces are denoted $CDM_{C1}$ and $CDM_{C2}$.

In operation 950, the estimated normals as $N_{Pol_{C1}}$ and $N_{Pol_{C2}}$ are corrected based on normals are obtained from the CDM $N_{CDM_{C1}}$ and $N_{CDM_{C2}}$ to compute corrected surface normals Corrected_$N_{Pol_{C1}}$ and Corrected_$N_{Pol_{C2}}$. In some embodiments of the present disclosure, these normals are computed from the CDM using the Plane Principal Component method described in Kadambi et al. 2015, cited above. In more detail, in some embodiments, the normals computed from the CDM, $N_{CDM_{C1}}$ and $N_{CDM_{C2}}$ are used as guidance to correct high frequency azimuthal ambiguity as well as refractive error zenith distortion in $N_{Pol_{C1}}$, jointly taking into account multi-view consistency with camera $P_{C2}$. These corrected normals are also more robust than otherwise noisy SFP normals in case of fronto-parallel facets as well as specularity, as described above. In some embodiments, the flatness prior of the surface (or other simple geometric shape of the surface) is also used to further refine the zenith distortion. In particular, estimated normals $N_{Pol_{C1}}$ and $N_{Pol_{C2}}$ should generally be flat, and therefore the normals from the recovered surface (apart from areas with local surface irregularities) should be approximately 90 degrees and parallel to each other in each of the cameras. In some embodiments of the present disclosure, a voting scheme is used to perform the normals correction.

A pseudocode description of an algorithm for normals correction based on voting with a flat surface prior is presented in more detail as follows. As notation:

N_P_C1—shape-from-polarization (SFP) normals in Camera1

N_P_C2—SFP normals in Camera2

CDM—Coarse Depth Map

N_CDM_C1—Normals in CDM in Camera1 image space

N_CDM_C2—Normals in CDM in Camera2 image space

Trans_C2_C1—Relative pose of Camera2 with respect to Camera1 obtained through extrinsic and intrinsic camera calibration Trans_CDM_C1—Transform used to align CDM with the object in Camera1 image space Trans_CDM_C2—Transform used to align CDM with the object in Camera2 image space (~)—Consistency Operator obeys_flatness( )—operator that checks if the normals being selected obey a flatness constraint The consistency operator (~) may be modeled as a distance metric (e.g., a cosine similarity based angular distance metric) computed between the normals being compared for consistency. If the angular distance is less than a threshold, the normals being compared are consistent with each other, else not (!~). The normals being compared are transformed into the same coordinate frame (master-camera or Camera1 image space in this case) using the transforms listed above before applying the consistency operator (~).

Pseudocode Implementation of Voting Based on Flatness Prior:

```
For each pixel normal in N_P_C1:
    # Case 1: SFP normals in both cameras are consistent with CDM &
    Obey Flatness Constraints (No ambiguity)
        if (N_P_C1 ~ N_P_C2) && (N_P_C1 ~ N_CDM_C1) && (N_P_C2 ~
```

```
N_CDM_C2) && obeys_flatness(N_P_C1)==True &&
obeys_flatness(N_P_C2)==True then:
        retain N_P_C1 or Trans_C2_C1 (N_P_C2) depending on which of the
2 camera normals are more aligned (consistent) with the CDM+Flatness Constraint
    # Case 2: SFP normals in the 2 cameras are consistent with each
other, but both are inconsistent with CDM normal (HFV Blemish/defect on
surface)
    else if (N_P_C1 ~ N_P_C2) && (N_P_C1 !~ N_CDM_C1) && (N_P_C2 !~
N_CDM_C2) then:
        retain N_P_C1
    # Case 3: SFP normals in only one of the cameras are consistent with
CDM+Flatness Constraints (specularity / fronto parallel issue in the other
camera)
    else if (N_P_C1 ~ N_CDM_C1) && (N_P_C2 !~ N_CDM_C2) &&
obeys_flatness(N_P_C1)==True then:
        retain N_P_C1 #specularity / fronto parallel facet issue in Camera2
    else if (N_P_C2 ~ N_CDM_C2) && (N_P_C1 !~ N_CDM_C1) &&
obeys_flatness(N_P_C2)==True then:
        retain Trans_C2_C1 (N_P_C2) #specularity / fronto parallel facet issue
in Camera1
    # Case 4: SFP normals in both cameras are inconsistent with each
other, as well as with CDM
    else if (N_P_C1 !~ N_CDM_C1) && (N_P_C2 !~ N_CDM_C2) &&
(N_P_C1 !~ N_P_C2) then:
        retain N_CDM_C1
```

In some embodiments, the corrected surface normals Corrected_$N_{Pol_{C1}}$ and Corrected_$N_{Pol_{C2}}$ are used to reconstruct the shape of the surface object. For example, in some embodiments, a sparse matrix inverse algorithm can be applied (as described in Kadambi et al. 2015) to estimate the revised depth coordinates of the surface. These revised depth coordinates have a higher resolution than the initial depth obtained from standard 3D imaging techniques (stereo, time of flight, etc.).

Surface defects and irregularities may then be detected based on detecting normals that are noisy or erroneous or that otherwise dis-obey pose consistency across the different camera modules of the stereo polarization camera system. In some circumstances, these sparse irregularities are especially apparent in standing out in different proportions across the DOLP images calculated for each of the views. In other words, portions of the normals map that violate the assumption of flatness or otherwise smoothness of the surface may actually be non-smooth surfaces, thereby enabling the detection of sparse irregularities in a surface that is assumed to be generally smooth.

Augmenting Active Scanning Systems Including Lidar, Radar, Time-of-Flight, and Structured Illumination with Polarization Imaging Some aspects of embodiments of the present disclosure relate to augmenting active scanning system based on polarization cues such as degree of linear polarization (DOLP) and angle of linear polarization (AOLP) as computed from polarization raw frames captured by polarization camera systems. In some circumstances, the augmentation of an imaging modality or the combination of multiple imaging modalities may be referred to as sensor fusion.

As one motivating example of augmenting active scanning systems, some autonomous driver assistance systems (ADAS) include scanning systems in order to capture information about the driving environment to offer provide the driver with features such as Forward Collision Warning (FCW), Automatic Emergency Braking (AEB), Adaptive Cruise Control (ACC), and Lane Departure Warning (LDW). Generally, these ADAS features respond to objects and the environment at a macro level, wherein the sensor system of the vehicle is able to reliably sense larger objects or features on the road such as other vehicles and lane separation signs. However, the ability to detect smaller vehicles such as motorbikes and cyclists may not be as robust. Furthermore, small objects and obstacles such as rocks, nails, potholes, and traffic cones may escape detection by such the sensor systems of such ADAS of vehicles. Similar issues may arise for more autonomous or self-driving vehicles, which would benefit from the ability to detect, and navigate around, a wider variety of potential road hazards and to avoid harming other people, animals, or objects. Absent such ability, the autonomous driving systems of today cannot claim to provide a safer alternative given that an attentive driver, in many cases, can be more proactive in sensing and taking corrective action as required.

Accordingly, some aspects of the present disclosure relate to augmenting sensing systems using polarization to improve the detection of small and/or optically challenging objects in a scene.

Figure 10A:
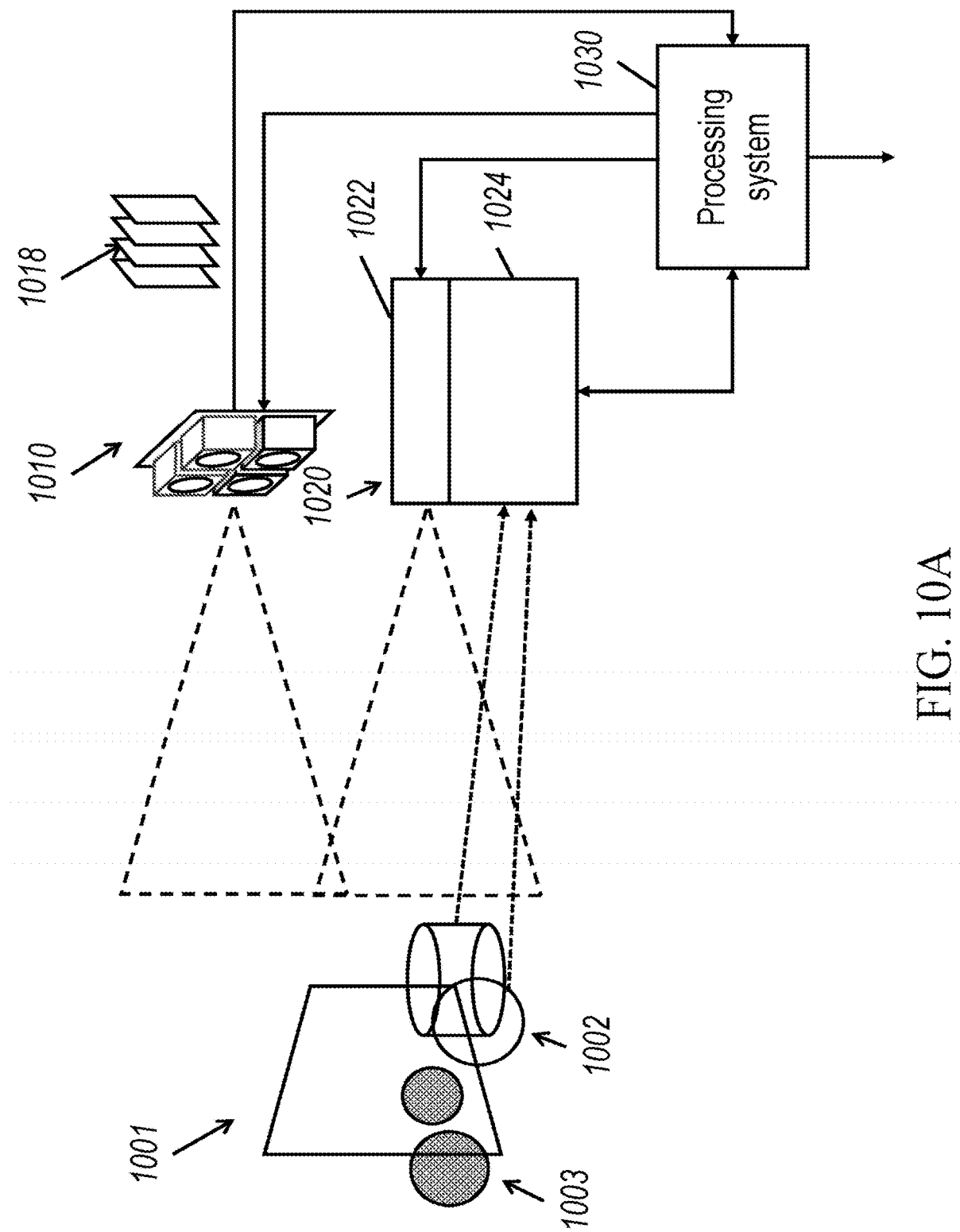
FIG. 10A is a schematic diagram of a system in which an active scanning system is augmented with a polarization camera system according to one embodiment of the present disclosure.

FIG. 10A is a schematic diagram of a system in which an active scanning system is augmented with a polarization camera system according to one embodiment of the present disclosure. In the embodiment shown in FIG. 10A, a polarization camera system 1010 configured to capturer polarization raw frames 1018 (e.g., an individual polarization camera configured to capture different images corresponding to different polarization states, a polarization camera array, or a stereo polarization camera system, as described above) augments an active sensing system 1020. The active sensing system includes an active emitter 1022 configured to emit waves (e.g., electromagnetic waves or sound waves) toward a scene 1001 containing various objects 1002 and 1003, where reflections 1004 of the waves off of surfaces of the objects 1002 and 1003 are detected by a detector 1024 of the active sensing system 1020.

For example, in the case of a radar system, the active emitter 1022 may emit radio frequency or microwave frequency electromagnetic waves, and the detector 1024 may include an antenna array configured to detect the reflected signal. In the case of a lidar and/or time-of-flight depth camera system, the active emitter 1022 may include a laser configured to emit light into the scene 1001 (e.g. by scanning the laser over the scene 1001 or by flashing light over the scene) and computing depth based on the time that elapses until reflected light is received. In the case of an active stereo depth camera system, the active emitter 1022 may emit structured light or patterned light onto the scene, and the detector 1024 is configured to detect light in the wavelength emitted by the active emitter 1022 (e.g., infrared light). The processing system 1030 may be configured to control both the polarization camera system 1010 and the active sensing system 1020, including controlling the polarization camera system 1010 and/or the active scanning system 1020 to capture data and receiving raw data captured by the polarization camera system 1010 and the active sensing system 1020 to detect objects or otherwise analyze a scene.

As discussed above, in many instances, optically challenging objects may be substantially invisible to comparative or standard camera systems that do not capture information regarding the polarization of light. On the other hand, capturing polarization raw frames of scenes and computing polarization cues from the polarization raw frames can increase the contrast of optically challenging objects in a scene, because these optically challenging objects may present distinctive polarization signatures (e.g., in the case of a transparent glass ball, shiny metal on the ground, and the like).

Accordingly, some aspects of embodiments of the present disclosure relate to the use of a predictor 750 configured to receive first tensors 50 in polarization feature spaces as input (e.g., a trained polarization CNN) to identify optically challenging objects in a scene and to generate a characterization output 20 such as a segmentation map that can be combined or fused with the outputs of other sensors operating on the same scene (e.g., radar and/or lidar data showing the distances and velocities of various objects in a scene, a depth map computed based on an RGB/gray-based camera system, or a segmentation map computed by an RGB/gray-based camera system).

Continuing the above example of ADAS and automated driving for vehicles, a polarization CNN is trained to detect road obstacles at a micro level, in cluttered environments, of optically challenging objects such as shiny metal and glass, as well as other objects that may prove to be hazardous, such as semantically inconsistent objects that are transient and even more hazardous, such as rocks, water, ice, or oil slicks on the road. These represent road conditions that are hazardous and unexpected, and that call for caution. Accordingly, fusing the large scale, coarse data from active scanning systems such as lidar and radar with segmentation maps computed using polarization cues enables ADAS and automated driving systems to detect a wider range of objects in a driving environment, from large scale vehicles down to micro-scale nails, flat metal panels, and the like.

As noted above, lidar and radar systems are generally limited to generating sparse point clouds of information regarding the scene. In particular, the active emitter 1022 of the active scanning device 1020 may have various physical constraints that force a tradeoff between breadth of coverage (e.g., solid angle swept over by the active emitter 1022), resolution, and latency. For example, physical constraints may limit the speed at which a laser emitter of a lidar can sweep over a scene, and sweeping more quickly causes fewer rays of light to be emitted toward any one part of the scene, thereby reducing the signal received by the detector 1024 for any given angle. Sweeping more slowly can increase the time between successive scans of an area (or reduce a frame rate of the data), thereby increasing latency, which may cause problems in applications that require real-time control. Likewise, in the case of active stereo depth sensors, a structured light projector emits patterned light toward a scene, where the pattern may include dots and/or lines where local patches are globally unique across the pattern. However, the angular resolution of the system is constrained by the resolution of the dot pattern.

Therefore, some aspects of embodiments of the present disclosure relate to generating to generate higher quality 3-D models by fusing sparse point clouds captured by 3-D active scanning systems with surface normals computed from polarization data captured by a polarization camera system.

Figure 10B:
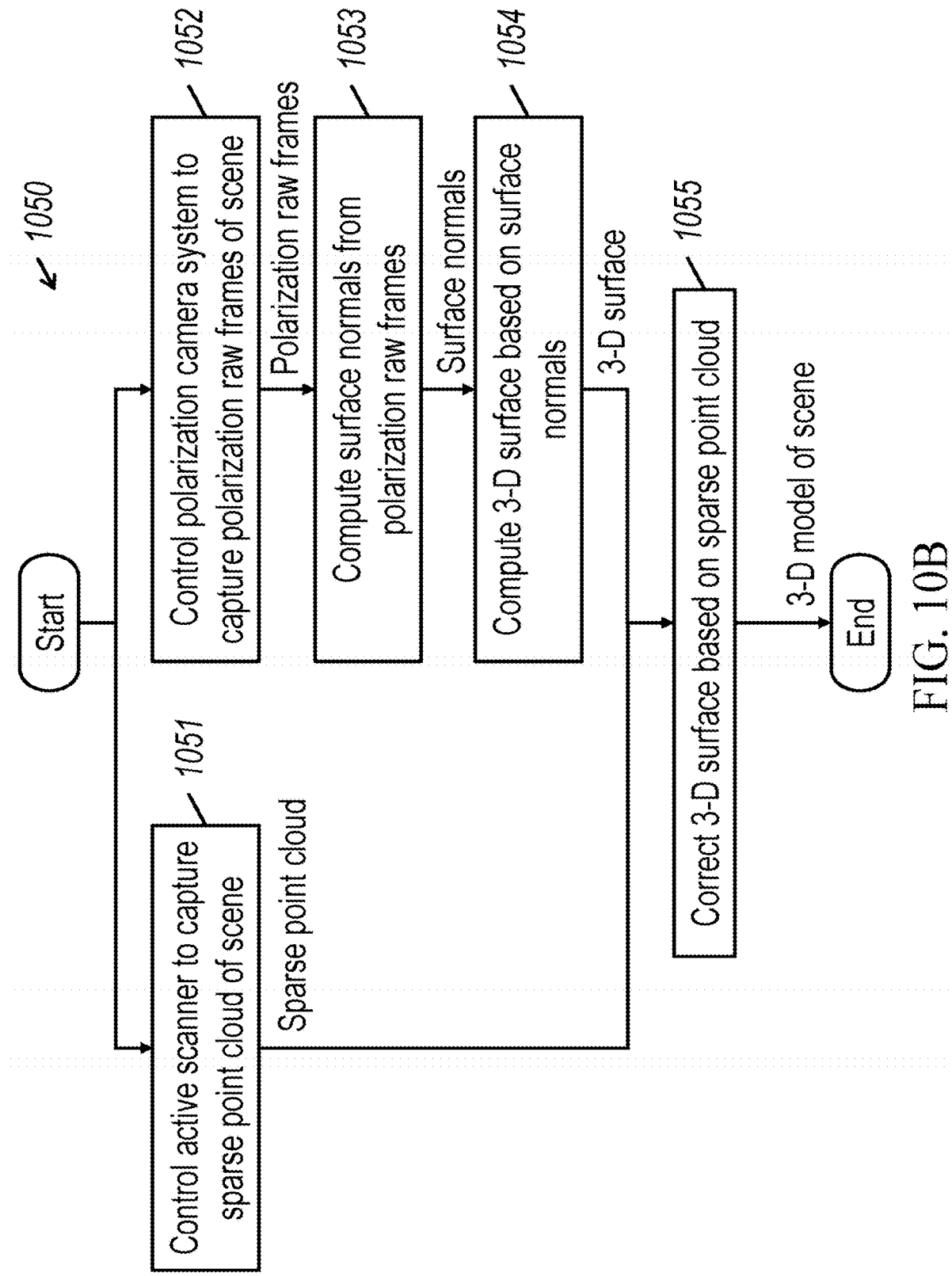
FIG. 10B is a flowchart depicting a method for fusing the 3-D model captured by an active 3-D scanning system with surface normals captured by a polarization camera according to one embodiment of the present disclosure.

FIG. 10B is a flowchart depicting a method 1050 for fusing the 3-D model captured by an active 3-D scanning system with surface normals captured by a polarization camera according to one embodiment of the present disclosure. Referring to FIG. 10B, in operation 1051, a processing system 1030 controls an active scanner 1020 (e.g., lidar, radar, active stereo, time-of-flight, etc.) is used to capture a point cloud of a scene 1001. In operation 1052, the processing system 1030 controls the polarization camera system 1010 to capture polarization raw frames 1018. In some embodiments, operations 1051 and 1052 are performed concurrently, such that substantially the same scene is sensed by both systems (e.g., in dynamic situations such as driving through traffic, the scene may continuously change over time due to the movement of the vehicle on which the ADAS or automated driving system is mounted, as well as the movement of other vehicles and objects in the environment). In operation 1053, surface normals are computed from the polarization raw frames, such as by applying the techniques described above (e.g., extracting tensors in AOLP $\phi$ and DOLP $\rho$ representation spaces and computing surface normals in accordance with equations (2), (3), (4), and (5)). In operation 1054, the surface normals are integrated over sample space to compute a 3-D surface, and in operation 1055, the 3-D surface computed based on the surface normals is corrected in accordance with constraints of the sparse point cloud captured by the active scanner 1020 to generate a 3-D model of the scene that is of higher quality than the point cloud captured by the active scanner 1020 operating alone.

Some aspects of embodiments of the present disclosure further relate to generating higher quality 3-D models of a scene through beam steering of the active scanner 1020 to perform higher-resolution scans of particular regions of interest within the scene. In more detail, in some embodiments of the present disclosure, a predictor 750 is configured to identify regions of interest within a given scene. For example, in some embodiments, a polarization convolutional neural network is trained to compute a segmentation mask that identifies regions of interest, based on labeled training data. Continuing the example of sensors for ADAS and automated driving systems, a polarization CNN may be trained to identify objects of interest in a scene that may be hard to detect or analyze using a comparative active scanning system operating alone with its active emitter 1022 configured to emit a wide beam (e.g., small vehicles such as motorcycles and bicycles, small and medium sized objects such as traffic cones, chains, and other lightweight barriers, and the like).

Figure 10C:
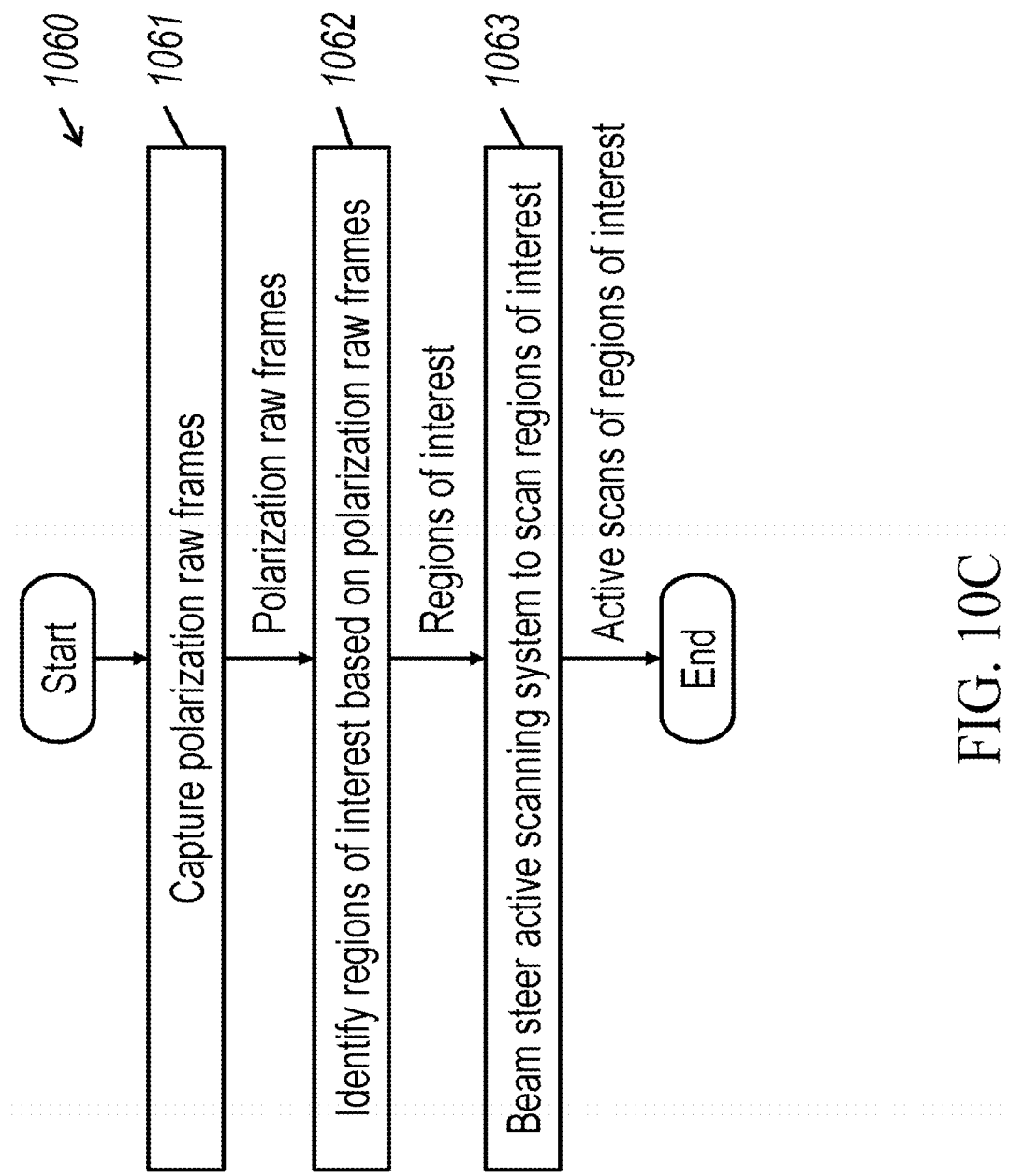
FIG. 10C is a flowchart illustrating a method for augmenting an active sensing system using polarization according to one embodiment of the present disclosure.

FIG. 10C is a flowchart illustrating a method for augmenting an active sensing system using polarization according to one embodiment of the present disclosure. As shown in FIG. 10C, according to one method 1060, the processing system 1030 controls the polarization camera system 1010 to capture polarization raw frames in operation 1061. In operation 1062, the processing system 1030 identifies regions of interest in the polarization raw frames, such as by extracting polarization cues (or tensors in polarization representation spaces) from the polarization raw frames and supplying the polarization cues to a polarized convolutional neural network trained to identify objects and regions of interest for a given use case. In operation 1063, the processing system 1030 steers the active scanning system (e.g., steers the direction and/or solid angle of a beam emitted by the active emitter 1022) to scan the identified regions of interest to generate high-resolution active scans of the regions of interest. These active scans may provide more accurate information than the output of the low-resolution, wide scans of the scene performed by the active sensing system 1020 without using beam steering, and may also provide different information than determined by the polarization camera system 1010. For example, the polarization camera system 1010 may provide high precision angular data regarding the direction of a particular surface or region of interest within a scene, but may not be able to provide accurate information about the distance or three-dimensional shape of the surface of interest. On the other hand, focusing or steering the beam emitted by an active emitter 1022 toward the surface or region of interest enables high-precision measurements to be made of those surfaces (e.g., base on time-of-flight to points within the identified regions). As specific examples of beam steering, in the case of lidar, a standard scanning cycle of the lidar system can be focused on scanning only the identified regions of interest, thereby increasing the energy emitted toward those regions of interest, and thereby increasing the signal that can be detected by the detector 1024. Similarly, in the case of radar, beamforming techniques (e.g., using a phased array) may be used to form or shape the beam to be emitted over a wider or narrower shape, as well as to steer the direction in which the signals are emitted. In the case of an active stereo scanning system, the structured light pattern may be focused to cover only the particular regions of interest, thereby increasing the resolution of the pattern in those regions of interest, and thereby enabling higher resolution block matching to be performed over the surfaces in the region of interest. In some embodiments, selective beam steering across multiple frames through tracking in the registered/fused polar data. Accordingly, a steered beam can provide, for example, higher resolution 3-D point clouds of particular regions of interest. In some embodiments, these higher resolution 3-D point clouds are further enhanced using surface normals computed from the polarization raw frames captured by the polarization camera system 1010.

Capturing higher quality 3-D models of objects using active scanning systems (e.g., through beam steering and/or through the improvement of surface shape detection using surface normals computed from polarization) provides improvements to object detection and classification due to higher resolution models supplied as input to the classifier. For example, a neural network trained to classify objects (e.g., distinguishing between a dog and a fire hydrant), will produce more accurate results when the input to the neural network is of higher quality. Accordingly, aspects of embodiments of the preset disclosure implementing sensor fusion between active sensing systems 1020 and polarization camera systems 1010 can improve the accuracy and responsiveness of object detection systems.

File Formats with Surface Normals from Polarization

Shape from Polarization approaches, as described above, recover surface normals from polarization cues captured by a polarization imaging system. Surface normals provide a valuable prior about the surface being imaged that opens a wide range of possibilities for visual inspection of the scanned surfaces that are needed across different manufacturing verticals such as: vehicles (e.g., automobiles, aircraft, and watercraft) and vehicle parts (ex: tires, engine blocks, transmissions, painted surfaces, etc.), 3D metal or polymer-based printing, printed circuit boards (PCBs), and mission-critical medical devices (e.g., ventilators, pumps, stents, and the like).

Storing surface normals together with the images enables interactive post-visualization of the scanned surface for a variety of use cases. Examples include: inspection for surface anomalies on the scanned surface; and the ability to re-light the scanned surface for arbitrary lighting conditions.

Surface profile examination are important in analyzing the intrinsic shape and curvature properties of surfaces. These frequently reveal anomalous behavior which is not immediately apparent to the naked eye in simple iso-parametric surface digitizations of objects. The ability of polarization enhanced imaging to provide order of magnitude improvements to surface normals accuracy can enable their application in high precision manufacturing of industrial parts for smoothness detection and shape fidelity.

The need for fair or smooth surface shapes can be motivated by different considerations in different market verticals. In automotive design aesthetics dominate, while in aircraft and ship-building industry, aerodynamic flow is critical for fuel efficiency. The smoothness of surfaces is related to many different features such as: continuity between adjacent patches in tangents and curvature; curvature distribution; flat points; and convexity, which are driven directly by surface differential geometry. Aesthetically smooth surfaces cannot have bumps or dents, which are essentially variations in local curvature which in turn are defined by their surface normal representations. Other applications such as robotic bin picking rely on accurate surface profile of the parts being picked and the recognition of surface imperfections like exceeding curvature bounds and high variation of curvature can prevent failure of tool-path generation algorithms for controlling the robotic picker.

Visualization of differential geometric features such as curvature behavior, parabolic lines, and iso- or geodesic lines and their variational behavior in the presence of environmental stimuli such as temperature or humidity are critical in the analysis of surface properties of manufactured parts in mission critical use conditions. In all of the above cases, the ability to scan the surface in real-time made available by polarization enhanced imaging can provide major improvements to real-time monitoring and control. In some embodiments, real-time surface normals tracking provides significant improvements in surgery by providing surgeons with real-time information about induced or built-in stress on the operated upon surface tissues (such as brain tissues). This information is often critical for surgeons as they can now respond, in real-time, to their surgical path planning in response to variations in surface stress of the affected regions.

Accordingly, some aspects of embodiments of the present disclosure relate to file formats for storing information regarding surface normals captured by polarization camera systems. In addition to storing the surface normals of the scanned surface along with the image information (e.g., red, green, blue, and, in some cases, alpha color channels) in commonly used file formats (such as JPEG, TIFF, PNG) additional information from polarization include the degree and angle of polarization (DOLP $\rho$ and AOLP $\phi$). These additional channels of information provide visual cues in surface inspection, often providing enhanced contrast (even when the original image is of poor quality due to lack of adequate exposure or glare). Storing these images in compressed form enables significant latitude in producing visual overlays to allow for increased visual understanding of surface anomalies. These can also help to refine depth maps to a much higher degree of precision than is possible with conventional non-polarization technologies currently available.

One example embodiment for storing polarization data (e.g., DOLP and AOLP) alongside color information relates to using the "application markers" of the JPEG File Interchange Format (JFIF). Metadata can be stored in JFIF using sixteen "application markers," which makes it possible for a decoder to parse the interchange format and decode only required segments of image data. Although the current JFIF standard limits application markers to 64K bytes each, it is possible to use the same marker ID multiple times and refer to different memory segments. This enables one to store surface normal information in compressed or uncompressed formats. In addition, in some embodiments of the present disclosure, one of the application markers is used to store specific additional information such as degree and angle of polarization images. While one embodiments of the present disclosure is described herein with regard to storing polarization data along color image data using the JFIF standard, embodiments of the present disclosure are not limited thereto.

In some embodiments, surface normals are represented as vectors in three dimensions and can therefore take up a lot more space than the size of the original image (e.g., larger than the size of a corresponding RGB color or grayscale image). To save space, a compressed form of surface normal can be stored by sharing the exponent across the three dimensions and using 8 bits for each of the exponents in fixed-point format. Further reduction may be achieved, at the expense of re-computing the normals along the 3 dimensions at render time, by storing just the azimuth and zenith angles, or by just storing the DOLP and AOLP.

In some embodiments of the present disclosure, an existing image format that is capable of storing three channel information (e.g., red, green, and blue color information) is repurposed to store three-dimensional surface normal information. Although such embodiments may no longer be able to store color information (e.g., color information may be stored in a separate file), these approaches enable the leveraging of existing features such as image compression and progressive display, and also allowing for the use of existing software tools for writing data to such formats and parsing data from such formats. In some embodiments of the present disclosure, the mapping of the channels of the image format and the three-dimensional directions (e.g., x-, y-, and z-directions) is fixed or otherwise previously agreed-upon, in order to avoid the misinterpretation of the orientations of the surface normals.

Augmenting DSLR and Video Cameras with Polarized Imaging

Some aspects of embodiments of the present disclosure relate to augmenting digital camera systems such as digital single-lens reflex (DSLR) cameras and video cameras with polarized imaging. In some embodiments of the present disclosure, this relates to mounting a polarization camera system onto an underlying standard color camera system (e.g., the polarization camera system may include a single polarization camera capable of capturing data at multiple different polarization angles, a polarization camera array in which each camera array is configured to capture light of a different polarization state, and/or a stereo polarization camera system as described above). According to some embodiments of the present disclosure, the polarization camera system and the underlying camera system may be registered by imaging calibration targets (e.g., a checkerboard pattern) to compute the extrinsic camera parameters for mapping between the multiple views captured by the polarization camera system and the underlying camera system. This enables an augmented DSLR camera and/or an augmented video camera system to perform surface normal extraction and, in the case of stereo camera systems, perform depth estimation.

Various applications of combining color images with polarization images are described above. In embodiments of the present disclosure in which a color camera system is augmented with a polarization camera system, the polarization camera system is configured to synchronize its capture of polarization raw frames with the capture of images by the underlying system. For example, a same shutter release button on the DSLR may be used to trigger both the capture of images by the DSLR and by the polarization camera system. Likewise, a same "record" button on a video camera system may be used to also control the polarization camera system to capture polarization raw frames that are time indexed to match the frames captured by the underlying video camera system. In some embodiments of the present disclosure, a polarization camera system is configured to fit into the flash hot shoe or otherwise configured to be controlled by the flash system of the underlying camera system to provide the synchronization between the triggering of the underlying camera and the polarization camera systems.

As discussed above, various file formats may be used to store the polarization data and/or surface normals as captured by the polarization camera system alongside the color or grayscale image data captured by the underlying camera, and/or by re-purposing standard color image file formats to store surface normal data.

Capturing polarization raw frames (and, accordingly, surface normals of objects in a scene) concurrently with color video data may be used to perform further analysis of a scene, such as by providing more accurate depth estimations, which may be used for providing additional focus control (e.g., predicting which portions of a scene will be in focus based on depth from the camera). Capturing stereo polarization raw frames may also enable the concurrent capture of depth maps along with color texture information of a scene.

In some embodiments of the present disclosure, the surface normals computed from the polarization raw frames captured by the camera system are used to assist in motion capture of the movement of people or objects in a scene. In more detail, the surface normals may provide information about the location and orientation of motion capture markers on objects in a scene, whereas comparative techniques may track only the location of the markers. Similarly, in the case of performing motion capture without markers, surface normals may also provide information about the orientation of various surfaces, thereby also improving the fidelity of the capture. Polarization based imaging may also avoid the temporary invisibility of markers or surfaces of motion captured objects in a scene due to specular reflections or glare, as discussed above. Accordingly, applying polarization camera systems to motion capture techniques can improve the accuracy and richness of motion captured data.

Computational Photography with Polarization

When polarized light enters a polarization filter, the intensity of outgoing light changes depending on the relative angle between the polarized incoming light and the polarizing filter. By capturing the scene at multiple angles of polarization, it is possible to eliminate glare, specular reflections, multiple reflections in at least one of the multiple angles of polarization images captured. These approaches may be used in industrial imaging applications to visualize hard-to-image scenes that are constrained by glare or specular reflections. However, polarization can also be used in computational photography to improve the capture of photographs for human visual consumption. Some aspects of embodiments of the present disclosure relate to the synthesis of high dynamic range images using multiple polarized input images, which may also improve the sharpness of the captured images.

High dynamic range (HDR) imaging generally involves capturing multiple images of a scene at different exposures to capture the full extent of the intrinsic dynamic range of the scene. However, the different exposures provide edges of different degrees of sharpness across the images, making them hard to align or at best aligning them imperfectly, thereby resulting in softer-looking (e.g., blurrier) images. Some comparative approaches capture frames of constant exposure, which makes alignment more robust, where the exposures are set low enough to avoid blowing out the highlights. The resulting merged HDR image has clean shadows and high bit depth. However, this works as long as there is no motion present in the scene (e.g., motion in the camera and/or motion of objects in the scene). Any motion while capturing frames of constant exposure can create blur and introduce unwanted artifacts (e.g., ghosting) in the edges.

Accordingly, some aspects of embodiments of the present disclosure relate to the use of capturing polarization raw frames at the same exposure settings and synthesizing high dynamic range images in the presence of scene motion using the polarization raw frames.

Having multi-camera systems with different polarization filters along with a reference camera with nominal Bayer filters allow for capturing multiple images concurrently (e.g., simultaneously) with the same exposure settings across all cameras. This allows for fusion of these multiple images without suffering the impact of anomalies created by motion across temporal frames (e.g., frames captured at different times). In addition, the different polarization filters allow for capturing the same scene at different intensities as if they were captured with different "neutral density" filters. Because the polarization filters have a natural effect of reducing the intensity of light incident on the camera system (e.g., incident on the image sensor), the exposure at which these sets of images are captured may not need to be as low as what would be needed in the comparative approach outlined above, as in that case there is nothing that attenuates the incident light on the camera system thereby necessitating carefully calibrated lower exposures.

Furthermore, merging polarization raw frames enables the recovery of detail in glare or otherwise saturated portions of the scene due to specular reflection. For example, under the comparative approach in which multiple lower exposure images are captured of a scene, it is still possible that portions of the scene will be overexposed to the point of saturation due to specular highlights. On the other hand, by capturing polarization raw frames of the scene using different polarization states and, in the case of a camera array and/or a stereo polarization camera system, from different viewpoints, it is unlikely that a given surface patch of the scene will exhibit specular glare from all perspectives. This, in turn, enables the recovery of detail from regions that would otherwise be lost in the case of a standard camera system that did not use polarization raw frames.

Figure 11:
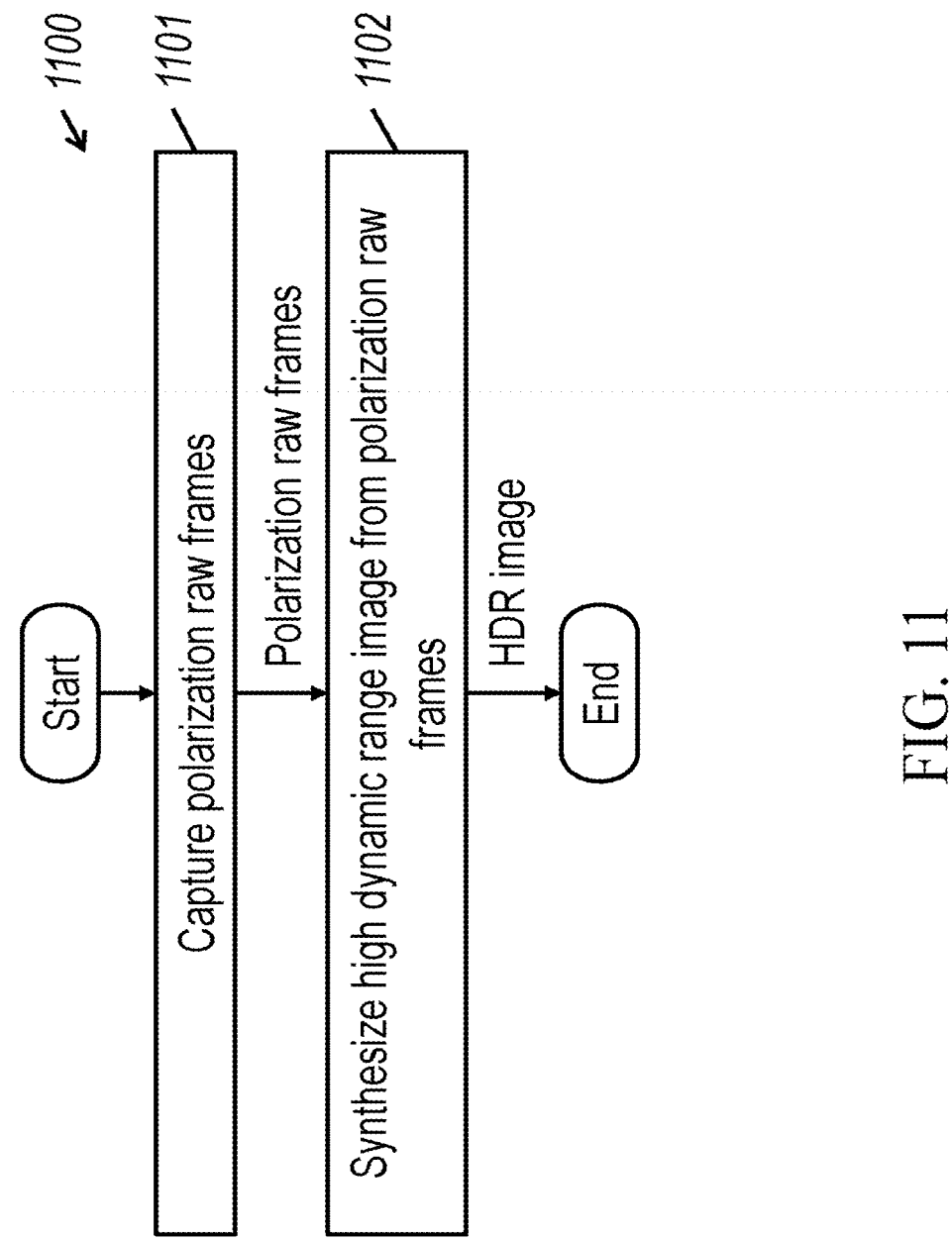
FIG. 11 is a flowchart illustrating a method for synthesizing a high dynamic range (HDR) image from polarization raw frames.

FIG. 11 is a flowchart illustrating a method for synthesizing a high dynamic range (HDR) image from polarization raw frames. In operation 1101, a processing system (e.g., a controller of a camera system) controls a polarization camera system to capture polarization raw frames and, in operation 1102, synthesizes a high dynamic range (HDR) image based on the polarization raw frames. As noted above, in some embodiments of the present disclosure, the polarization raw frames are combined based on techniques for combining multiple low-exposure frames (e.g., captured with a small aperture and/or short exposure time). In some embodiments of the present disclosure, the impact of glare and/or specularity can be removed and detail can be recovered in regions of the image that would be overexposed by dropping or portions of the images that are saturated in some polarization raw frames and more likely to be properly exposed in other polarization raw frames.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A multi-modal sensor system comprising:
an underlying sensor system;
a polarization camera system configured to capture polarization raw frames corresponding to a plurality of different polarization states; and
a processing system comprising a processor and memory, the processing system being configured to control the underlying sensor system and the polarization camera system, the memory storing instructions that, when executed by the processor, cause the processor to:
control the underlying sensor system to perform sensing on a scene and the polarization camera system to capture a plurality of polarization raw frames of the scene;
extract first tensors in polarization representation spaces based on the plurality of polarization raw frames; and
compute a characterization output based on an output of the underlying sensor system and the first tensors in polarization representation spaces.

2. The multi-modal sensor system of claim 1, wherein the polarization camera system comprises a polarization camera module comprising:
a first polarization camera comprising a first polarizing filter at a first polarization orientation, the first polarization camera having a first optical axis;
a second polarization camera comprising a second polarizing filter at a second polarization orientation, the second polarization camera having a second optical axis substantially parallel to the first optical axis; and
a third polarization camera comprising a third polarizing filter at a third polarization orientation, the third polarization camera having a third optical axis substantially parallel to the first optical axis.

3. The multi-modal sensor system of claim 2, wherein the polarization camera module further comprises a fourth polarization camera comprising a fourth polarizing filter at a fourth polarization orientation, the fourth polarization camera having a fourth optical axis substantially parallel to the first optical axis.

4. The multi-modal sensor system of claim 2, wherein the first tensors comprise a degree of linear polarization (DOLP) and an angle of linear polarization (AOLP), and
wherein the memory further stores instructions that, when executed by the processor, cause the processor to compute the DOLP and the AOLP based on polarization raw frames captured by the first polarization camera, the second polarization camera, and the third polarization camera, the instructions comprising instructions to:
initialize an estimated DOLP and an estimated AOLP based on Stokes vectors;
estimate a scene geometry based on parallax shifts in the polarization raw frames to generate a coarse model; and
iteratively:
refine the coarse model based on the estimated DOLP and the estimated AOLP to generate an estimated geometry; and
update the estimated DOLP and the estimated AOLP based on the estimated geometry,
until a change in the estimated DOLP and a change in the estimated AOLP are both less than corresponding threshold values.

5. The multi-modal sensor system of claim 1, wherein the polarization camera system comprises a stereo polarization camera system comprising:
a first polarization camera module having a first optical axis, the first polarization camera module being configured to capture a first plurality of polarization raw frames corresponding to a first plurality of different polarization states; and
a second polarization camera module having a second optical axis and spaced apart from the first polarization camera module along a baseline, the second polarization camera module being configured to capture a second plurality of polarization raw frames corresponding to a second plurality of different polarization states,
the first optical axis being substantially parallel to the second optical axis.

6. The multi-modal sensor system of claim 5, wherein the first polarization camera module comprises a first plurality of color filters configured to transmit light in three or more different first color spectra, and
wherein the second polarization camera module comprises a second plurality of color filters configured to transmit light in three or more different second color spectra,
wherein the three or more second color spectra are different from the three or more first color spectra.

7. The multi-modal sensor system of claim 6, wherein memory further stores instructions that, when executed by the processor, cause the processor to:
control the stereo polarization camera system to capture multi-spectral stereo polarization imaging data in the first color spectra and in the second color spectra; and
extract first tensors in polarization representation spaces from the multi-spectral stereo polarization imaging data.

8. The multi-modal sensor system of claim 1, wherein the underlying sensor system comprises an active scanning system comprising an active emitter and a detector.

9. The multi-modal sensor system of claim 8, wherein the active scanning system comprises a radar system.

10. The multi-modal sensor system of claim 8, wherein the active scanning system comprises a lidar system.

11. The multi-modal sensor system of claim 8, wherein the active scanning system comprises an active stereo depth camera system.

12. The multi-modal sensor system of claim 8, wherein the multi-modal sensor system is mounted on a vehicle.

13. The multi-modal sensor system of claim 8, wherein the memory further stores instructions that, when executed by the processor of the processing system, cause the processor to:
compute a sparse point cloud based on the output of the underlying sensor system;
compute surface normals from the polarization raw frames;
compute a 3-D surface based on the surface normals; and
correct the 3-D surface based on the sparse point cloud to compute a 3-D model of the scene.

14. The multi-modal sensor system of claim 8, wherein the memory further stores instructions that, when executed by the processor of the processing system, cause the processor to:
compute a segmentation map based on the first tensors in the polarization representation spaces, the segmentation map identifying one or more regions of interest in the scene;
steer the active emitter to emit beams toward the one or more regions of interest; and
detect a reflection of the beams emitted by the active emitter using the detector of the active scanning system.

15. The multi-modal sensor system of claim 1, wherein the memory stores instructions that cause the processor to implement a convolutional neural network trained to compute a segmentation map based on the first tensors.

16. The multi-modal sensor system of claim 1, wherein the underlying sensor system comprises a color camera system.

17. The multi-modal sensor system of claim 16, wherein the color camera system is a digital single lens reflex camera or a video camera.

18. The multi-modal sensor system of claim 16, wherein the output of the color camera of the underlying sensor system comprises a color image, and
wherein the memory further stores instructions that, when executed by the processor, cause the processor to:
compute a plurality of surface normals of the scene based on the first tensors; and
store the computed surface normals of the scene in a same file as the color image captured by the color camera.

* * * * *